(12) United States Patent
Li

(10) Patent No.: US 11,769,065 B2
(45) Date of Patent: Sep. 26, 2023

(54) DISTRIBUTED SYSTEM GENERATING RULE COMPILER ENGINE BY DETERMINING A BEST MATCHING RULE BASED ON CONCRETE PARAMETERIZATION WITH DECLARATIVE RULES SYNTAX

(71) Applicant: Yadong Li, Basking Ridge, NJ (US)

(72) Inventor: Yadong Li, Basking Ridge, NJ (US)

(73) Assignee: Julius Technologies LLC, Old Tappan, NJ (US)

( * ) Notice: Subject to any disclaimer, the term of this patent is extended or adjusted under 35 U.S.C. 154(b) by 628 days.

(21) Appl. No.: 16/816,367

(22) Filed: Mar. 12, 2020

(65) Prior Publication Data

US 2020/0293916 A1  Sep. 17, 2020

Related U.S. Application Data

(60) Provisional application No. 62/894,001, filed on Aug. 30, 2019, provisional application No. 62/892,085, (Continued)

(51) Int. Cl.
*G06N 5/025* (2023.01)
*H04L 67/10* (2022.01)
*G06F 9/50* (2006.01)

(52) U.S. Cl.
CPC ........... *G06N 5/025* (2013.01); *G06F 9/5066* (2013.01); *G06F 9/5072* (2013.01); *H04L 67/10* (2013.01);
(Continued)

(58) Field of Classification Search
None
See application file for complete search history.

(56) References Cited

U.S. PATENT DOCUMENTS

| 5,481,717 A | * | 1/1996 | Gaboury | ............ | G06F 30/3323 |
| | | | | | 717/133 |
| 7,565,642 B2 | | 7/2009 | Moore et al. | | |

(Continued)

OTHER PUBLICATIONS

US 10,255,115 B2, 04/2019, Bequet et al. (withdrawn)
PCT International Search Report, dated May 22, 2020, pp. 1-16, US.

*Primary Examiner* — Meng Ai T An
*Assistant Examiner* — Zujia Xu
(74) *Attorney, Agent, or Firm* — Carter Ledyard & Milburn LLP

(57) ABSTRACT

An output rule specified via a distributed system execution request data structure for a requested calculation is determined, and a current rule is initialized to the output rule. A rule lookup table data structure is queried to determine a set of matching rules, corresponding to the current rule. The best matching rule is selected. A logical dependency graph (LDG) data structure is generated by adding LDG nodes and LDG edges corresponding to the best matching rule, precedent rules of the best matching rule, and precedent rules of each precedent rule. An execution complexity gauge value and a set of distributed worker processes are determined. The LDG data structure is divided into a set of subgraphs. Each worker process is initialized with the subgraph assigned to it. Execution of the requested calculation is coordinated and a computation result of the LDG node corresponding to the output rule is obtained.

41 Claims, 26 Drawing Sheets

EXEMPLARY DSGRCE ARCHITECTURE

Related U.S. Application Data filed on Aug. 27, 2019, provisional application No. 62/818,318, filed on Mar. 14, 2019.

(52) U.S. Cl.
CPC ............... *G06F 2209/5018* (2013.01); *G06F 2209/5019* (2013.01)

(56) References Cited

U.S. PATENT DOCUMENTS

| | | | | |
|---|---|---|---|---|
| 7,665,063 | B1* | 2/2010 | Hofmann | G06N 5/025 |
| | | | | 717/111 |
| 8,819,106 | B1* | 8/2014 | Sirota | G06F 9/485 |
| | | | | 709/227 |
| 8,849,673 | B2 | 9/2014 | Pillai et al. | |
| 9,705,820 | B2 | 7/2017 | Madduri et al. | |
| 9,729,414 | B1* | 8/2017 | Oliveira | H04L 43/0805 |
| 9,830,343 | B2 | 11/2017 | Stanfill et al. | |
| 10,241,811 | B2 | 3/2019 | Baskaran et al. | |
| 10,564,946 | B1* | 2/2020 | Wagner | G06F 8/433 |
| 10,673,712 | B1* | 6/2020 | Gosar | H04L 41/5096 |
| 11,113,771 | B1* | 9/2021 | Wang | G06F 16/9024 |
| 11,288,326 | B2* | 3/2022 | Shi | G06F 16/9038 |
| 2002/0023069 | A1* | 2/2002 | Blank | G06F 9/5066 |
| 2009/0055427 | A1* | 2/2009 | Kulasingam | H04L 41/0893 |
| | | | | 707/999.102 |
| 2010/0223591 | A1* | 9/2010 | Shi | G06F 8/20 |
| | | | | 717/102 |
| 2010/0306262 | A1* | 12/2010 | Kuo | G06F 16/284 |
| | | | | 707/708 |
| 2013/0125199 | A1* | 5/2013 | Novak | G06Q 50/26 |
| | | | | 726/1 |
| 2015/0242429 | A1* | 8/2015 | Varvello | H04L 45/7453 |
| | | | | 707/752 |
| 2015/0295949 | A1* | 10/2015 | Chizeck | G16H 40/67 |
| | | | | 726/23 |
| 2016/0142253 | A1 | 5/2016 | Steinder et al. | |
| 2017/0323396 | A1* | 11/2017 | Plotko | G06Q 40/125 |
| 2018/0074870 | A1 | 3/2018 | Park et al. | |
| 2018/0144251 | A1* | 5/2018 | Chou | H04L 67/10 |
| 2018/0157471 | A1 | 6/2018 | Venkataramani et al. | |
| 2018/0302410 | A1* | 10/2018 | Venkataraman | H04L 63/0263 |
| 2018/0352034 | A1* | 12/2018 | Mutreja | G06F 16/182 |
| 2019/0219999 | A1* | 7/2019 | Lam | G06Q 50/30 |
| 2019/0332777 | A1* | 10/2019 | Edwards | H04L 9/14 |
| 2020/0092307 | A1* | 3/2020 | Nedbal | H04L 63/0245 |
| 2020/0235885 | A1* | 7/2020 | Su | H04L 5/0053 |

\* cited by examiner

FIGURE 1B

EXEMPLARY DSGRCE ARCHITECTURE

[135] @[150]rules series [140]
[142] fib(n::Int) = Sum(fib[154](n-1), fib[158](n-2))
[144] fib(n::Int(0)) = Const[0.]()
[146] fib(n::Int(1)) = Const[1.]()
end
[130]

@clone series:dev series [162]
@rules series:dev
[166] fib(n::Int(2)) = Const[1.]()
end
[160]

FIGURE 1C

```
@package Fib[m::Int](xarg(0), xarg(1))
    fib(n::Int) = Sum(fib(n-1), fib(n-2))
    fib(n::Int(0)) = Alias(xarg(0))
    fib(n::Int(1)) = Alias(xarg(1))
    return fib(m)
end @rules pack
    constant(vec::Tensor) = Const[vec]()
    fib(n::Int, f0::Tensor, f1::Tensor) =
        Fib[n](constant(f0), constant(f1))
end
```

170

EXEMPLARY DSGRCE ARCHITECTURE

EXEMPLARY DSGRCE RULE PREPROCESSING (RP) COMPONENT

EXEMPLARY DSGRCE LOGICAL DEPENDENCY GRAPH GENERATING (LDGG) COMPONENT

EXEMPLARY DSGRCE WORKER SUBGRAPH DISTRIBUTION (WSD) COMPONENT

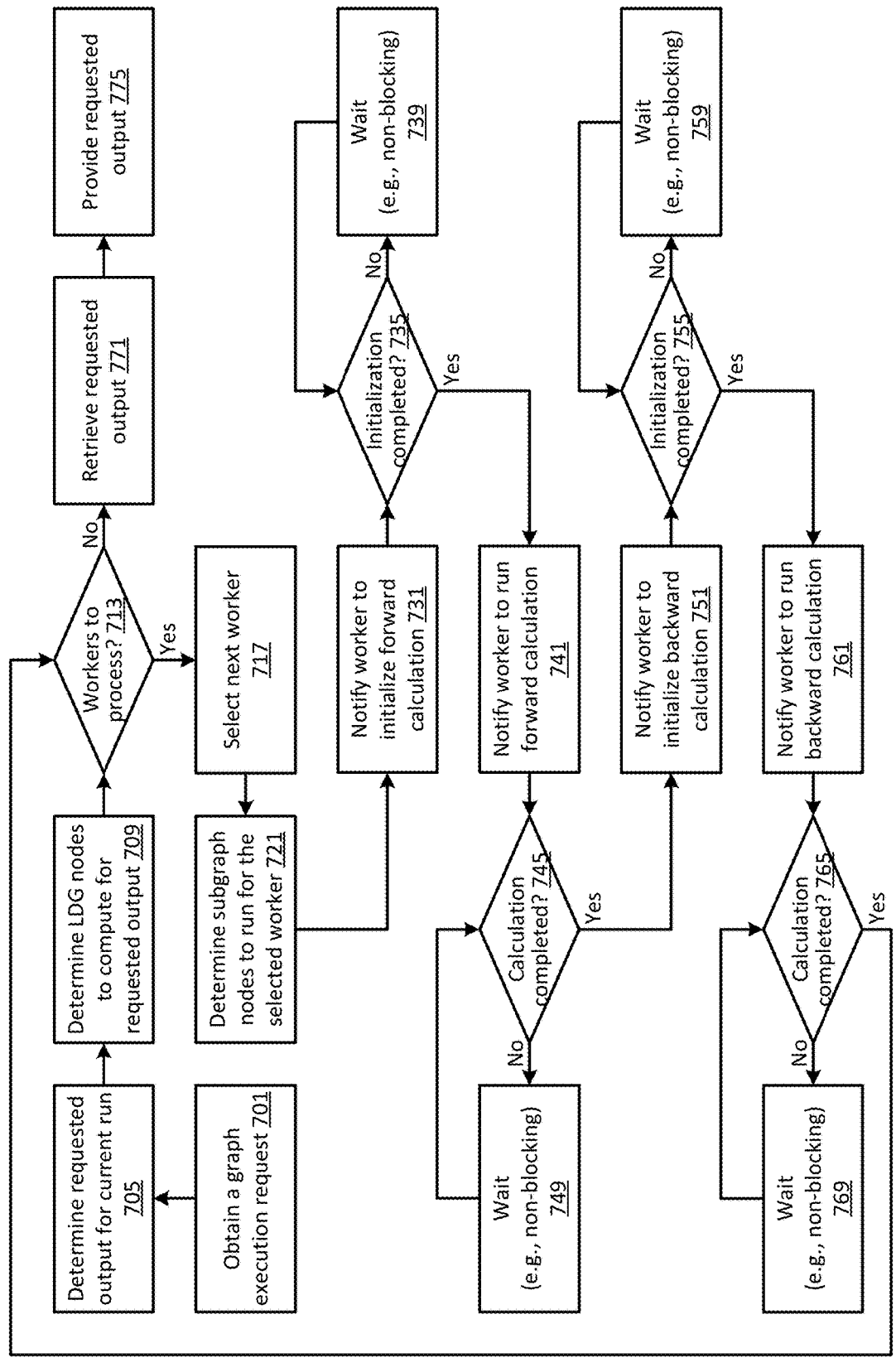

EXEMPLARY DSGRCE SCREENSHOT

EXEMPLARY DSGRCE SCREENSHOT

EXEMPLARY DSGRCE SCREENSHOT

EXEMPLARY DSGRCE SCREENSHOT

EXEMPLARY DSGRCE SCREENSHOT

FIGURE 16 — EXEMPLARY DSGRCE SCREENSHOT

FIGURE 18 — EXEMPLARY DSGRCE SCREENSHOT

EXEMPLARY DSGRCE SCREENSHOT

EXEMPLARY DSGRCE SCREENSHOT

EXEMPLARY DSGRCE COORDINATOR

DISTRIBUTED SYSTEM GENERATING RULE COMPILER ENGINE BY DETERMINING A BEST MATCHING RULE BASED ON CONCRETE PARAMETERIZATION WITH DECLARATIVE RULES SYNTAX

CROSS-REFERENCE TO RELATED APPLICATIONS

Applicant hereby claims priority under 35 U.S.C. § 119 to U.S. provisional patent application No. 62/818,318, filed Mar. 14, 2019, entitled "A DELCARATIVE SYNTAX AND RELATED METHODS, INTERFACE, ALGORITHMS AND PROCEDURES FOR BUILDING AND RUNNING SYSTEMS OF COMPLEX ANALYTICS".

Applicant hereby claims priority under 35 U.S.C. § 119 to U.S. provisional patent application No. 62/892,085, filed Aug. 27, 2019, entitled "DECLARATIVE SYNTAX AND RELATED METHODS, INTERFACE, ALGORITHMS AND PROCEDURES FOR BUILDING AND RUNNING SYSTEMS OF COMPLEX ANALYTICS".

Applicant hereby claims priority under 35 U.S.C. § 119 to U.S. provisional patent application No. 62/894,001, filed Aug. 30, 2019, entitled "DECLARATIVE SYNTAX AND RELATED METHODS, INTERLACE, ALGORITHMS AND PROCEDURES FOR BUILDING AND RUNNING SYSTEMS OF COMPLEX ANALYTICS".

The entire contents of the aforementioned applications are herein expressly incorporated by reference in their entirety.

This disclosure describes DISTRIBUTED SYSTEM GENERATING RULE COMPILER ENGINE APPARATUSES, METHODS, SYSTEMS AND MEDIA (hereinafter "DSGRCE"). A portion of the disclosure of this patent document contains material which is subject to copyright and/or mask work protection. The copyright and/or mask work owners have no objection to the facsimile reproduction by anyone of the patent document or the patent disclosure, as it appears in the Patent and Trademark Office patent file or records, but otherwise reserve all copyright and mask work rights whatsoever.

FIELD

The present disclosure is directed generally to compilers. Compilers are an essential computer technology that allows computer-implemented generation of processor-executable instructions from (e.g., human-readable) source code. The DSGRCE implements improvements to the art.

BACKGROUND

A compiler translates computer code written in one programming language into a different language.

BRIEF DESCRIPTION OF THE FIGURES

The accompanying figures and/or appendices illustrate various exemplary embodiments in accordance with the present disclosure.

FIGS. 1A-C show an exemplary architecture in one embodiment of the DSGRCE.

FIG. 7 shows a logic flow diagram illustrating a graph execution (GE) component in one embodiment of the DSGRCE.

DETAILED DESCRIPTION INTRODUCTION

Figure 1A:
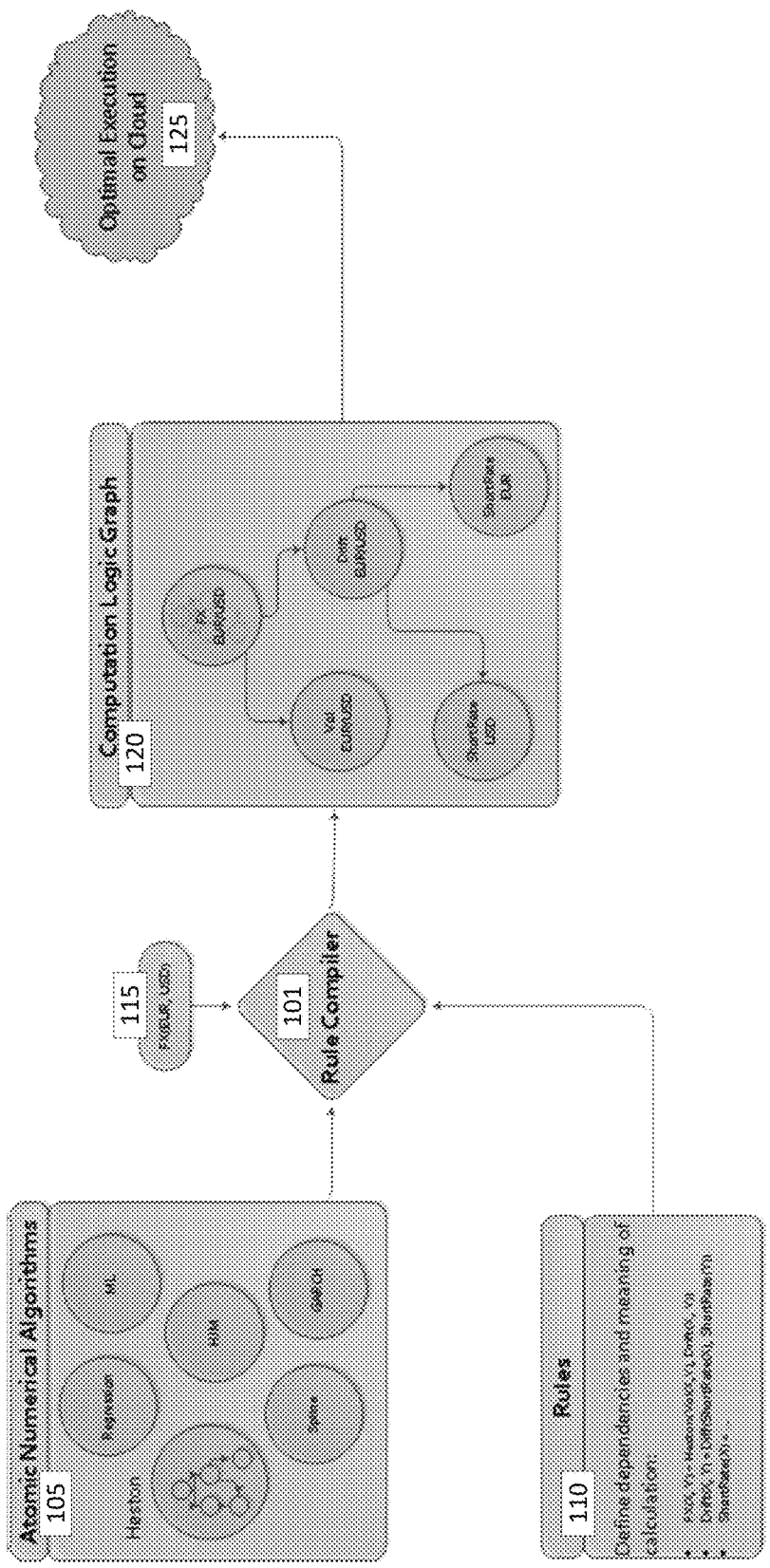

The DSGRCE introduces a rule compiler that utilizes rule declarations (rules) written in a domain specific language (DSL) and a library of atomic (e.g., with respect to the DSL) components (atoms) written in a hosting language to create a fully functional and performing distributed system. For example, the resulting distributed system may be utilized for solving numerical and analytical problems. In some implementations, the DSL may depend on the hosting language for basic language constructs, such as data types, common functions, and operators. In some embodiments, rules may be utilized for implementing high level business logic (e.g., ad hoc, fast changing and non-reusable), while atoms may be utilized for implementing low level atomic numerical algorithms (e.g., stable and reusable).

In various embodiments, some of the benefits provided by the DSGRCE may include:
  1. The DSGRCE-generated system comprises virtual components. The virtual components are not tied to any particular hardware or software, they require minimal manual effort to create, configure, test and tune compared to physical system components (e.g., components that are tied to specific hardware, software and supporting personnel). Using such auto-generated virtual components makes it easy and efficient to develop and test system updates. Developers can focus their efforts on describing analytical logic using rules and atoms, then use the rule compiler to re-generate the entire distributed system and immediately see the results of the change.

2. The rule compiler is agnostic with respect to computing hardware and environment, and supports parallel and distributed computing. The DSGRCE-generated system may run on either a single computer, GPU, etc., or in parallel in a cloud computing environment for performance and scalability.

3. The syntax of rules is rich enough to capture various system configurations without separate configuration files for the system, which greatly simplifies the release and deployment process, and facilitates speedy and reliable updates to the entire system.

4. Arbitrary number of development (dev) and testing environments identical to the production environment may be generated by the rule compiler because system components are virtual.

5. As the set of rules and atoms defines current system capabilities, new capabilities may be added by adding new rules and atoms. The interdependencies of different applications and processes are automatically taken care of by the rule compiler, simplifying project planning and execution.

6. Easy integration and validation of in-house and $3^{rd}$ party numerical libraries, as they can be wrapped up as atoms using the programming interface, and referred to by rules. As the intermediate computation results of each atom are available for the developers or reviewers to inspect, the validation process becomes easier.

7. The name space support of rules facilitates a multiteam development environment. Different teams, departments or even vendors may develop, test and release their rules independently in different name spaces, which may then be seamlessly integrated by the rule compiler to form a complete end-to-end system.

8. The ability to update the underlying rules independently from atoms, and on a running system greatly simplifies the development, testing, release and deployment process. Updates may also be made in a new rule namespace, thus not changing the system behavior for existing users of the old namespace.

9. Single version of truth and guaranteed repeatability—the behavior of the DSGRCE-generated system is fully captured by the set of rules and the underlying library of the atoms, from which the system behavior may be exactly replicated. There is no need for separate configuration files to change the system's behavior.

10. Intermediate computational results produced by any atom are readily accessible in the resulting distributed system, giving users great transparency to test, debug, audit and certify the correctness of complex analytics.

11. The rule compiler may be configured to support full end-to-end algorithmic differentiation (AD) from a tensor output. The distributed system generated by the rule compiler may perform not only the primary calculation to produce user specified output, but also the AD calculation, allowing fast computation of sensitivities to any inputs.

Having a clear separation between rules and atoms allows for quick and reliable update and release schedule in response to frequent business logic changes. The conventional approach to implementing fast changing business logic is to either implement such business logic in core quantitative libraries or as configuration files that are read by applications at run time. Either choice has significant drawbacks: Implementing high level business logic in a core quantitative library is reliable but slow and inflexible, as every time when business logic changes, a new version of the core quantitative library has to be released by going through the full cycle of development, test, approval and deployment; it is not an efficient use of valuable research and development resources. Implementing high level business logic in configuration files allows much faster release cycles, as many changes can be implemented by changing the configuration files only. However, this approach incurs the additional cost and complexity of having to manage the configuration files in addition to the analytics libraries. In practice, the configuration files of complex analytics systems can often grow into enormous complexity (e.g., different system components could require different configuration formats and syntax; different versions of a numerical library may require different configurations; the development and production environments often also require different configurations) and require dedicated database and software tools to manage. Such complexity in configuration is a constant source of error in running and supporting complex analytics systems. Further, fragmentation of the business logic across both the numerical library and the collection of configuration files causes more difficulties in testing, debugging, auditing and validations, as a developer or model reviewer has to go through not only the source code of the numerical library, but also the myriads of configurations to figure out the business logic in effect.

DETAILED DESCRIPTION OF THE DSGRCE

FIG. 1A shows an exemplary architecture in one embodiment of the DSGRCE. In FIG. 1A, an embodiment of how a rule compiler 101 may be utilized to facilitate creating and executing a distributed system is illustrated. The rule compiler may utilize atoms 105 and rules 110 to create the distributed system. In one embodiment, the DSGRCE may transforms rule specifications into the distributed system in four phases.

In Phase 0, the rules may be parsed and data structures that link rules and atoms, allow rule lookup, provide support for polymorphism based on type inheritance and value matches, and/or the like may be generated. For example, Phase 0 may be performed at compile time for compiled host languages such as C/C++ and Fortran, and then dynamically loaded at run time as a shared library. In another example, Phase 0 may be performed at run time for interpreted or just-in-time compiled host languages, such as Python, Julia, Java, and .NET.

Phases 1 to 3 may be performed by the DSGRCE at run time. In Phase 1, a user may specify a desired output, which may be represented as a set of output rules with concrete parameterization 115. The DSGRCE may analyze the set of output rules and use the data structures generated in Phase 0 to construct a global logical dependency graph 120 of the entire calculation in order to compute the desired output. In one implementation, the global logical dependency graph (e.g., a directed acyclic graph (DAG)) is constructed by recursively following and adding rule precedences (e.g., data precedences of the primary output calculation) as new nodes to the global logical dependency graph, starting from the set of output rules requested by the user. At the end of Phase 1, the atom objects have not been instantiated and the memory utilized for the calculation (e.g., tensor calculation) has not been allocated. Thus, each node in the graph stores minimal information and extremely large graphs, with hundreds of millions of nodes, can comfortably fit into the memory of a modern PC.

In Phase 2, a manager process may divide the global logical dependency graph into multiple sub-graphs according to the number of available worker processes and their hardware resources. In one implementation, the manager process and/or the worker processes may be executed in a cloud computing system 125. The manager process may instantiate the worker processes and/or may facilitate establishing communication links (e.g., network communication links) among worker processes. It is to be understood that while a distributed computing topology with a single manager and multiple workers is utilized in this embodiment, the DSGRCE may utilize a wide variety of topologies, such as multiple layers of managers and/or workers, or a fully decentralized network of instances, which may be either managers or workers, where a manager may be selected by voting or polling of workers. At the end of Phase 2, the atom objects have been created on individual workers.

In Phase 3, the manager process coordinates the execution of the graph calculation, and obtains the final results. In one embodiment, the execution may comprise two passes, a forward pass (or primary pass) to compute the value of the requested output, and a backward pass to compute the first order derivatives using adjoint algorithmic differentiation (AAD) if user also wants sensitivities. In another embodiment, the execution may comprise a single forward pass to compute the value of the requested output and forward algorithmic differentiation. In another embodiment, the execution may comprise two passes, a first forward pass to compute the value of the requested output, and a second forward pass to compute forward algorithmic differentiation. In some implementations, steps of execution don't have to be fully synchronized, for example, the manager may message a worker to start the backward AAD initialization, even when other workers are still running the forward calculation. However, a worker may block when it can no longer making any progress on its sub-graph, which may happen when it hasn't received the preceding inputs from other workers. Both managers and workers may run multiple tasks concurrently, so that they can send/receive messages while simultaneously running calculations. The concurrency may be implemented using multi-process, multi-threading, co-routines, or green threads. Once the computation is complete, the manager may message the right worker process to retrieve the results for any nodes. For example, the resulting distributed system may be utilized for solving numerical and analytical problems, such as those commonly found in scientific research, engineering, data science, statistical forecasting, simulation, time series analysis, business and financial modeling, and/or the like.

FIGS. 1B-C show an exemplary architecture in one embodiment of the DSGRCE. In FIGS. 1B-C, an embodiment of how a set of rules may be declared is illustrated. Declarations 130 may be used to describe a set of rules for calculating a Fibonacci series using recursion and pattern matching by values. A "@rules" indicator 135 signifies that a set of rules is being declared. A namespace 140 indicates that "series" is the namespace for this set of rules. In one implementation, rules from different namespaces may be referenced using their fully qualified names. For example, rules from other namespaces may refer to this set of rules using "series.fib". The "series" namespace includes three rules 142, 144, 146. In one implementation, a rule may be uniquely identified by the triplet [namespace, rulename, ruleparameters types/values], where rule parameter types/ values may be any data types/values defined in the hosting language of the DSL. For example, with regard to rule 142, the rule name 150 is "fib" and the rule has one parameter 152 of type "Int", which can match any integer value. In one implementation, each rule may specify an atom (e.g., a concrete DerivedAtom that implements a generic Atom interface described later) and a list of its constructor parameters. For example, with regard to rule 142, the atom name 154 is "Sum" and the atom does not take any parameters (e.g., square brackets may be ommitted). In another example, with regard to rule 144, the atom name 156 is "Const" and the atom takes a number as a parameter (e.g., Atom parameters are listed in order in square brackets). Each rule may identifiy a list of its precedences, which are the rules whose outputs (e.g., output tensors) are used as inputs (e.g., input tensors) to the current rule's forward pass computation function (e.g., fwd( )). Some rules may not have any precedences (e.g., accessing data sources). For example, with regard to rule 142, the rule has two precedences 158 "fib(n−1)" and "fib(n−2)" that may recursively refer to rule 142 or to rule 144 or to rule 146 depending on the value of "n".

In various implementations, rule declarations may support the following features:

1. Direct access to hosting language features: a rule may use hosting languages syntax and features in any of the parameter fields. For example, with regard to a rule such as:

```
pv(basket::Basket,
env::Env)=WeightedSum[basket.notionals]([pv(i, env) for
i=basket.insts]...)
```

"basket.insts" may be a syntax in the hosting language to access a data field of an object. Similarly, function calls and/or the hosting language's types (e.g., including user-defined types) may be utilized in rule declarations using the hosting language syntax.

2. Dynamic precedence: Rule precedence may be dynamic. For example, a declaration may use a list comprehension syntax such as "[pv(i) for i=basket.insts] . . . " to specify that the present value (pv) of a basket depends on the pv of every individual trade in the basket. The number and identity of precedence can depend on the rule parameters. This allows the creation of different logical graph topologies from the same set of rules when given different rule parameters. Besides the list comprehension, the full syntax features of the hosting language may be used for greater flexibility (e.g., the " . . . " syntax may be used with regular function calls in the hosting language to return a list of precedences). In one implementation, dynamic precedents of rules may be implemented by directly calling such dynamic precedence code (e.g., in the hosting language) at run time (e.g., when the rule engine is expanding the logical dependency graph).

3. Overloading and run time polymorphism by type and/or value: rules "fib" 142, 144, 146 are declared multiple times for different parameter types and values. At run time, the rule with the closest match to all the input parameters' types and values would take effect. In one implementation, the closeness of parameter types may be measured by the distance of their type inheritance. The rule overloading and pattern matching allow complicated business logic to be expressed succinctly.

4. Recursion: a rule can reference to itself as precedence, as shown with regard to rule 142.
5. Clone of namespace: the entire rules in a namespace may be cloned into another namespace. In one implementation, this results in two identical sets of rules in different namespaces. For example, with regard to declarations 160, any reference to namespace "series:dev" is created as a clone of namespace "series" using the "@clone" syntax 162. Additional rules 166 (e.g., that are not present in the old namespace) may be added to a cloned namespace. Such newly added rules may override existing rules cloned from the old namespace with the same rule name and parameters signature. In one implementation, namespace cloning may be implemented by adding a generic (e.g., matching for any rulename) entry in the rule lookup table. For example, when cloning namespace A to namespace B, a generic rule entry for namespace B is inserted into the rule lookup table data structure (e.g., this rule entry matches any reference to namespace B after the cloning). The rule compiler automatically generates code such that any reference to this entry B redirects to a rule lookup using namespace A, with rule names and other run time rule parameters unchanged.
6. Redirection of namespace: any reference to a namespace may be redirected to use another namespace. For example, with regard to declarations 160, any reference to namespace "series" may be redirected to use a rule of the same name under namespace "series:dev". Such redirection may use the syntax of the hosting language, and may be changed multiple times at run time. For example, in C++ syntax, the redirect call may look like:

namespaceRedirect(config,"series","series:dev")

where config is a meta parameter variable that is used at run time by the rule engine to create and execute the graph. For example, the clone and redirect features may allow a developer to create multiple meta parameters to compare the results between different redirections of namespaces side by side (e.g., to see how a change to an existing system affects results). In one implementation, namespace redirection may be implemented as one more layer of redirection (e.g., using an additional namespace lookup table, or the rule lookup table), which translates a namespace reference to the real namesp ace used for rule lookup. In the example discussed with regard to namespace cloning, after namespace A is cloned to namespace B, a user may add or override additional rules in namespace B. Afterwards, the user may redirect namespace A to B to force any reference to namespace A to use namespace B's overriding or additional rules. After such redirection instructions, a reference to a rule in namespace A is redirected to corresponding rule in namespace B via the namespace lookup table (e.g., implemented as a map of identification tuple (e.g., [namespace] tuple) to identification tuple (e.g., [namespace] tuple)), and the rule lookup is performed using namespace B. If the rule matches an overridden or new rule in namespace B, then the rule is chosen, otherwise, the generic rule entry for cloning namespace B matches and it falls back to the original rule declared in namesp ace A.
7. Package: a set of rules may be packaged together into a PackagedAtom, which supports the Atom API and behaves like a regular atom (e.g., it may be referred by other rules). This allows hiding and encapsulation of low-level logic (e.g., complex logic may be constructed by recursively interleaving rules and atoms). For example, declarations 170 may be used to describe a set of rules for calculating a Fibonacci series, but using a packaged atom that allows Tensors instead of scalers to be used as initial values.

In some implementations, the rule DSL may exclude a set of programming language features such as functions, types, variables, loops, branches, exceptions, and/or the like (e.g., which may exist in the hosting language). The minimal set of syntax features may facilitate analysis of the overall logic defined by the rules and creation of an optimized distributed system that implements the correct logic by the DSGRCE. Further, the minimal set of syntax features makes the rules easy for non-programmers to understand and author.

In one embodiment, an atom may be a low level atomic numerical algorithm implemented in the hosting language. In one implementation, an atom represents a generic mathematical function of:

$$(\vec{y}_1, \vec{y}_2, \ldots, \vec{y}_m) = f(\vec{x}_1, \vec{x}_2, \ldots, \vec{x}_n)$$

whose inputs are n tensors $\vec{x}_i$, and outputs are m tensors of $\vec{y}_j$. A tensor is a multi-dimensional array of numbers, and its elements are indexed by a vector of integers. The dimensionality of a tensor is commonly referred as its rank. A tensor of rank 0, 1, 2 is scalar, vector and matrix respectively. Each input and output tensor may have different ranks and dimensions.

In one implementation, an atom is atomic with respect to the DSL (e.g., with the exception of the aforementioned packaged atoms, which behave like regular atoms but have inner structure that a developer may inspect), it carries out a potentially sophisticated numerical calculation in the hosting language, such as root search, optimization or partial differential equation (PDE) solver, and/or the like.

In one implementation, an atom encapsulates a generic interface Atom in the hosting language. Concrete derived types of DerivedAtom may inherit from the Atom interface, and may implement the following operations or methods from the generic interface Atom:

DerivedAtom(xdim::Collection, ps::Collection): the creation function, or commonly referred to as constructor or factory function, of an instance of the type DerivedAtom. The xdim and ps are the parameters to the DerivedAtom constructor, the xdim is the input tensor dimensions, whereas the parameter ps is a collection of parameters for creating a DerivedAtom instance, which may include any data type supported by the hosting programming language. Two atom objects are logically identical and refer to the same mathematical function if they have identical DerivedAtom and parameters xdim and ps.

dim(a::Atom): returns the rank and dimension of the input and output tensors of an atom a, which was created by the DerivedAtom constructor.

fwd(a::Atom, xs::Vector{Tensor}): the forward calculation operation of the atom, which corresponds to the mathematical function of $(\vec{y}_1, \vec{y}_2, \ldots, \vec{y}_m) = a(\vec{x}_1, \vec{x}_2, \ldots, \vec{x}_n)$, where the object a is an instance of Atom created by a constructor.

back(a::Atom, ys::Vector{Tensor}, xs::Vector{Tensor}, jacys::Vector{Tensor}, jacxs::Vector{Tensor}): the backward calculation operation of the atom, which is utilized for backward AAD. Its inputs are:

$$xs = (\vec{x_1}, \vec{x_2}, \ldots, \vec{x_n}), ys = (\vec{y_1}, \vec{y_2}, \ldots, \vec{y_n}),$$

$$jacys = \left(\frac{\partial \vec{u}}{\partial \vec{y_1}}, \frac{\partial \vec{u}}{\partial \vec{y_2}}, \ldots, \frac{\partial \vec{u}}{\partial \vec{y_n}}\right),$$

and its output is $$jacxs = \left(\frac{\partial \vec{u}}{\partial \vec{x_1}}, \frac{\partial \vec{u}}{\partial \vec{x_2}}, \ldots, \frac{\partial \vec{u}}{\partial \vec{x_n}}\right),$$

where xs and ys are already computed from the fwd( ) method. The tensor $\vec{u}$ is specified by the user and may be any (e.g., intermediate) results that the user wishes to analyze for sensitivities, and which may depend on both ys and xs;

$$\frac{\partial \vec{a}}{\partial \vec{b}}$$

represents the Jacobian tensor of $\vec{a}$ to $\vec{b}$, whose rank is the sum of the ranks of $\vec{a}$, $\vec{b}$. In some embodiments, a default implementation of back( ) for the base Atom type may be provided using numerical finite difference as a fall back if the developer did not provide a fast implementation of analytical back( ) function. In some embodiments, the Atom interface may have a separate fwdad( ) method that has identical function signature as the back( ) method, which is used for automatic forward AD implementation. The main difference in fwdad( ) method is that the jacxs is input and jacys is output, which is the opposite of the back( ) function.

In one implementation, a DerivedAtom may be implemented as a user defined data type in object-oriented programming languages, where the Atom interfaces would be virtual functions or methods of the DerivedAtom. The function names, such as fwd, back, and fwdad, are insignificant and may differ in various implementations.

In one embodiment, a PackagedAtom may be utilized to encapsulate complicated analytical logic into a single atom, leading to significant improvements in system's consistency, transparency and logical clarity. For example, while low level numerical algorithms, such as weighted average and regression, may be implemented using an atom, more sophisticated numerical algorithms that are typically used as a single atomic algorithm, such as the cubic spline interpolation, may be implemented using another atom or multiple atoms (e.g., a cubic spline interpolation atom may be implemented by declaring a few rules that include a Thomas Algorithm atom). While this approach is simple, reusable and consistent, the inner logic (e.g., of the cubic spline interpolation algorithm) is fully exposed to users (e.g., who may not care or need to know about the inner logic of the cubic spline interpolation algorithm provided for their use). Fully expanding and exposing the inner logic complicates the resulting logical dependency graph, and may make it more difficult and tedious for a typical user to visualize, navigate and understand the higher level business and analytical logic the user is working on.

In one implementation, the DSGRCE supports a special syntax (e.g., @package) to allow a developer to declare a packaged atom (e.g., see declarations 170) using rules. The DSGRCE may automatically create a packaged atom from such declarations using a PackagedAtom type that may inherit from the Atom interface. A PackagedAtom may be used and referenced by rules like any other Atom, and may appear to a typical user as an "atomic" unit. However, a PackagedAtom may have its own private internal logical dependency graph, which is automatically created at run time by the DSGRCE. For example, the cubic spline interpolation PackagedAtom may have an internal logical dependency graph that references a Thomas Algorithm DerivedAtom. In one implementation, the DSGRCE may provide GUI support for users to drill down to the inner graph of a PackagedAtom, giving full access to those users who wish to inspect the data and/or logical lineage inside a packaged atom. A PackagedAtom may implement operations or methods from the generic interface Atom as follows:

PackagedAtom: the creation function, or commonly referred to as constructor or factory function, of an instance of the type PackagedAtom. The declaration of a packaged atom specifies a list of input rules (e.g., the parameter list at 170). The DSGRCE retrieves these input rules, creates an in-memory logical dependency graph, and adds nodes corresponding to each input rule, without adding their precedents that are not part of the inputs. If an input node depends on another input node, an edge is added between them to capture the dependency. The result is an inner logical dependency graph that contains the input nodes and edges between them. The declaration of the packaged atom also specifies an output rule (e.g., the rule in the last return statement at 170). The output node and its precedents are recursively added to the inner logical dependency graph. The recursion stops at any of the input nodes, so that the input nodes' precedents are not added to the logical graph. Thus, the DSGRCE constructs a logical dependency graph that starts from input nodes, and produce the output node. If the output node has any (e.g., recursive) precedent that is not a dependent of any of the input node, an error may be thrown as the list of inputs is not sufficient to uniquely determine the result of the output nodes. The user may fix the error by adding additional inputs to the packaged atom declaration. Once the logical dependency graph is created, the corresponding atoms may be instantiated in memory by traversing the graph, and memory utilized for subsequent calculations may be pre-allocated.

dim: the input and output atoms' dim( ) methods may be called to determine the proper input and output size of the entire calculation.

fwd: the xs value in the argument of the fwd( ) call may be copied (or linked) to the pre-allocated memory of the inner graph, and the inner graph may be traversed accordingly following its dependency. For each atom in the inner graph, the atom's fwd( ) method may be called, until the final output is computed. The result of the final output may be copied to the ys argument in the fwd( ) call.

back: the values in the jacys, ys, and xs arguments of bac( ) may be copied (or linked) to the pre-allocated memory of the inner graph, and jacxs matrices may be initialized to zeroes. The inner graph may be traversed in the opposite order of the fwd( ) calculation, and each atom's back( ) method may be called in turn to propagate the Jacobian matrix backwards, until the input nodes have been processed. Then the resulting Jacobians to the input nodes may be added to the corresponding jacxs of the arguments to the back( ) of the PackagedAtom. Alternatively, the jacxs values in the back( ) argument may be copied to the pre-allocated memory of the Jacobians to the inputs of the inner graph at the beginning of back( ), and then the resulting Jacobian to the inputs of the inner graph (after the backward run) may be copied to the jacxs of the PackagedAtom.

In one implementation, the entire inner graph of a packaged atom may be in the same memory space as the calling process (e.g., a worker process). In another implementation, the inner graph of a packaged atom may be distributed across multiple processes or computers connected by a network in a similar manner as described with regard to distributing a logical dependency graph. The inner graph of a packaged atom may reference any atom, including another packaged atom. Therefore, a user may create a hierarchy of packaged atoms with arbitrary depth to express and encapsulate very complicated business and/or analytical logic, while simplifying the logic and data lineage view at each layer of the hierarchy. In one implementation, the DSGRCE may provide GUI support for users to navigate through the layers of the packaged atoms to access and/or inspect the data and/or logic of any layer.

Even though a tensor is the most generic input and output type of an atom, in some implementations, the programming interface and implementation may be simplified by using low ranking tensors for inputs and/or outputs. For example, an implementation could choose to restrict xs and ys inputs/outputs to vectors (rank 1 tensor). In such an implementation, higher ranked tensor inputs and/or outputs may be encoded as a collection of vectors.

Figure 2A:
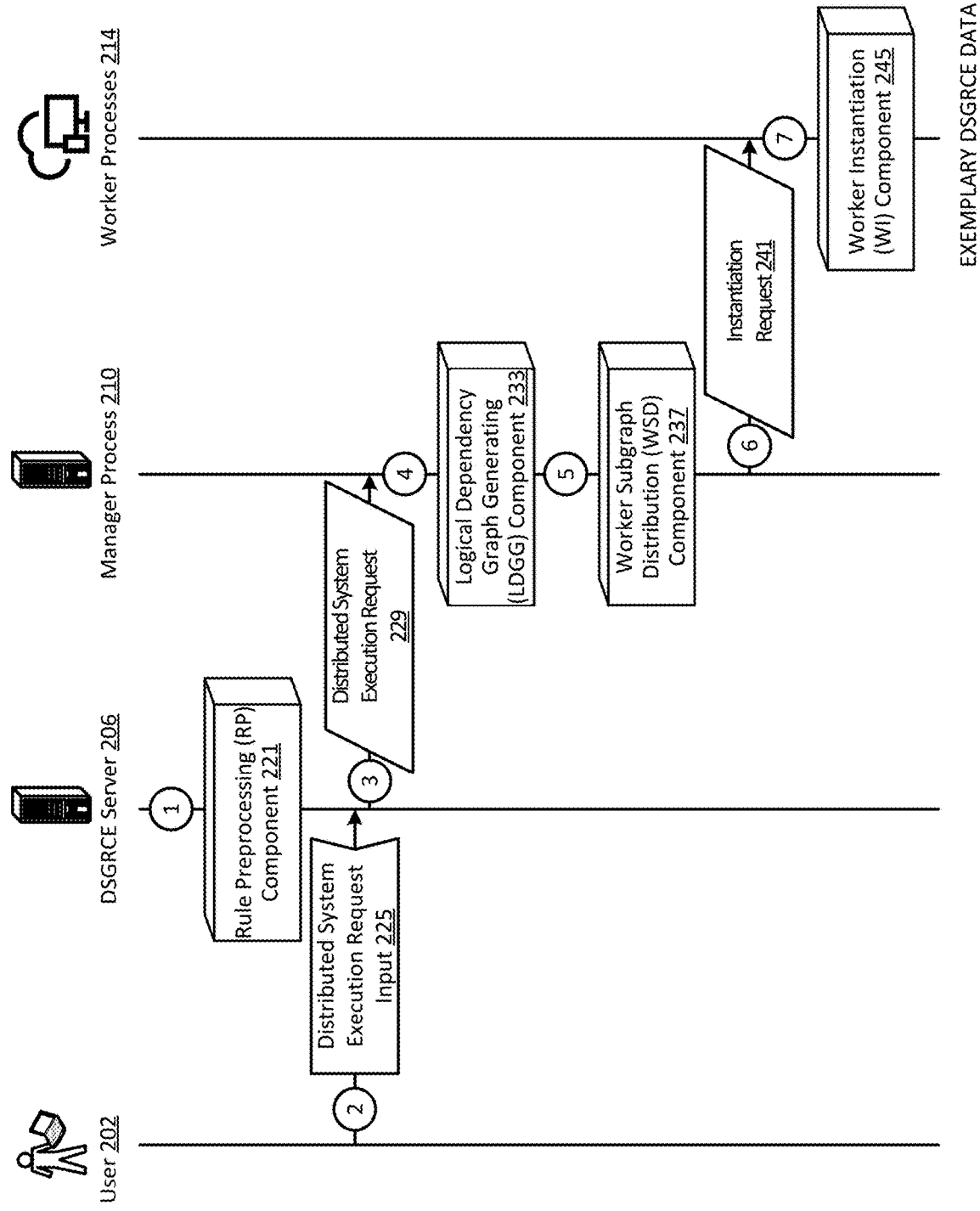
FIGS. 2A-B show a data flow diagram in one embodiment of the DSGRCE.
Figure 2B:
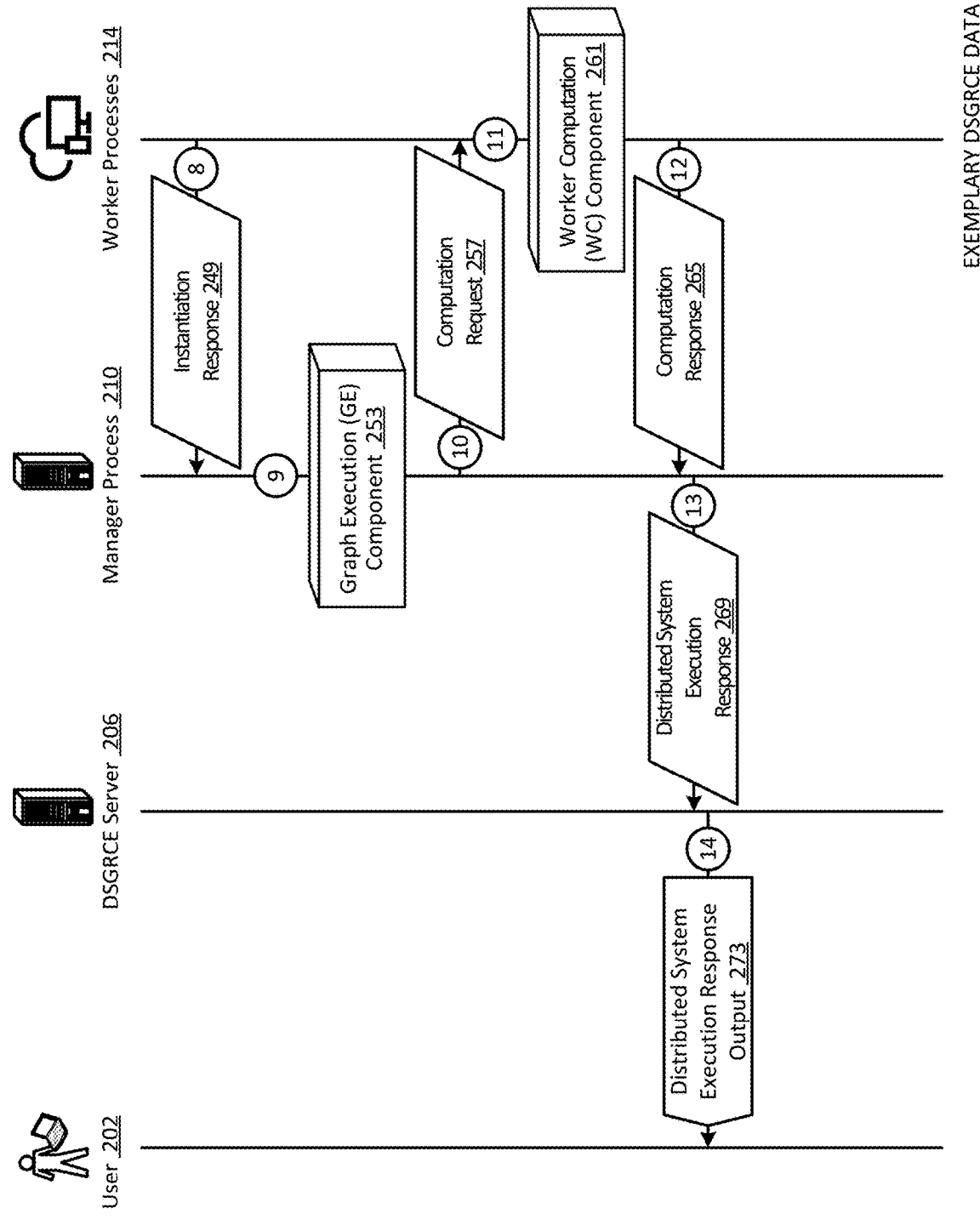

FIGS. 2A-B show a data flow diagram in one embodiment of the DSGRCE. FIGS. 2A-B provide an example of how data may flow to, through, and/or from the DSGRCE. In FIGS. 2A-B, a rule preprocessing (RP) component 221 may parse a set of rules to generate data structures that link rules and atoms, allow rule lookup, provide support for value and/or type polymorphism, and/or the like. See FIG. 3 for additional details regarding the RP component.

A user 202 may send a distributed system execution request input to a DSGRCE server 206 to facilitate execution of a specified calculation using the set of rules. In one embodiment, the user may use a client (e.g., a desktop, a laptop, a tablet, a smartphone, a smartwatch) to access a DSGRCE website, application (e.g., a desktop application, a mobile app), and/or the like to facilitate generating the distributed system execution request input. In one implementation, the distributed system execution request input may include data such as a request identifier, user credentials, a calculation specification, and/or the like. For example, the distributed system execution request input may be sent via a network in XML format substantially in the following form:

```
<?XML version ="1.0" encoding ="UTF-8"?>
<distributed_system_execution_request_input>
    <request_identifier>ID_request_1</request_identifier>
    <user_identifier>ID_user_1</user_identifier>
    <credential_token>user's credential token for authentication
    </credential_token>
    <calculation_specification>series.fib(10)</calculation_specification>
</distributed_system_execution_request_input>
```

The DSGRCE server 206 may send a distributed system execution request 229 to a manager process 210 to facilitate generating a distributed system that executes the specified calculation. In one embodiment, the manager process may be a separate process from the DSGRCE server (e.g., running on different hardware). In another embodiment, the manager process may be a component of the DSGRCE server (e.g., running on the same hardware in the same process and memory space as the DSGRCE server). In one implementation, the distributed system execution request may include data such as a request identifier, a calculation specification, an execution complexity gauge, available workers specification, communications overhead settings, and/or the like. For example, the distributed system execution request may be sent via a network in XML format substantially in the following form:

```
<?XML version ="1.0" encoding ="UTF-8"?>
<distributed_system_execution_request>
    <request_identifier>ID_request_2</request_identifier>
    <calculation_specification>series.fib(10)</calculation_specification>
    <execution_complexity_gauge>
        NETWORK_DATA_TRANSFER_SIZE
    </execution_complexity_gauge>
    <available_workers_specification>
        <type>FIXED</type>
        <number_of_available_workers>6
        </number_of_available_workers>
    </available_workers_specification>
    <communications_overhead>DUPLICATE_HOT_NODES
    </communications_overhead>
</distributed_system_execution_request>
```

A logical dependency graph generating (LDGG) component 233 may utilize data provided in the distributed system execution request to facilitate constructing a global logical dependency graph (LDG) of the specified calculation. See FIG. 4 for additional details regarding the LDGG component.

A worker subgraph distribution (WSD) component 237 may divide the global logical dependency graph into multiple sub-graphs (e.g., according to the number of available worker processes and their hardware resources) and/or may instantiate worker processes. See FIG. 5 for additional details regarding the WSD component.

The manager process 210 may send one or more instantiation requests 241 to one or more worker processes 214 to instantiate the worker processes and/or to provide each worker process with its respective sub-graph of the global logical dependency graph. In some embodiments, the worker processes may execute in a cloud computing environment (e.g., the manager process and/or the DSGRCE server may also execute in the cloud computing environment or may execute in a separate environment). In one implementation, an instantiation request may include data such as a request identifier, a worker process identifier, an LDG subgraph specification, a communication mode, workers network configuration, shared cache network configuration, subgraph nodes remote precedences and/or dependencies specification, and/or the like. For example, the instantiation request may be sent via a network in XML format substantially in the following form:

```xml
<?XML version ="1.0" encoding ="UTF-8"?>
<instantiation_request>
    <request_identifier>ID_request_3</request_identifier>
    <worker_process_identifier>ID_worker_1</worker_process_identifier>
    <LDG_subgraph>LDGsubgraph specification (e.g., in DAGformat)<ILDG_subgraph>
    <communication_mode>WORKER_TO_WORKER</communication_mode>
    <workers_network_configuration>
        <worker>
            <worker_process_identifier>ID_worker_1</worker_process_identifier>
            <worker_IP_address>10.0.0.155:6777</worker_IP_address>
        </worker>
        <worker>
            <worker_process_identifier>ID_worker_2</worker_process_identifier>
            <workeriLaddress>10.0.0.57:6777</workeriLaddress>
        </worker>
        <worker>
            <worker_process_identifier>ID_worker_3</worker_process_identifier>
            <workeriLaddress>10.0.0.175:6777</workeriLaddress>
        </worker>
        ...
    </workers_network_configuration>
    <subgraph_nodes_links>
        <node>
            <node_identifier>ID_node_11</node_identifier>
            <precedences>
                ID_worker_2:1D_Node_22, ID_worker_3:1D_Node_35
            </precedences>
            <dependencies>ID_worker_6:ID_Node_62</dependencies>
        </node>
        <node>
            <node_identifier>ID_node_12</node_identifier>
            <precedences>NONE</precedences>
            <dependencies>
                ID_worker_5:1D_Node_53, ID_worker_6:1D_Node_66
            </dependencies>
        </node>
        <node>
            <node_identifier>ID_node_13</node_identifier>
            <precedences>NONE</precedences>
            <dependencies>NONE</dependencies>
        </node>
        ...
    </subgraph_nodes_links>
</instantiation_request>
```

It is to be understood that, in some implementations, a binary representation may be used (e.g., instead of XML) when sending DSGRCE messages (e.g., inputs, outputs, requests, responses) to reduce network data transfer.

A worker instantiation (WI) component 245 may utilize data provided in an instantiation request to instantiate the respective worker process and/or to establish communication links with other worker processes (e.g., that are remote precedences and/or remote dependencies). See FIG. 6 for additional details regarding the WI component.

The one or more worker processes 214 may send one or more instantiation responses 249 to the manager process 210 to inform the manager process that a respective worker process instantiated successfully. In one implementation, an instantiation response may include data such as a response identifier, a status, and/or the like. For example, the instantiation response may be sent via a network in XML format substantially in the following form:

```xml
<?XML version ="1.0" encoding ="UTF-8"?>
<instantiation_response>
    <response_identifier>ID_response_3</response_identifier>
    <status>OK</status>
</instantiation_response>
```

A graph execution (GE) component 253 may coordinate the execution of the specified calculation and/or provide the final results. See FIG. 7 for additional details regarding the GE component.

The manager process 210 may send one or more computation requests 257 to the one or more worker processes 214 to instruct a set of worker processes to perform a computation. In one implementation, a computation request may include data such as a request identifier, a worker process identifier, a request type, subgraph nodes to run, and/or the like. For example, the computation request may be sent via a network in XML format substantially in the following form:

```xml
<?XML version ="1.0" encoding ="UTF-8"?>
<computation_request>
    <request_identifier>ID_request_4</request_identifier>
    <worker_process_identifier>ID_worker_1</worker_process_identifier>
    <request_type>CALCULATE_FORWARD</request_type>
    <subgraph_nodes_to_run>ID_node_12, ID_node_13, ...
    </subgraph_nodes_to_run>
</computation_request>
```

A worker computation (WC) component 261 may utilize data provided in a computation request to facilitate execution of the requested computation by the respective worker process. See FIGS. 8A-C for additional details regarding the WC component.

The worker processes 214 may send a computation response 265 to the manager process 210 with results of the requested computation (e.g., a confirmation that initialization was completed successfully; the final results of the specified calculation). In one implementation, the computation response may include data such as a response identifier, a status, the requested computation results, and/or the like. For example, the computation response may be sent via a network in XML format substantially in the following form:

```
<?XML version ="1.0" encoding ="UTF-8"?>
<cornputation_response>
    <response_identifier>ID_response_4</response_identifier>
    <status>OK</status>
    <computation_results>[55; 30; 73]</computation_results>
</computation_response>
```

In an alternative implementation, the computation response may be used to provide the status, and separate computation result retrieval request/response messages may be utilized by the manager process and the worker processes to transfer computation results. Such separation between execution and data retrieval may allow the manager process to retrieve previously computed data without trigger a recalculation by sending a computation result retrieval request.

The manager process 210 may send a distributed system execution response 269 to the DSGRCE server 206 with results for the specified calculation. In one implementation, the distributed system execution response may include data such as a response identifier, a status, the requested calculation results, and/or the like. For example, the distributed system execution response may be sent via a network in XML format substantially in the following form:

```
<?XML version ="1.0" encoding ="UTF-8"?>
<distributed_system_execution_response>
    <response_identifier>ID_response_2</response_identifier>
    <status>OK</status>
    <calculation_results>[55; 30; 73]</calculation_results>
    <sensitivities>sensitivities for the calculation</sensitivities>
</distributed_system_execution_response>
```

In an alternative implementation, the distributed system execution response may be used to provide the status, and separate computation result retrieval request/response messages may be utilized by the DSGRCE server and the manager process to transfer computation results. Such separation between execution and data retrieval may allow the DSGRCE server to retrieve previously computed data without trigger a recalculation by sending a computation result retrieval request.

The DSGRCE server 206 may send a distributed system execution response output 273 to the user 202 with results for the specified calculation. In one embodiment, the user's client may be instructed to display the requested results. In one implementation, the distributed system execution response output may include data such as a response identifier, a status, the requested calculation results, and/or the like. For example, the distributed system execution response output may be sent via a network in XML format substantially in the following form:

```
<?XML version ="1.0" encoding ="UTF-8"?>
<distributed_system_execution_response_output>
    <response_identifier>ID_response_1</response_identifier>
    <status>OK</status>
    <calculation_results>[55; 30; 73]</calculation_results>
    <sensitivities>sensitivities for the calculation</sensitivities>
</distributed_system_execution_response_output>
```

In an alternative implementation, the distributed system execution response output may be used to provide the status, and separate computation result retrieval request input/response output messages may be utilized by the user and the DSGRCE server to query computation results. Such separation between execution and data retrieval may allow the user to retrieve previously computed data without trigger a recalculation by sending a computation result retrieval request input.

Figure 3:
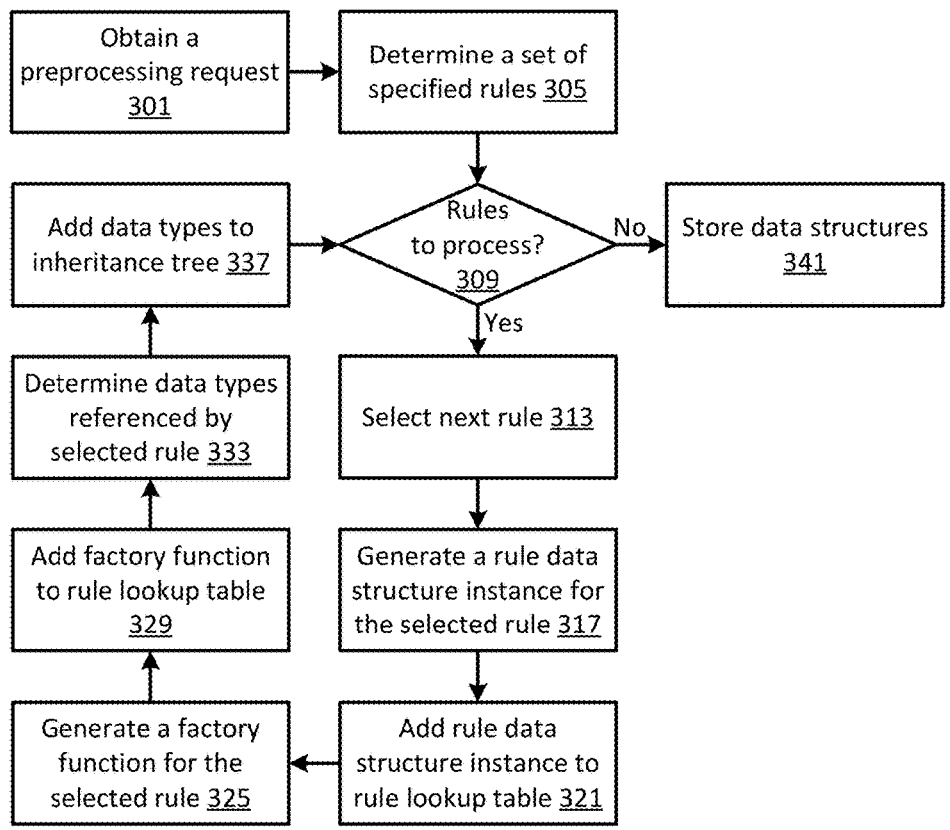
FIG. 3 shows a logic flow diagram illustrating a rule preprocessing (RP) component in one embodiment of the DSGRCE.

FIG. 3 shows a logic flow diagram illustrating a rule preprocessing (RP) component in one embodiment of the DSGRCE. In FIG. 3, a preprocessing request may be obtained at 301. For example, the preprocessing request may be obtained as a result of compilation (e.g., requested by a developer user) of a set of specified rules.

The set of specified rules may be determined at 305. In one implementation, one or more specified files with rule declarations written in the DSL may be parsed to determine the set of specified rules.

A determination may be made at 309 whether there remain rules to process. In one implementation, each of the rules in the set of specified rules may be processed. If there remain rules to process, the next rule may be selected for processing at 313.

A rule data structure instance for the selected rule may be generated at 317. In one implementation, the rule data structure may be a Rule type that stores information regarding the selected rule, such as namespace, name, rule parameters, atom name, atom parameters, precedent rules, meta data (e.g., author, copyright, developer, supporter, documentation URL), and/or the like, which may be generated based on parsing the selected rule's declaration. For example, information in rule data structures (e.g., precedent rules) may be used to construct a rule dependency graph (e.g., by recursively traversing through the precedent rules).

The rule data structure instance for the selected rule may be added to a rule lookup table at 321. For example, the rule lookup table may be utilized to facilitate quick lookup of declared Rule instances. In one implementation, the rule lookup table may be keyed by a rule's identification tuple (e.g., [namespace, rulename] tuple) to a set (e.g., a list) of Rule instances. For example, a reference (or pointer) to the selected rule's Rule instance may be added to the list of references associated with the selected rule's [namespace, rulename] tuple. In some alternative implementations, the rule lookup table may instead be keyed by a rule's hash value calculated based on a rule's identification tuple.

A factory function for the selected rule may be generated at 325. In one implementation, a factory function that takes the selected rule's parameters as input and creates a corresponding Atom object by calling its constructor may be generated by the rule compiler in the hosting language. Such a factory function may handle any of the transformations (e.g., accessing a data field of an object; calculations) from the selected rule's parameters to the Atom constructor.

The factory function may be added to the rule lookup table at 329. In one embodiment, the factory function and the selected rule's Rule instance may have a 1 to 1 association. Accordingly, in one implementation, the factory function's name (or pointer) may be stored with the selected rule's Rule instance (e.g., as a data field of a Rule object; as part of a [list of Rule instances, factory function name] tuple keyed by a rule's identification tuple). In some alternative implementations, the factory function's name (or pointer) may instead be stored in a separate lookup table (e.g., keyed by a rule's identification tuple). In some alternative implementations, in lieu of an explicit look up table of rule data structure, code that calls the appropriate lookup function as specified by the rules may be automatically generated, and a table of function pointers may be created.

Data types of the hosting language referenced by the selected rule may be determined at 333. For example, with regard to rule 142, "Int" data type of the hosting language is referenced by this rule. In one implementation, the rule declaration of the selected rule may be parsed to determine the set of data types of the hosting language referenced by the selected rule. For example, this may be done at compile time for compiled languages such as C/C++. In another implementation, run time type inheritance information may be determined (e.g., for hosting languages that support reflection). For example, this may be done at run time for languages such as Java and .NET.

The determined data types may be added to an inheritance tree at 337. For example, the inheritance tree may track data types of the hosting language referenced by the rules in the set of specified rules. In one implementation, the inheritance tree may be a single inheritance-based tree, where each type has a single parent type. For host languages that support reflection, such as .NET, the inheritance tree may be constructed at the run time. For static host languages, such as C++, the inheritance tree may be constructed by parsing the source code, or by relying on a special data type that tracks the inheritance hierarchy, or by using a base C++ data type to automatically track inheritance.

The created data structures (e.g., rule data structure instances, the rule lookup table, the inheritance tree) may be stored (e.g., in a data store) at 341. In one implementation, the created data structures may be stored as a shared library at compile time. In another implementation, the created data structures may be stored in memory at run time. Some modern programming languages (e.g., Julia) support run time multiple dispatch. In such host languages, rules may be implemented by generating code that calls the right Atoms as generic methods. In such an implementation, multiple dispatch capability of the host language may be utilized instead of keeping an explicit type inheritance hierarchy.

Figure 4:
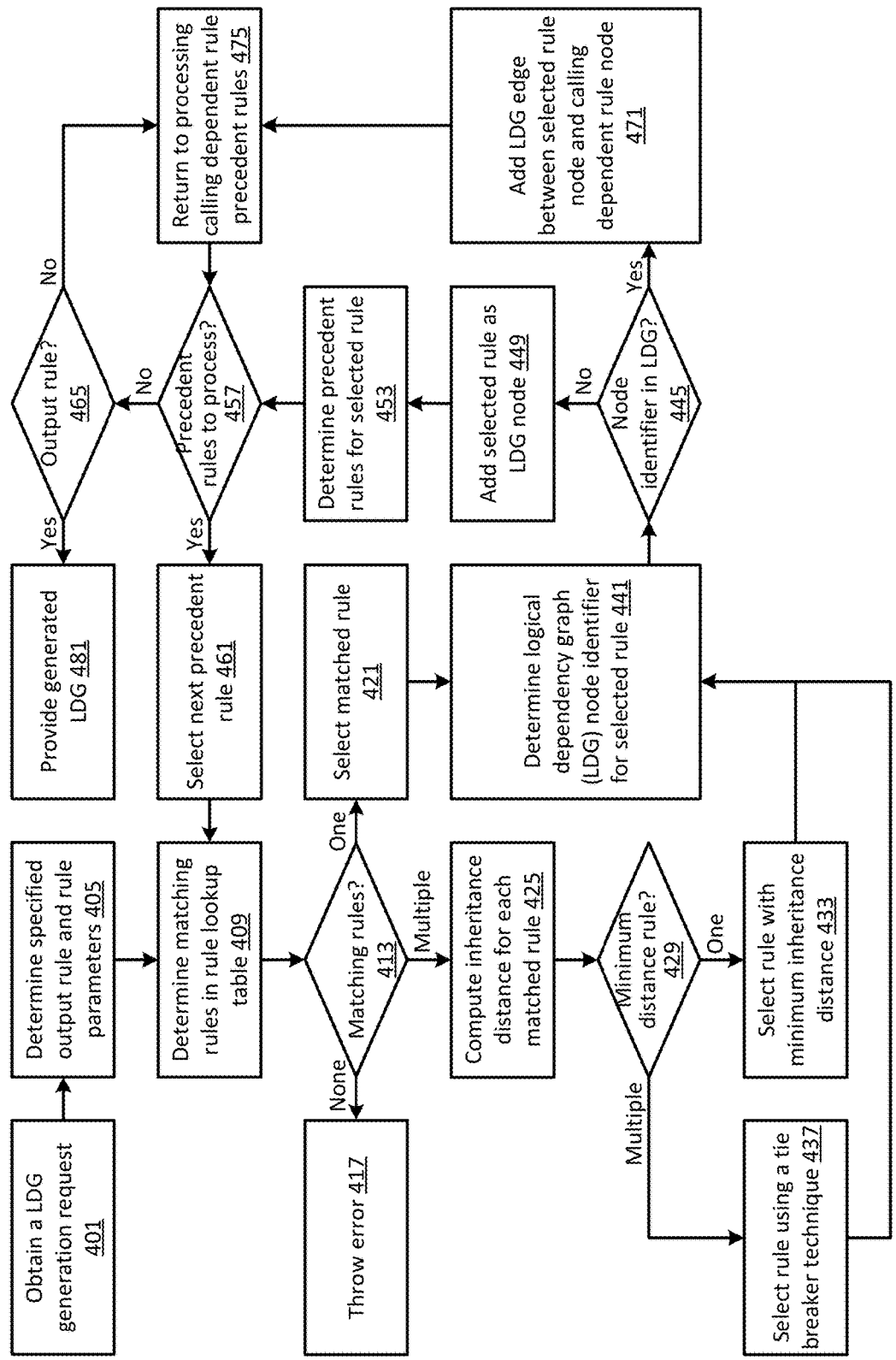
FIG. 4 shows a logic flow diagram illustrating a logical dependency graph generating (LDGG) component in one embodiment of the DSGRCE.

FIG. 4 shows a logic flow diagram illustrating a logical dependency graph generating (LDGG) component in one embodiment of the DSGRCE. In FIG. 4, an LDG generation request may be obtained at 401. For example, the LDG generation request may be obtained as a result of a user's request to perform a specified calculation using the set of specified rules. It is to be understood that while the below description discusses generating the LDG for a single output rule, the LDGG component may also be utilized with multiple output rules by utilizing elements 405 through 465 for each output rule.

A specified output rule and rule parameters may be determined at 405. In one embodiment, the user may provide a list of desired output represented as a set of output rules with concrete parameterization, such as "series.fib(10)". In one implementation, a distributed system execution request may be parsed to determine the specified output rule and/or rule parameters (e.g., based on the value of the calculation specification field).

A set of matching rules in the rule lookup table (e.g., corresponding to the specified output rule; corresponding to a selected precedent rule) may be determined at 409. In one implementation, the current rule's (e.g., the specified output rule's; a selected precedent rule's) identification tuple (e.g., "[series, fib]" tuple) may be determined and used to look up a list of matching Rule instances from the lookup table (e.g., corresponding to "fib(n::Int)", "fib(n::Int(0))", "fib (n::Int (1))").

A determination may be made at 413 whether any matching rules have been found. If no matching rules have been found, the DSGRCE may throw an error at 417. For example, the DSGRCE may inform the user that the specified output rule is invalid. In another example, the DSGRCE may inform the user that a selected precedent rule is invalid.

If a single matching rule has been found, and the number and types (and/or values) of the run time rule parameters match those in the rule declaration, the matched rule may be selected at 421. A logical dependency graph node identifier for the selected matched rule may be determined at 441. In one implementation, the LDG node identifier for the selected matched rule may be determined as a node identification tuple (e.g., the triplet [namespace, rulename, ruleparameters]). In another implementation, the LDG node identifier for the selected matched rule may be determined as a hash value of the node identification tuple (e.g., a hash value of the triplet [namespace, rulename, ruleparameters]).

If multiple matching rules have been found, an inheritance distance for each matched rule may be computed at 425. In one embodiment, an inheritance distance for a matched rule may be computed as the sum of the distances between the actual run time type of each rule parameter and the type declared in the matched rule via DSL. In one implementation, a run time parameter that matches the exact type in the rule DSL may be assigned a distance of 0, a run time parameter that has a single level of inheritance may be assigned a distance of 1, etc., while a run time parameter with an exact value match may have a distance of −1. For example, with regard to "series.fib(10)", the inheritance distance for "fib(n::Int)" may be computed as 0, while "fib(n::Int(0))" and "fib(n::Int(1))" are not matched. In another example, with regard to "series.fib(1)", the inheritance distance for "fib(n::Int(1))" may be computed as −1, the inheritance distance for "fib(n::Int)" may be computed as 0, while "fib(n::Int(0))" is not matched. In an alternative implementation, the rule matching may be implemented based on the run time multiple dispatch, if the host language supports such features.

A determination may be made at 429 whether there is a single matching rule with the minimum inheritance distance. If so, the matching rule with the minimum inheritance distance may be selected at 433. If not, an error may be thrown or a matching rule may be selected using a tie breaker technique (e.g., based on position of parameters) at 437. In one implementation, a matching rule may be selected using the tie breaker technique based on position of parameters (e.g., the first parameter is the most important for selection, the second parameter is the second most important for selection, etc.). In another implementation, a matching rule may be selected using the tie breaker technique based on types (e.g., different types of the hosting language may have different priorities with regard to the selection). A logical dependency graph node identifier for the selected matched rule may be determined at 441 as discussed above.

A determination may be made at 445 whether an LDG node with the determined LDG node identifier already exists in the LDG. If not, an LDG node for the selected matched rule (e.g., with the Rule instance corresponding to the selected matched rule) may be added to the LDG (e.g., implemented as a DAG) with the determined LDG node identifier at 449. For example, an LDG node may be structured as follows:

```
//additional information may be looked up using a hash value of
//the node identification tuple
struct LogicalGraphNode
    String ns; //namespace
    String name; //rule name
    Vector parameters; //list of parameters of concrete values
end
```

If the selected matched rule is a precedent to an existing node (e.g., this would be the case when processing precedent rules, but not when processing the specified output rule), an LDG edge may be added between the newly added LDG node and the existing dependent LDG node. For example, with regard to "seriesfib(10)", an LDG node with node identification tuple "[series, fib, 10]" may be added. In another example, with regard to "series.fib(9)", an LDG node with node identification tuple "[series, fib, 9]" may be added, and an LDG edge may be added between the newly added LDG node and the existing dependent node "[series, fib, 10]". In an alternative implementation, if an LDG node is new, the node's precedents may be recursively added before adding the node itself (e.g., for each precedent an edge may be added to the graph). For example, with regard to "series.fib(10)", after adding LDG nodes with node identification tuples "[series, fib, 9]" and "[series, fib, 8]" (e.g., recursively, LDG nodes with node identification tuples "[series, fib, 7]" and "[series, fib, 6]" are added before adding "[series, fib, 8]"), an LDG node with node identification tuple "[series, fib, 10]" may be added and LDG edges may be added between the newly added LDG node and its precedent nodes "[series, fib, 9]" and "[series, fib, 8]".

Precedent rules for the selected matched rule may be determined at 453. In one implementation, the rule data structure, from the rule lookup table, corresponding to the selected matched rule may be queried to determine the precedent rules. For example, with regard to "series.fib(10)", the precedent rules may be "series.fib(9)" and "series.fib(8)". In another example, with regard to "series.fib(9)", the precedent rules may be "series.fib(8)" and "series.fib(7)". In another example, with regard to "series.fib(1)", there may not be any precedent rules.

A determination may be made at 457 whether there remain precedent rules for the selected matched rule (e.g., a calling dependent rule) to process. In one implementation, each of the determined precedent rules may be processed. If there remain precedent rules to process, the next precedent rule may be selected at 461. The selected precedent rule may be processed as discussed above starting with element 409. Thus, the LDGG component may construct a global logical dependency graph by recursively following and adding precedent rules as new nodes to the LDG, starting from the output node corresponding to the specified output rule.

If there do not remain precedent rules to process, a determination may be made at 465 whether the current rule is the specified output rule. If the current rule is not the specified output rule, the LDGG component may return to processing precedent rules of the current rule's calling dependent rule at 475. For example, with regard to "series-.fib(9)", once precedent rules "series.fib(8)" and "series.fib(7)" have been processed, the LDGG component may return to processing precedent rule "series.fib(8)" of the calling dependent rule "series.fib(10)". If the current rule is the specified output rule, the LDGG component may provide the generated LDG at 481. For example, a reference to the generated LDG (e.g., stored in memory) may be provided.

If it is determined at 445 that the LDG node with the determined LDG node identifier already exists in the LDG, an LDG edge may be added between the existing LDG node with the determined LDG node identifier and the LDG node associated with the calling dependent rule at 471. For example, with regard to processing "series.fib(8)" with recursive dependency "serieslib(10)", if the LDG node with node identification tuple "[series, fib, 8]" was already added to the LDG while processing "series.fib(9)", an LDG edge may be added between the LDG node with node identification tuple "[series, fib, 8]" and the calling dependent rule node "[series, fib, 10]". The LDGG component may return to processing precedent rules of the current rule's calling dependent rule starting at 475 as discussed above.

Figure 5:
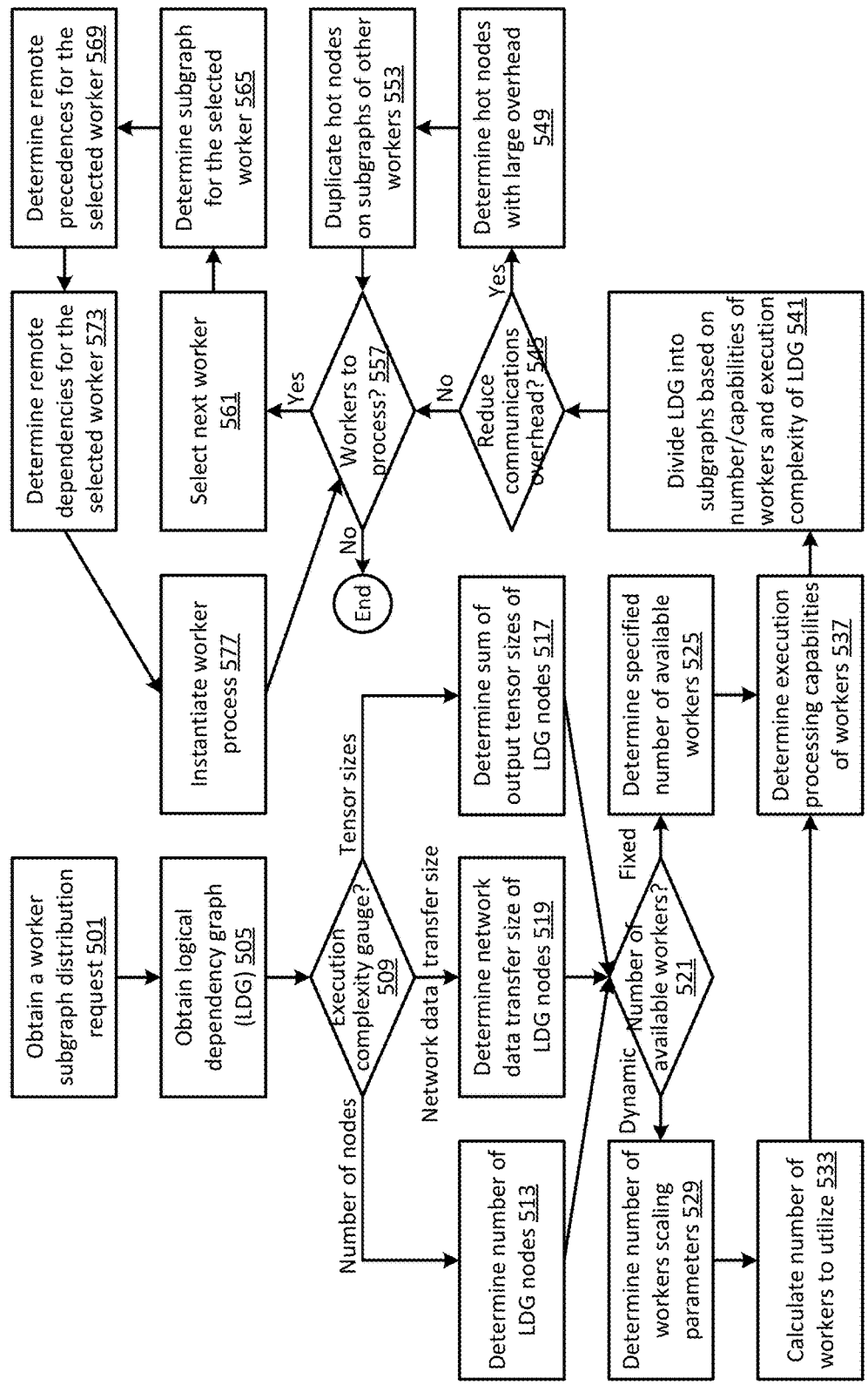
FIG. 5 shows a logic flow diagram illustrating a worker subgraph distribution (WSD) component in one embodiment of the DSGRCE.

FIG. 5 shows a logic flow diagram illustrating a worker subgraph distribution (WSD) component in one embodiment of the DSGRCE. In FIG. 5, a worker subgraph distribution request may be obtained at 501. For example, the worker subgraph distribution request may be obtained as a result of the user's request to perform the specified calculation using the set of specified rules (e.g., once the logical dependency graph is generated).

The logical dependency graph may be obtained at 505. In one implementation, the generated LDG may be provided by the LDGG component. For example, a reference to the generated LDG (e.g., stored in memory) may be obtained.

A determination may be made at 509 regarding what execution complexity gauge to use. In one embodiment, the number of nodes may be used to gauge execution complexity of the LDG. If so, the number of nodes in the LDG may be determined at 513. In one implementation, a depth-first search (DFS) or a breadth-first search (BFS) through the LDG may be utilized to determine the number of nodes. In another embodiment, tensor sizes may be used to gauge execution complexity of the LDG. If so, the sum of output tensor sizes of LDG nodes may be determined at 517. In one implementation, a DFS or a BFS through the LDG may be utilized to determine the sum of output tensor sizes. In another embodiment, network data transfer size may be used to gauge execution complexity of the LDG. If so, estimated network data transfer size associated with the LDG may be determined at 519. In one implementation, statistics collected from previous runs may be utilized to estimate CPU utilization or the network data transfer size (e.g., based on an average of sizes from previous runs). In some embodiments, the execution complexity gauge may be a weighted average of multiple metrics, such as the number of nodes, CPU usage, the network data transfer size, the tensor output size, and/or the like.

A determination may be made at 521 whether the number of available workers (e.g., corresponding to worker processes) is fixed or dynamic. In one implementation, the distributed system execution request may be parsed to make this determination (e.g., based on the value of the type field). If the number of available workers is fixed, the specified number of available workers may be determined at 525. In one implementation, the distributed system execution request may be parsed to determine the specified number of available workers (e.g., based on the value of the number of available workers field). For example, 6 workers may be available.

If the number of available workers is dynamic, scaling parameters for calculating the number of workers to utilize may be determined at 529. In various implementations, the scaling parameters may include one or more of: target processing time, target available memory, target cost, and/or the like. The number of workers to utilize may be calculated at 533. In one implementation, the execution complexity (e.g., the number of nodes in the LDG, the sum of output tensor sizes of LDG nodes, the network data transfer size) may be divided by the average worker execution capability (e.g., determined based on previous experience, determined based on worker hardware properties) with regard to the scaling parameters to calculate the number of workers to utilize. For example, if the execution complexity of the LDG is 80,000 nodes, the scaling parameters indicate that the user wishes to complete the specified calculation in under one second, and the average worker execution capability is 15,000 nodes per second, the number of workers to utilize may be calculated as follows:

$$1 \text{ second} = 80,000 \text{ nodes}/15,000 \frac{\text{nodes}}{\text{second}} / \# \text{ of Workers}$$

$$\# \text{ of Workers} = \left\lceil 80,000 \text{ nodes}/15,000 \frac{\text{nodes}}{\text{second}} / 1 \text{ second} \right\rceil$$

$$\# \text{ of Workers} = 6$$

In another example, if the execution complexity of the LDG is sum of output tensor sizes of 120,000 (e.g., with each corresponding to utilizing 0.5 MB of memory on average), the scaling parameters indicate that the user wishes to complete the specified calculation without running out of memory, and the average worker execution capability is 16 GB of memory, the number of workers to utilize may be calculated as follows:

$$\text{sum of output tensor sizes of } 120,000 * 0.5 MB \text{ per output tensor sizes} = 60GB \text{ utilized}$$

$$\# \text{ of Workers} = \left\lceil 60GB/16 \frac{GB}{\text{worker}} \right\rceil$$

$$\# \text{ of Workers} = 4$$

Execution processing capabilities of workers may be determined at 537. For example, the execution processing capabilities may include available hardware properties (e.g., actual hardware properties, hardware properties reported by a cloud-based virtual machine) such as CPU type, number of cores per CPU, available memory, network communication speed, and/or the like. In one implementation, execution processing capabilities of workers (e.g., executing on a number of heterogeneous computers) may be determined from a hardware configuration setting (e.g., a configuration file that lists hardware properties of available computers). In another implementation, execution processing capabilities of workers (e.g., homogeneous workers executing in a cloud computing environment) may be determined from a workers configuration setting (e.g., a configuration setting that specifies hardware properties for each worker). It is to be understood that, in some implementations, multiple workers may execute on a computer system (e.g., on a physical machine or on a virtual machine).

The LDG may be divided into subgraphs based on the number and/or execution processing capabilities of workers and execution complexity of LDG at 541. In one embodiment, the LDG may be divided into subgraphs such that each worker is assigned to process a portion of the LDG commensurate with the respective worker's execution processing capabilities. In one implementation, if the workers have homogeneous execution processing capabilities, the LDG may be divided into subgraphs having similar execution complexity. For example, if the execution complexity of the LDG is 80,000 nodes and there are 6 workers, the LDG may be divided into 6 subgraphs having 13,000, 13,000, 13,000, 13,000, 14,000, and 14,000 nodes. In another implementation, if the workers have heterogeneous execution processing capabilities, the LDG may be divided into subgraphs that correspond to the available execution processing capabilities of each worker. For example, if the execution complexity of the LDG is sum of output tensor sizes of 120,000 utilizing 60 GB of memory and there are 4 workers with 24 GB, 24 GB, 8 GB, and 8 GB of available memory, the LDG may be divided into 4 subgraphs having 45,000, 45,000, 15,000, and 15,000 sum of output tensor sizes.

A determination may be made at 545 whether to reduce communications overhead to optimize processing. For example, in some cases, communications overhead associated with a node calculation (e.g., sending output of the node calculation from one worker to another worker) may be more costly than duplicating the node calculation (e.g., at the other worker). In one implementation, the distributed system execution request may be parsed to determine whether to reduce the communications overhead (e.g., based on the value of the communications overhead field).

If it is determined that the communications overhead should be reduced, hot nodes with large communications overhead may be determined at 549. In one implementation, a node may be classified as a hot node if the node exceeds a specified data transfer size threshold. For example, data transfer size may be calculated as output size (e.g., output tensor size) multiplied by the number of remote workers that depend on the output (e.g., the number of workers that would have to receive the output over a network). The determined hot nodes may be duplicated on subgraphs of other workers at 553. In one implementation, if a hot node's output is a remote precedence for a subgraph node, the hot node may be added to the subgraph associated with the subgraph node. It is to be understood that the duplication of hot nodes may be applied recursively, resulting in a portion of the entire graph being duplicated in multiple workers, while providing faster computation speed of the specified calculation due to reduced communications overhead.

A determination may be made at 557 whether there remain workers to process. In one implementation, each of the workers to be utilized may be processed. If there remain workers to process, the next worker may be selected for processing at 561.

A subgraph for the selected worker may be determined at 565. In one implementation, if the workers have homogeneous execution processing capabilities, any unassigned subgraph may be assigned to the selected worker (e.g., randomly). In another implementation, if the workers have heterogeneous execution processing capabilities, a subgraph that corresponds to the available execution processing capabilities of the selected worker may be determined and assigned to the worker. In one embodiment, the global allocation of nodes (subgraphs) to workers (e.g., determined centrally by the WSD component) may be broadcasted to each worker, so that each worker knows the global allocation of nodes to workers. Based on that information, any worker may determine if a node is local or remote, and the remote worker that owns any nodes.

Remote precedences for the selected worker may be determined at 569. For example, a remote precedence may be an output of a node in the subgraph of another worker that is an input to a node in the subgraph assigned to the selected worker. In one implementation, the subgraph assigned to the selected worker may be analyzed to determine whether each input to each node in the subgraph has a remote precedence (e.g., by comparing against the LDG) and/or to determine the identifier (e.g., remote worker identifier and/or remote node identifier) of the remote precedence.

Remote dependencies for the selected worker may be determined at 573. For example, a remote dependency may be an input to a node in the subgraph of another worker that is an output of a node in the subgraph assigned to the selected worker. In one implementation, the subgraph assigned to the selected worker may be analyzed to determine whether each output of each node in the subgraph has a remote dependency (e.g., by comparing against the LDG) and/or to determine the identifier (e.g., remote worker identifier and/or remote node identifier) of the remote dependency.

A worker process for the selected worker may be instantiated (e.g., including the LDG data structure) at 577. For example, data such as the subgraph assigned to the selected worker, information regarding the remote precedences, information regarding the remote dependencies, a communication mode (e.g., worker to worker, shared cache), and/or the like may be provided to the instantiated worker process. In one implementation, an instantiation request may be sent to a computer system utilized to execute the worker process (e.g., to a physical machine, to a virtual machine) to instantiate the worker process. In some embodiments, the worker process may be a service that is continuously running.

Figure 6:
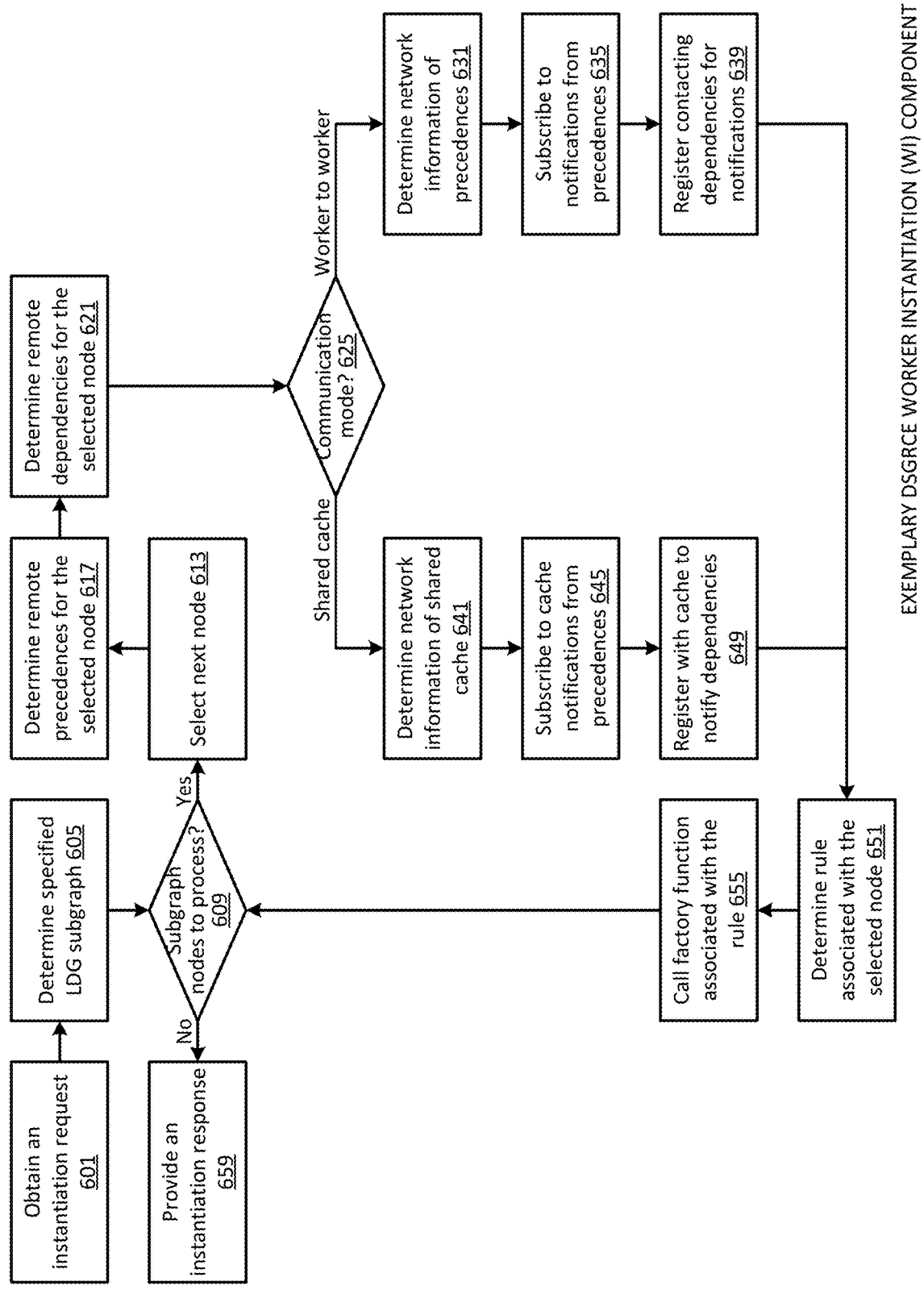
FIG. 6 shows a logic flow diagram illustrating a worker instantiation (WI) component in one embodiment of the DSGRCE.

FIG. 6 shows a logic flow diagram illustrating a worker instantiation (WI) component in one embodiment of the DSGRCE. In FIG. 6, an instantiation request may be obtained at 601. For example, the instantiation request may be obtained as a result of a manager process sending the instantiation request to instantiate a worker process.

A specified LDG subgraph for the worker process may be determined at 605. In one implementation, the instantiation request may be parsed to determine the specified LDG subgraph for the worker process (e.g., based on the value of the LDG subgraph field).

A determination may be made at 609 whether there remain subgraph nodes to process. In one implementation, each of the subgraph nodes in the specified LDG subgraph may be processed. If there remain subgraph nodes to process, the next node may be selected for processing at 613.

Remote precedences for the selected subgraph node may be determined at 617. In one implementation, the instantiation request may be parsed to determine the remote precedences (e.g., based on the value of the precedences field associated with a node identifier of the selected subgraph node). For example, a remote worker process identifier and/or a remote node identifier associated with each remote precedence (e.g., input) for the selected subgraph node may be determined. In another implementation, the manager process may provide the global allocation of nodes (subgraphs) to workers (e.g., determined centrally by the WSD component), so that the worker process may determine whether the selected subgraph node has remote precedences. For example, a remote worker process identifier and/or a remote node identifier associated with each remote precedence (e.g., input) for the selected subgraph node may be determined from the global allocation of nodes.

Remote dependencies for the selected node may be determined at 621. In one implementation, the instantiation request may be parsed to determine the remote dependencies (e.g., based on the value of the dependencies field associated with the node identifier of the selected subgraph node). For example, a remote worker process identifier and/or a remote node identifier associated with each remote dependency (e.g., output) for the selected subgraph node may be determined. In another implementation, the manager process may provide the global allocation of nodes (subgraphs) to workers (e.g., determined centrally by the WSD component), so that the worker process may determine whether the selected subgraph node has remote dependencies. For example, a remote worker process identifier and/or a remote node identifier associated with each remote dependency (e.g., output) for the selected subgraph node may be determined from the global allocation of nodes.

A determination may be made at 625 regarding what communication mode to use. In one embodiment, a worker to worker communication mode may be used. If so, network information of the remote precedences may be determined at 631. For example, the network information may include an IP address and/or port of each remote worker process whose output is used as an input by the selected subgraph node. In one implementation, the instantiation request may be parsed to determine the network information of the remote precedences (e.g., based on the value of the worker IP address field associated with each corresponding remote worker process identifier).

The worker process may subscribe to notifications from the remote precedences at 635. For example, a notification from a remote precedence worker process may include output of a remote precedence node that is used as an input by the selected subgraph node (e.g., the notification may be sent after the remote precedence worker process finishes a node calculation associated with the remote precedence node). In one implementation, the worker process may send a subscription request to the remote precedence worker process (e.g., using the network information of the remote precedence worker process) specifying the node identifier of the remote precedence node whose output the worker process wishes to obtain.

The worker process may register contacting dependencies for notifications regarding the selected subgraph node at 639 (e.g., this may be done in a separate thread any time a subscription request is received). For example, a notification from the worker process may include output of the selected subgraph node that is used as an input by a remote dependency node of the contacting remote dependency worker process (e.g., the notification may be sent after the worker process finishes a node calculation associated with the selected subgraph node). In one implementation, the worker process may verify that the contacting remote dependency worker process is authorized to register by checking that the contacting remote dependency worker process is one of the determined remote dependencies for the selected subgraph node.

In some alternative implementations, instead of utilizing subscription requests to register remote worker processes for notifications (e.g., utilized when network information of remote dependencies is not available in the instantiation request), the determined remote dependencies for the selected subgraph node may be automatically registered for notifications (e.g., utilized when network information of remote dependencies is available in the instantiation request) without the use of requests to register from the determined remote dependencies.

In another embodiment, a shared cache communication mode may be used. If so, network information of a shared cache may be determined at 641. For example, the network information may include an IP address and/or port of the shared cache. In one implementation, the instantiation request may be parsed to determine the network information of the shared cache (e.g., based on the value of the shared cache network configuration field).

The worker process may subscribe to shared cache notifications from remote precedences at 645. For example, a notification from the shared cache may include output of a remote precedence node from a remote precedence worker process that is used as an input by the selected subgraph node (e.g., the notification may be sent after the remote precedence worker process finishes a node calculation associated with the remote precedence node and notifies the shared cache). In one implementation, the worker process may send a subscription request to the shared cache (e.g., using the network information of the shared cache) specifying the remote worker process identifier of the remote precedence worker process and/or the remote node identifier of the remote precedence node whose output the worker process wishes to obtain from the shared cache. In some alternative embodiments, instead of using a subscription model, the shared cache may be passive (e.g., the shared cache does not actively push data to workers) and the worker process may send a request to the shared cache to retrieve the status and/or value of any data it wishes to obtain (e.g., output of a remote precedence node from a remote precedence worker process that is used as an input by the selected subgraph node).

The worker process may register with the shared cache to notify remote dependencies at 649. For example, a notification from the worker process may include output of the selected subgraph node that is used as an input by a remote dependency node. In one implementation, the worker process may send a registration request to the shared cache (e.g., using the network information of the shared cache) specifying the worker process identifier of the worker process and/or the node identifier of the selected subgraph node whose output the worker process will provide to the shared cache. In some alternative embodiments, instead of using a subscription model, the shared cache may be passive (e.g., the shared cache does not actively push data to workers) and the worker process may send a request to the shared cache to provide the status and/or value of any data it wishes to send (e.g., output of the selected subgraph node that is used as an input by a remote dependency node).

A rule associated with the selected subgraph node may be determined at 651. In one implementation, the Rule instance associated with the selected subgraph node may be determined. The factory function associated with the rule may be called at 655. In one implementation, calling the factory function creates a corresponding Atom object by calling its constructor. For example, the input tensor size to the constructor of an Atom may be automatically inferred by calling the dims( ) interface of its precedent atoms. In some implementations, if an atom is fully functional and has no internal state (e.g., no write update to the same memory location is possible), a single instance of the atom may be shared for the subgraph instead of duplicating the fully functional atom.

An instantiation response may be provided at 659. For example, the instantiation response may be sent to the manager process to inform the manager process that the worker process instantiated successfully.

FIG. 7 shows a logic flow diagram illustrating a graph execution (GE) component in one embodiment of the DSGRCE. In FIG. 7, a graph execution request may be obtained at 701. For example, the graph execution request may be obtained as a result of the user's request to perform the specified calculation using the set of specified rules (e.g., once at least some of the worker processes have been instantiated).

A requested output for a current run may be determined at 705. For example, the requested output may be the present value of a fixed income portfolio (e.g., provided as input) and/or the present value's sensitivities. In some embodiments, the specified calculation may be repeated multiple times (e.g., an intraday trading system may recalculate the present value of a fixed income portfolio each time an updated quote for a constituent bond is received) with some unmodified inputs (e.g., infrequently changing values of corporate bonds) and some modified inputs (e.g., frequently changing values of equity prices) between subsequent runs.

LDG nodes to compute for the requested output may be determined at 709. In one embodiment, each of the LDG nodes may be computed. In another embodiment, LDG nodes that depend on inputs that were modified from the preceding run may be computed. For example, affected LDG nodes that use modified inputs may be determined as LDG nodes to compute, and any other LDG nodes that depend on output from the affected LDG nodes (e.g., directly or indirectly) may also be determined as LDG nodes to compute. In one implementation, a DFS or a BFS through the LDG may be utilized to determine the LDG nodes to compute (e.g., starting from the affected LDG nodes).

A determination may be made at 713 whether there remain worker processes to process. In one implementation, each of the worker processes may be processed. If there remain worker processes to process, the next worker process may be selected for processing at 717.

Subgraph nodes to run for the selected worker process may be determined at 721. In one implementation, the determined LDG nodes to compute that are included in the LDG subgraph associated with the selected worker process may be determined as the subgraph nodes to run for the selected worker process. In an alternative implementation, the subgraph nodes to run may be determined during instantiation at 577.

A manager process may notify the selected worker process to initialize the forward (or primary) calculation (e.g., a portion of the specified calculation) at 731. In one implementation, the manager process may send a computation request to the selected worker process to instruct the selected worker process to initialize the forward calculation. In some implementations, the forward initialization (e.g., to reset run status from a previous run, such as whether a node has been executed, or whether a node has received preceding data from another worker) may be a part of the forward calculation request discussed at 741 instead of being a separate request.

A determination may be made at 735 whether the forward calculation initialization was completed by the selected worker process. In one implementation, a computation response may be received from the selected worker process indicating that the forward calculation initialization was completed. If the forward calculation initialization was not completed, the GE component may wait at 739. In one implementation, the wait may be non-blocking. For example, the GE component may move on to processing the next worker process and may return to processing the selected worker process at a later time (e.g., after looping through the worker processes, after being notified that the forward calculation initialization was completed). In another example, instead of looping, graph execution may be implemented as part of the event loop of the message handler.

If the forward calculation initialization was completed, the manager process may notify the selected worker process to run the forward calculation at 741. In one implementation, the manager process may send a computation request to the selected worker process to instruct the selected worker process to run the forward calculation. For example, the computation request may specify subgraph nodes to run for the selected worker process (e.g., if only a portion of the graph should to be updated (e.g., affected by changing inputs)).

A determination may be made at 745 whether the forward calculation was completed by the selected worker process. In one implementation, a computation response may be received from the selected worker process indicating that the forward calculation was completed. If the forward calculation was not completed, the GE component may wait at 749. In one implementation, the wait may be non-blocking. For example, the GE component may move on to processing the next worker process and may return to processing the selected worker process at a later time (e.g., after looping through the worker processes, after being notified that the forward calculation was completed). In another example, instead of looping, graph execution may be implemented as part of the event loop of the message handler. It is to be understood that if forward AD calculation is desired, it may be either part of the forward primal step, or a second forward round that is similar to the forward primal calculation.

If the forward calculation was completed, the manager process may notify the selected worker process to initialize the backward calculation (e.g., calculation of sensitivities) at 751. In one implementation, the manager process may send a computation request to the selected worker process to instruct the selected worker process to initialize the backward calculation. In some implementations, the backward initialization (e.g., to reset run status from a previous run, such as whether a node has been executed, or whether a node has received preceding data from another worker) may be a part of the backward calculation request discussed at 761 instead of being a separate request. It is to be understood that, in some embodiments, calculation of sensitivities may not be requested by the user, in which case the backward calculation initialization and/or the backward calculation may be avoided.

A determination may be made at 755 whether the backward calculation initialization was completed by the selected worker process. In one implementation, a computation response may be received from the selected worker process indicating that the backward calculation initialization was completed. If the backward calculation initialization was not completed, the GE component may wait at 759. In one implementation, the wait may be non-blocking. For example, the GE component may move on to processing the next worker process and may return to processing the selected worker process at a later time (e.g., after looping through the worker processes, after being notified that the backward calculation initialization was completed). In another example, instead of looping, graph execution may be implemented as part of the event loop of the message handler of network communication.

If the backward calculation initialization was completed, the manager process may notify the selected worker process to run the backward calculation at 761. In one implementation, the manager process may send a computation request to the selected worker process to instruct the selected worker process to run the backward calculation. For example, the computation request may specify subgraph nodes to run for the selected worker process.

A determination may be made at 765 whether the backward calculation was completed by the selected worker process. In one implementation, a computation response may be received from the selected worker process indicating that the backward calculation was completed. If the backward calculation was not completed, the GE component may wait at 769. In one implementation, the wait may be non-blocking. For example, the GE component may move on to processing the next worker process and may return to processing the selected worker process at a later time (e.g., after looping through the worker processes, after being notified that the backward calculation was completed). In another example, instead of looping, graph execution may be implemented as part of the event loop of the message handler.

If there do not remain worker processes to process, the manager process may retrieve the requested output at 771. For example, the requested output may be the result of the specified calculation (e.g., including sensitivities). In another example, the requested output may be the result of a calculation by any LDG node (e.g., when the user wishes to view intermediate results by selecting an LDG node of interest to the user using a DSGRCE GUI). In one implementation, the manager process may retrieve the requested output by sending a message to a relevant worker process (e.g., determined based on the LDG subgraph that contains the selected LDG node) to provide results for a specified LDG node.

The requested output may be provided at 775. In one implementation, the manager process may send a distributed system execution response to provide the requested output.

Figure 8A:
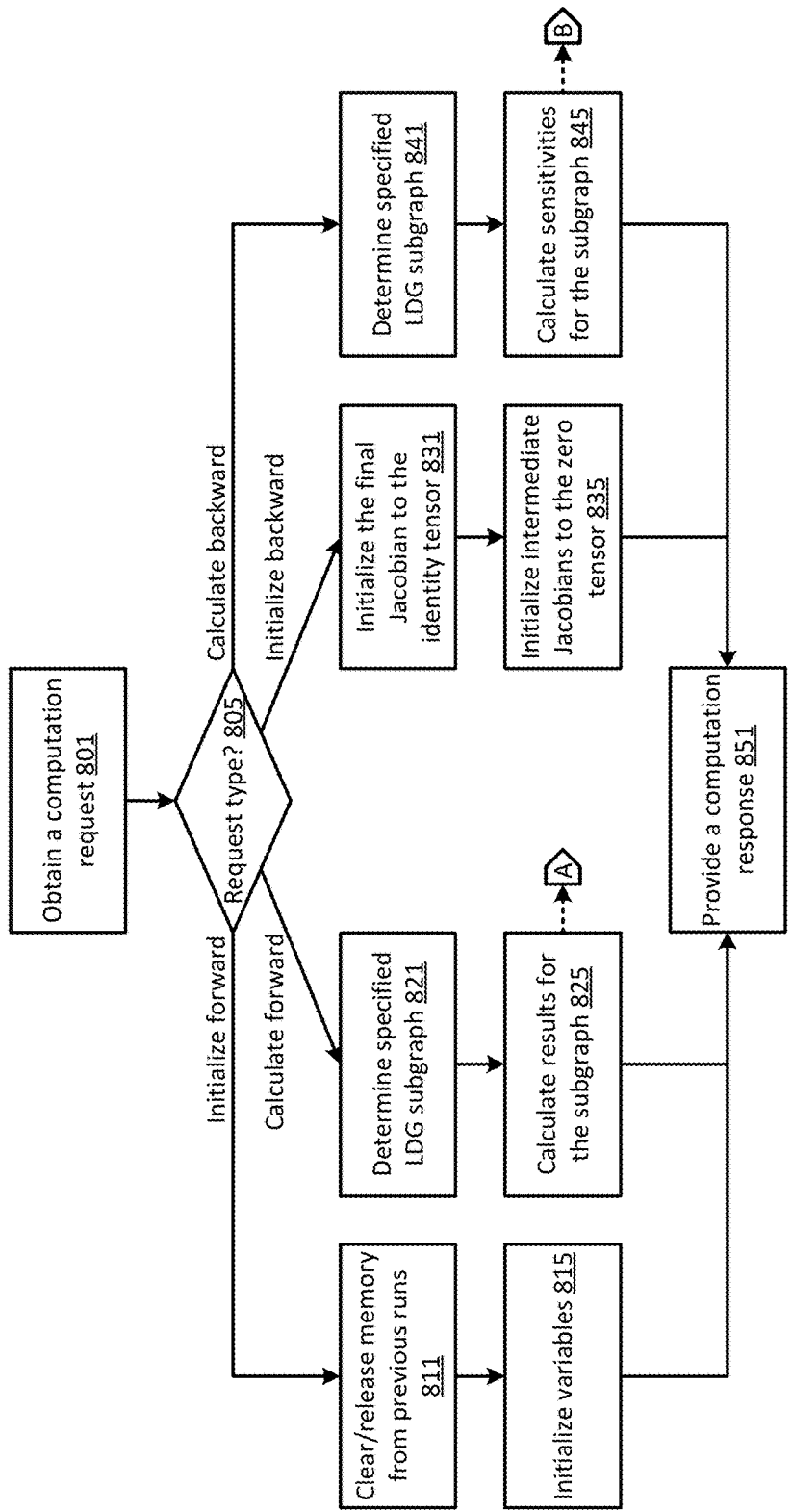
FIGS. 8A-C show a logic flow diagram illustrating a worker computation (WC) component in one embodiment of the DSGRCE.
Figure 8B:
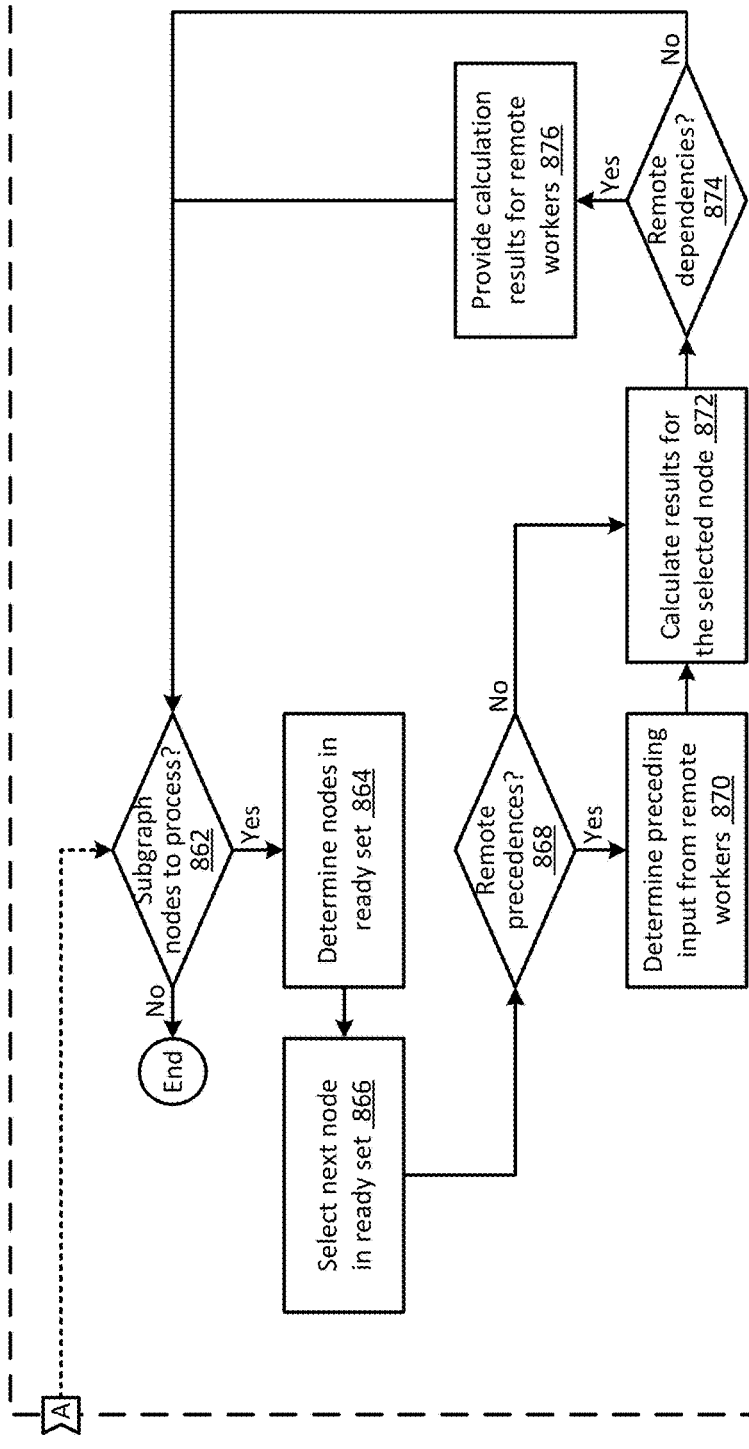
Figure 8:
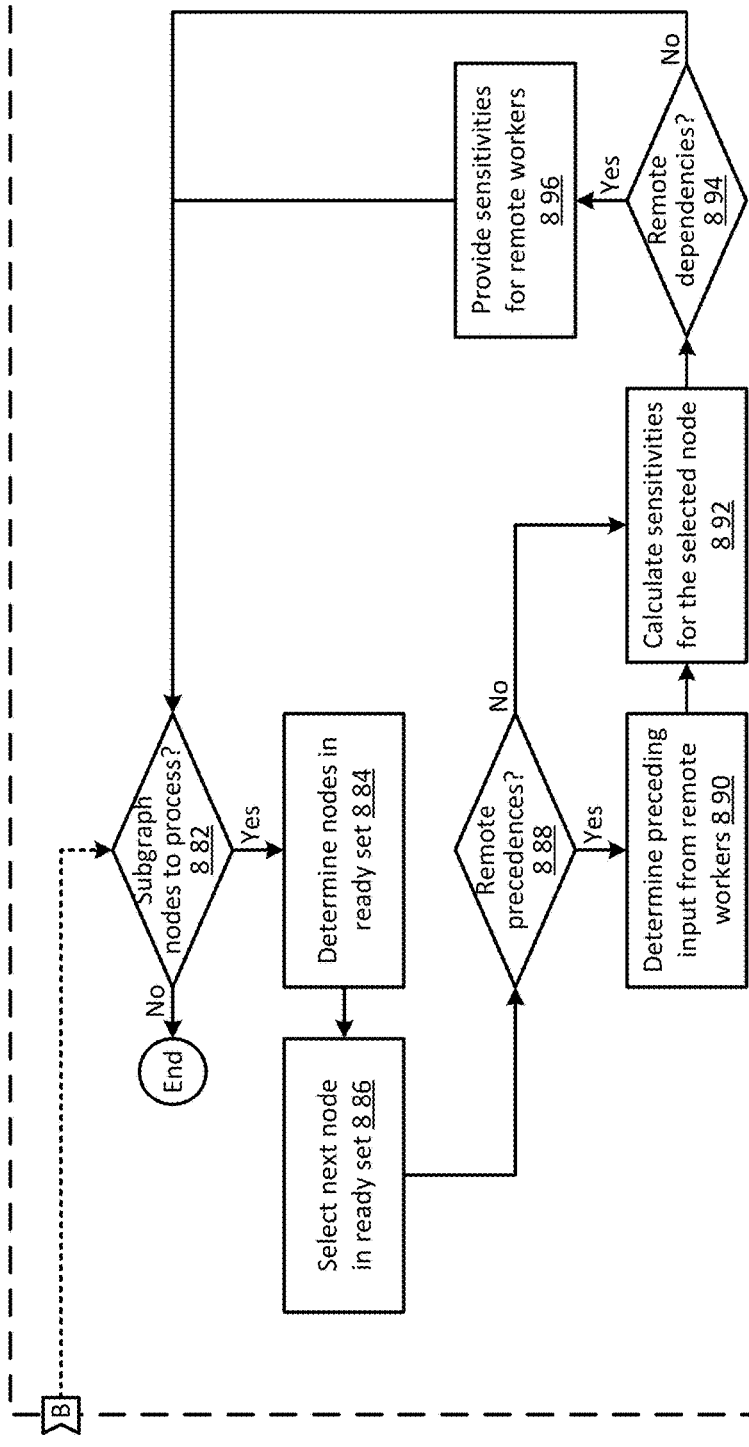

FIGS. 8A-C show a logic flow diagram illustrating a worker computation (WC) component in one embodiment of the DSGRCE. In FIG. 8A, a computation request may be obtained at 801. For example, the computation request may be obtained as a result of a manager process instructing a worker process to execute a computation.

A determination may be made at 805 regarding the request type specified in the computation request. If the request type is "initialize forward", allocated memory from previous runs may be cleared and/or released by the worker process at 811. In one implementation, instantiated objects from previous runs may be deleted. Variables may be initialized at 815. In one implementation, objects may be instantiated and/or initialized to their default values.

If the request type is "calculate forward", the specified LDG subgraph for the worker process may be determined at 821. In one implementation, a list of node IDs (e.g., that stores the LDG subgraph for the worker process specified in an instantiation request) may be accessed to determine the specified LDG subgraph. Results of the forward calculation for the LDG subgraph may be computed at 825. In one implementation, subgraph nodes to run for the worker process (e.g., specified by the manager process) may be processed to compute the results of the forward calculation. See FIG. 8B for additional details regarding computing the results of the forward calculation.

If the request type is "initialize backward", the final Jacobian may be initialized to the identity tensor at 831 and intermediate Jacobians may be initialized to the zero tensor at 835. In one implementation, the computation request may include the identity of ultimate output $\vec{u}$ and the sensitivity set (e.g., a list of nodes for which sensitivities should be computed: the $\vec{x}$s in $$\frac{\partial \vec{u}}{\partial \vec{x}}$$

where each $\vec{x}_i$ is a node that it depends on and whose sensitivities are requested by the user. Upon receiving the computation request the worker process may initialize the final Jacobian to the identity tensor $$\frac{\partial \vec{u}}{\partial \vec{u}}$$

and the intermediate Jacobians to the 0 tensor. In some implementations, the memory utilized for computing the intermediate Jacobians may be preallocated at this stage to improve memory efficiency.

If the request type is "calculate backward", the specified LDG subgraph for the worker process may be determined at 841. In one implementation, a list of node IDs (e.g., that stores the LDG subgraph for the worker process specified in an instantiation request) may be accessed to determine the specified LDG subgraph. Sensitivities for the LDG subgraph may be computed at 845. In one implementation, the worker process may execute the LDG subgraph backwards, from the ultimate output to input, by calling the back( ) method on each Atom object of each node, and stops when the sensitivity set $\vec{x}_i$ has been executed (e.g., upon completion the $$\frac{\partial \vec{u}}{\partial \vec{x}_i}$$

are computed). In some implementations, when an intermediate result (e.g., intermediate tensor and/or gradient result) is no longer used (e.g., determined based on the LDG subgraph), memory allocated for the intermediate result may be reused for other nodes to improve memory efficiency. See FIG. 8C for additional details regarding computing the results of the backward calculation.

In some implementations, a forward AD calculation may be used, which works similarly to the backward AD calculation described above, but with different initialization and calculation order.

A computation response may be provided at 851. In one implementation, the worker process may send a status indicator and/or the requested computation results to the manager process via the computation response.

FIG. 8B shows additional details regarding computing the results of the forward calculation. In FIG. 8B, a determination may be made at 862 whether there remain subgraph nodes to process. In one implementation, each of the specified subgraph nodes to run in the specified LDG subgraph may be processed. If there remain subgraph nodes to process, nodes in the ready set may be determined at 864. In one implementation, the ready set may include unprocessed subgraph nodes that are ready to run, which may include unprocessed subgraph nodes that do not have precedences and unprocessed subgraph nodes whose precedences have already been processed (e.g., by the worker process for local precedences; by another worker process for remote precedences). The next node in the ready set may be selected for processing at 866.

A determination may be made at 868 whether the selected node has remote precedences. If so, the preceding inputs (e.g., calculation outputs of remote nodes) may be determined from corresponding remote worker processes at 870. In one implementation, the preceding inputs may be obtained directly from the remote worker processes. In another implementation, the preceding inputs may be obtained from a shared cache.

Results for the selected node may be calculated at 872. In one implementation, the fwd( ) method of the Atom object associated with the selected node may be called with any local precedences (e.g., provided as input; previously calculated by the worker process for one or more already processed nodes) and/or remote precedences (e.g., obtained from one or more remote worker processes) provided as input.

A determination may be made at 874 whether the selected node has remote dependencies. If so, the calculation results may be provided for remote worker processes at 876. In one implementation, the calculation results may be sent directly to the remote worker processes. In another implementation, the calculation results may be sent to a shared cache.

FIG. 8C shows additional details regarding computing the results of the backward calculation. It is to be understood that precedent and dependent nodes are defined by the direction of data flow. Accordingly, precedent and dependent nodes may reverse between forward and backward runs, as their direction of data flow is different. In FIG. 8C, a determination may be made at 882 whether there remain subgraph nodes to process. In one implementation, each of the specified subgraph nodes to run in the specified LDG subgraph may be processed. If there remain subgraph nodes to process, nodes in the ready set may be determined at 884. In one implementation, the ready set may include unprocessed subgraph nodes that are ready to run, which may include unprocessed subgraph nodes that do not have precedences and unprocessed subgraph nodes whose precedences have already been processed (e.g., by the worker process for local precedences; by another worker process for remote precedences). The next node in the ready set may be selected for processing at 886.

A determination may be made at 888 whether the selected node has remote precedences. If so, the preceding inputs (e.g., sensitivities outputs of remote nodes) may be determined from corresponding remote worker processes at 890. In one implementation, the preceding inputs may be obtained directly from the remote worker processes. In another implementation, the preceding inputs may be obtained from a shared cache.

Sensitivities for the selected node may be calculated at 892. In one implementation, the back( ) method of the Atom object associated with the selected node may be called with any local precedences (e.g., provided as input; previously calculated by the worker process for one or more already processed nodes) and/or remote precedences (e.g., obtained from one or more remote worker processes) provided as input. In another implementation (e.g., when a forward AD calculation is used), the fwdad( ) method of the Atom object associated with the selected node may be called.

A determination may be made at 894 whether the selected node has remote dependencies. If so, the sensitivities may be provided for remote worker processes at 896. In one implementation, the sensitivities may be sent directly to the remote worker processes. In another implementation, the sensitivities may be sent to a shared cache.

Figure 9:
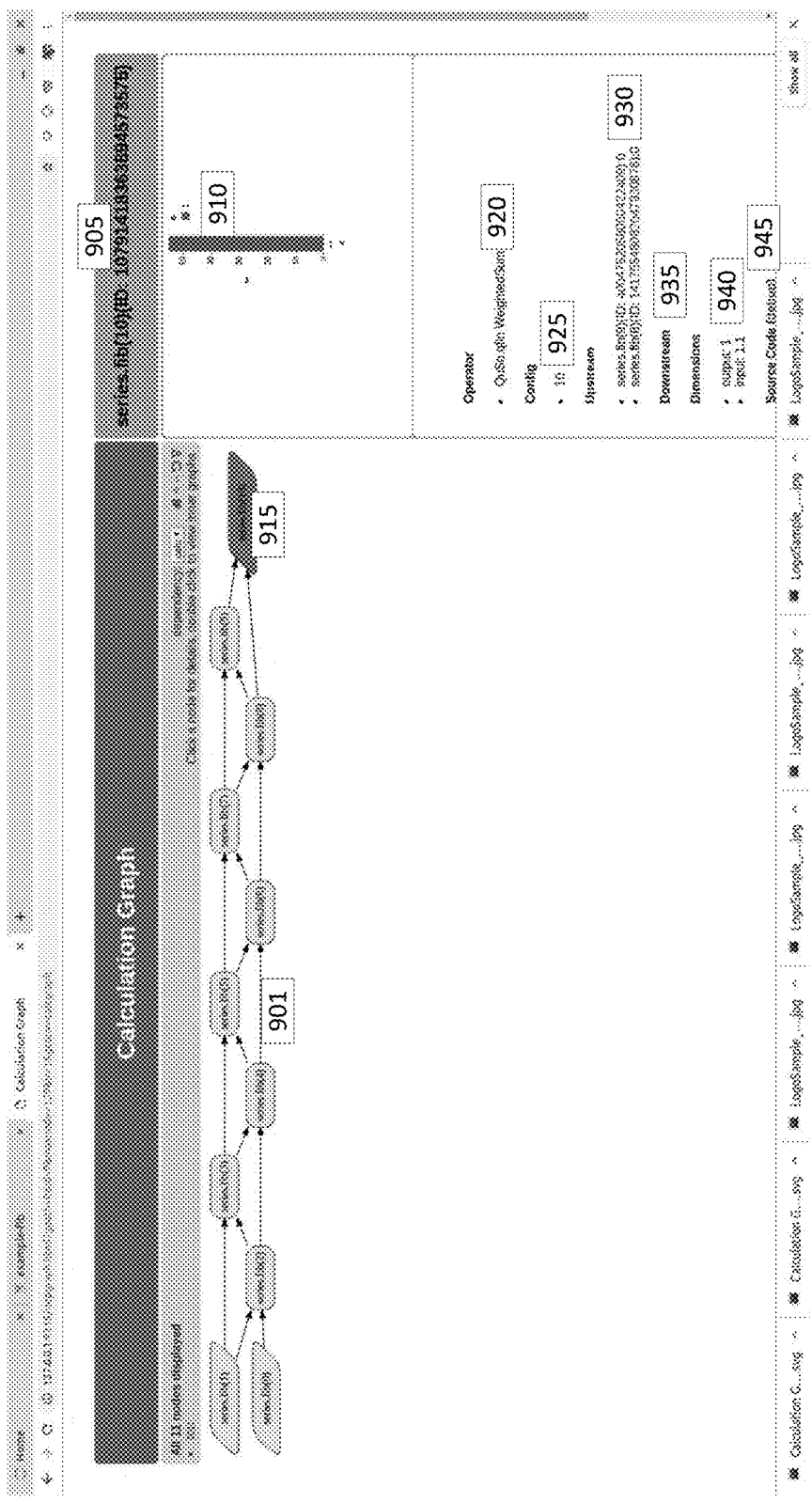
FIG. 9 shows a screen shot diagram illustrating user interface features in one embodiment of the DSGRCE.

FIG. 9 shows a screen shot diagram illustrating user interface features in one embodiment of the DSGRCE. In FIG. 9, an exemplary user interface (e.g., for a mobile device, for a website) showing a logical dependency graph 901 for calculating a Fibonacci series is illustrated. The LDG corresponds to using rule declarations 130 with scalar "10" as input. Panel 905 shows information regarding the selected node 915 (e.g., "series.fib(10)") of the LDG. The final results (e.g., 55) associated with the selected node are displayed as a bar chart 910. The Atom object associated with the selected node is shown at 920. Rule parameters associated with the selected node are shown at 925. Precedence nodes for the selected node are shown at 930. Dependency nodes for the selected node are shown at 935. Input and output dimensions for the selected node are shown at 940. The source code (e.g., the rule declaration; related metadata such as developer name, documentation, source code location) associated with the selected node is shown at 945.

Figure 10:
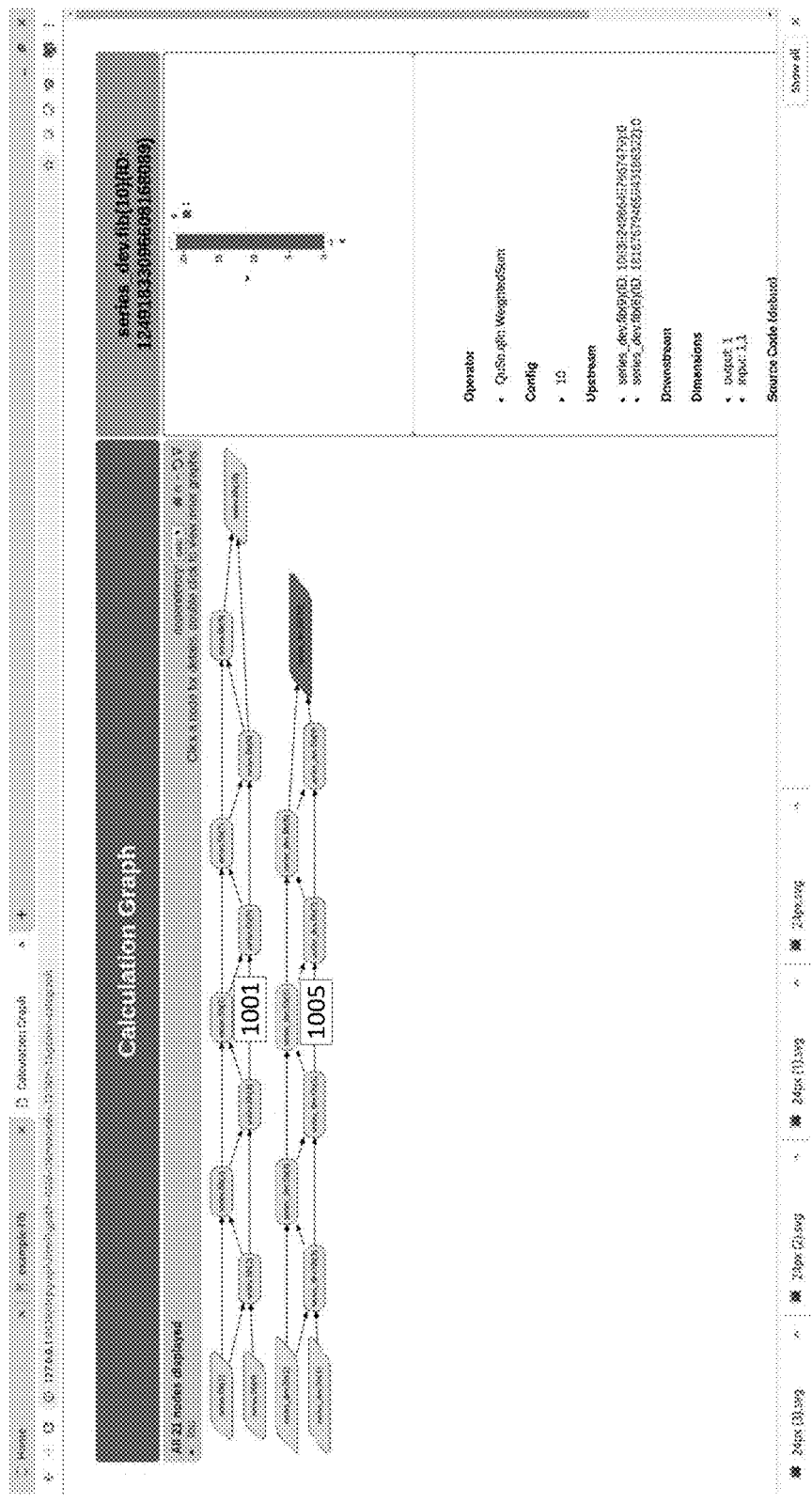
FIG. 10 shows a screen shot diagram illustrating user interface features in one embodiment of the DSGRCE.

FIG. 10 shows a screen shot diagram illustrating user interface features in one embodiment of the DSGRCE. In FIG. 10, an exemplary user interface (e.g., for a mobile device, for a website) showing two logical dependency graphs is illustrated. LDG 1001 corresponds to LDG 901. LDG 1005 is the result of rule cloning and override corresponding to using rule declarations 160 with "series_dev.fib (10)" as user specified output. FIG. 10 shows that calculation results associated with "series" declarations are not lost, and may be compared with results associated with "series_dev" declarations after the rules have changed.

Figure 11:
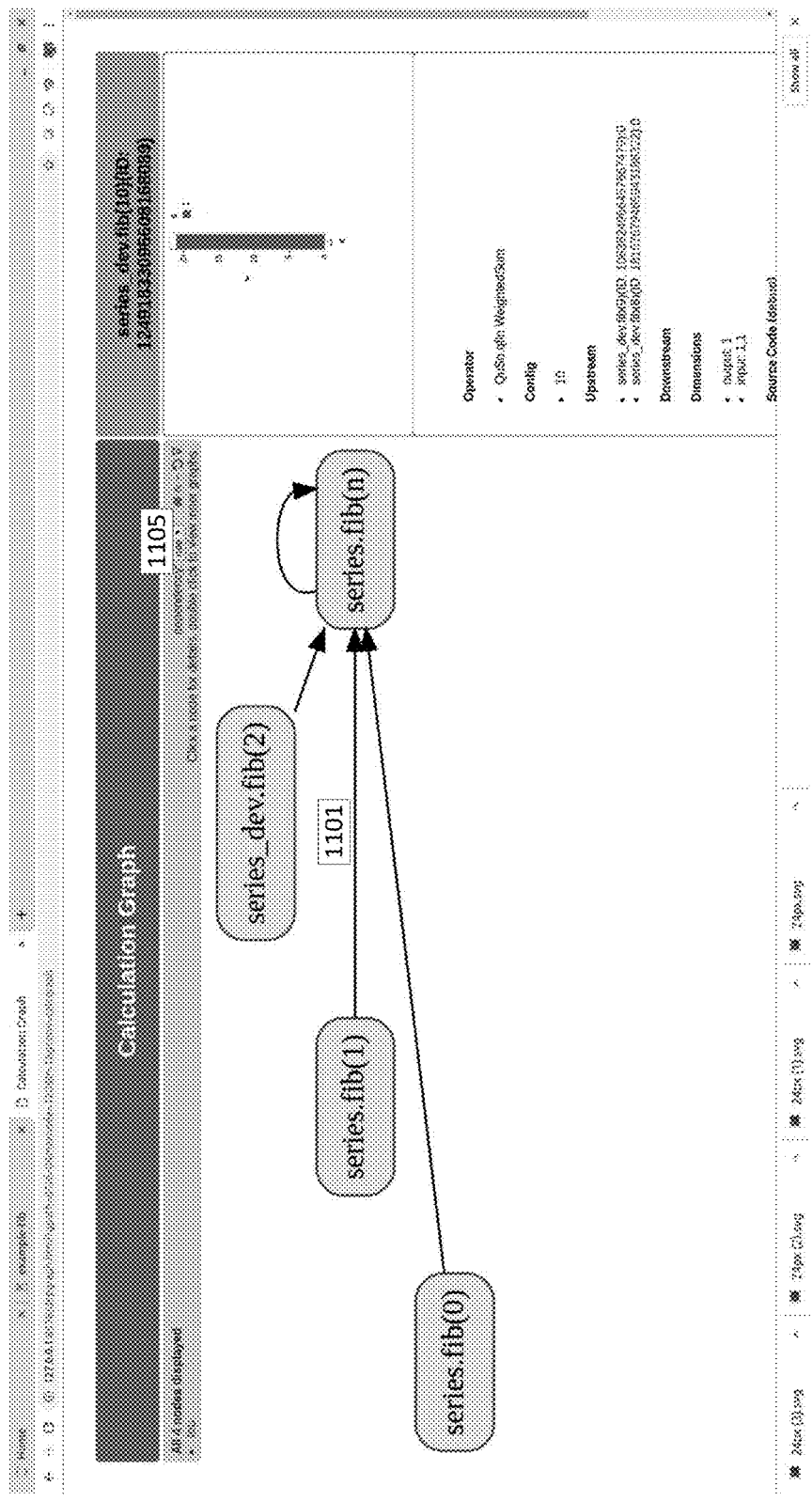
FIG. 11 shows a screen shot diagram illustrating user interface features in one embodiment of the DSGRCE.

FIG. 11 shows a screen shot diagram illustrating user interface features in one embodiment of the DSGRCE. In FIG. 11, an exemplary user interface (e.g., for a mobile device, for a website) showing a rule dependency graph 1101 is illustrated. In one implementation, the rule dependency graph (RDG) may be generated by traversing the logical dependency graph (e.g., starting with the LDG output node corresponding to the specified output rule (e.g., series_dev.fib(10))). An RDG node corresponding to the Rule instance associated with the LDG output node may be added to the rule dependency graph. For example, an RDG node may be structured as follows:

```
//additional information may be looked up using a hash value of
//the node identification tuple
struct RuleGraphNode
    String ns; //namespace
    String name; //rule name
    Vector signature;    //list of types (or types(value) for
                         //value based polymorphism) of the
                         //rule parameter (e.g., Double, Int(3))
end
```

Precedent LDG nodes of the LDG output node may be recursively traversed, and a Rule instance associated with each respective LDG precedent node may be determined. If an RDG node corresponding to a Rule instance associated with a respective LDG precedent node does not yet exist in the rule dependency graph, such RDG node may be added to the rule dependency graph and an RDG edge between such RDG node and its dependent RDG node may be added. If such RDG node already exists, an RDG edge between such RDG node and its dependent RDG node may be added (e.g., an RDG edge may be between two different RDG nodes, or between an RDG node and itself). For example, an RDG node may provide information regarding the associated Rule instance (e.g., the rule declaration; related metadata such as developer name, documentation, source code location), LDG nodes that utilize the associated Rule instance, precedent and/or dependent RDG nodes (e.g., via RDG edges data fields), and/or the like. In one implementation, a user may utilize the pull-down menu 1105 to switch the display between the LDG (calculation graph) and the rule dependency graph. The rule dependency graph shows the logic lineage of the calculation, and clearly identifies that there is only a single rule different between namespace "series" and namespace "series_dev". The rule dependency graph shows that rule cloning is effectively copy-on-write (e.g., when a set of rules is first cloned, the cloned rules refer to the identical rules from the original set, until they are explicitly changed, as with regard to rule "series_dev.fib(2)". The rule dependency graph may be utilized for model validation and audit.

Figure 12:
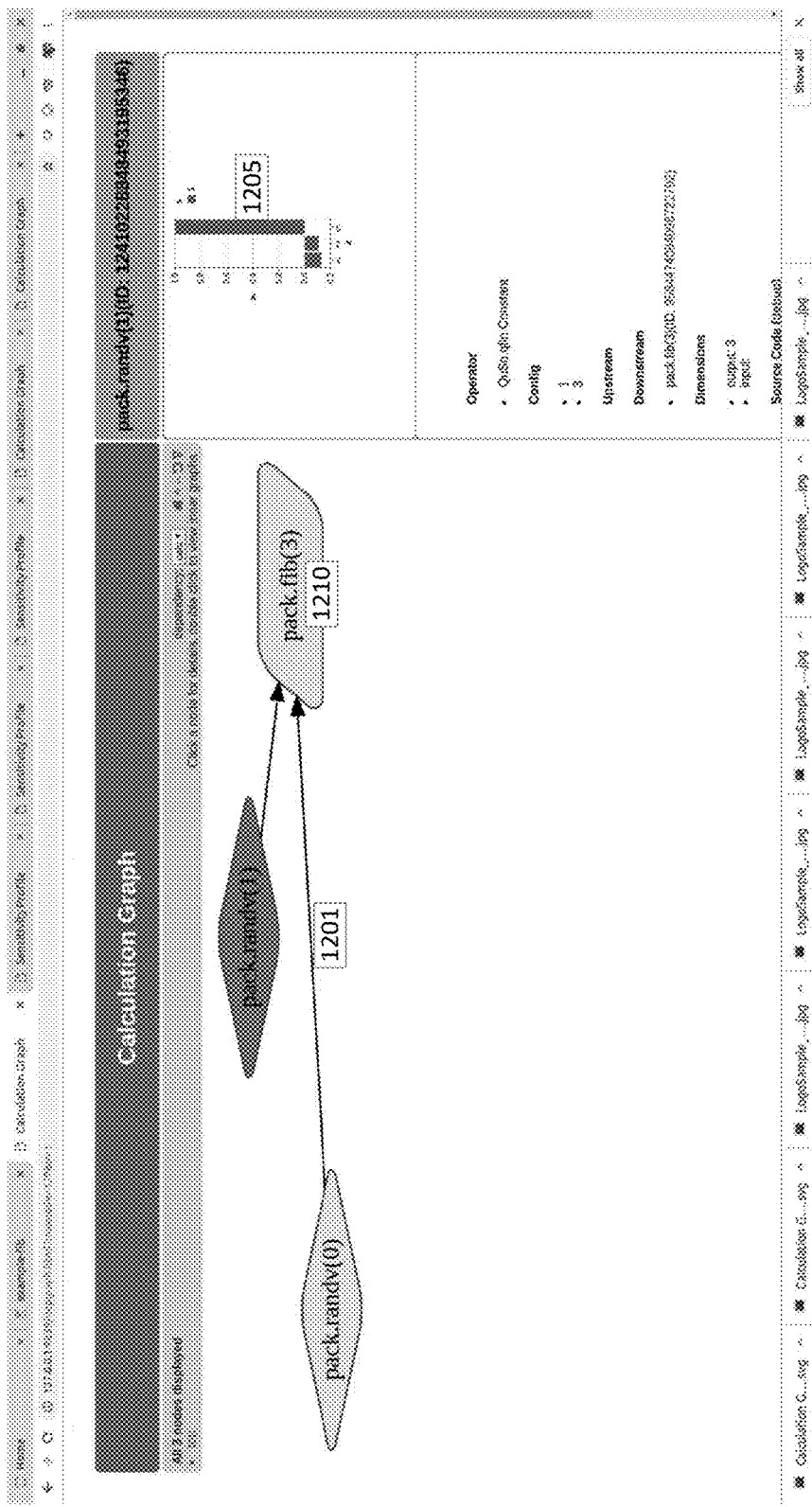
FIG. 12 shows a screen shot diagram illustrating user interface features in one embodiment of the DSGRCE.

FIG. 12 shows a screen shot diagram illustrating user interface features in one embodiment of the DSGRCE. In FIG. 12, an exemplary user interface (e.g., for a mobile device, for a website) showing a logical dependency graph 1201 for calculating a Fibonacci series using packages is illustrated. The LDG corresponds to using rule declarations 170 with two random vectors of length 3 as inputs. Bar chart 1205 shows one of the random inputs.

Figure 13:
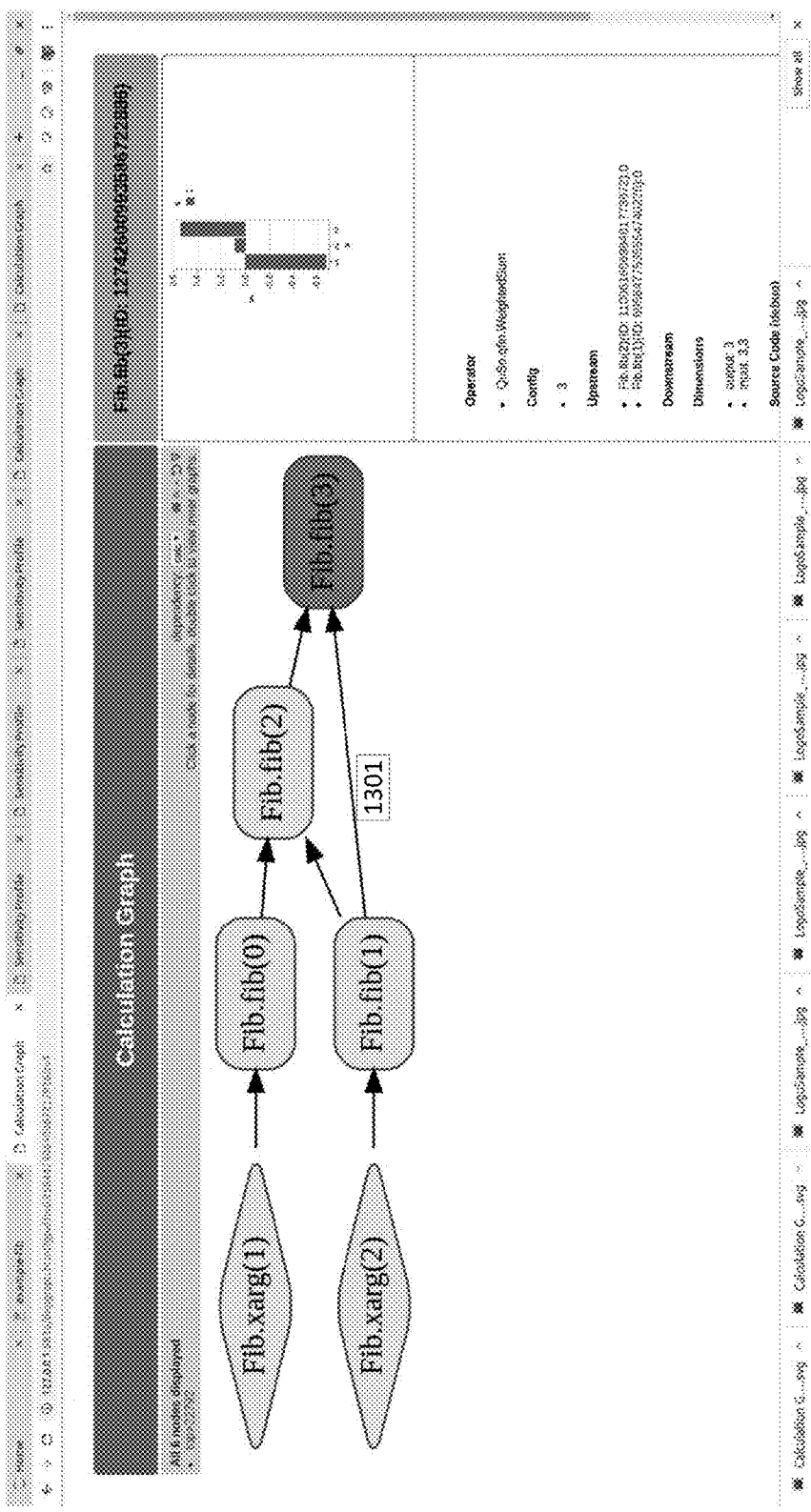
FIG. 13 shows a screen shot diagram illustrating user interface features in one embodiment of the DSGRCE.

FIG. 13 shows a screen shot diagram illustrating user interface features in one embodiment of the DSGRCE. In FIG. 13, an exemplary user interface (e.g., for a mobile device, for a website) showing a logical dependency graph 1301 that provides details regarding how LDG node "pack.fib(3)" 1210 is computed is illustrated. In one implementation, a user may drill down (e.g., by double clicking on the LDG node) to the inner graph of the packaged atom "pack.fib(3)" to see the details.

Figure 14:
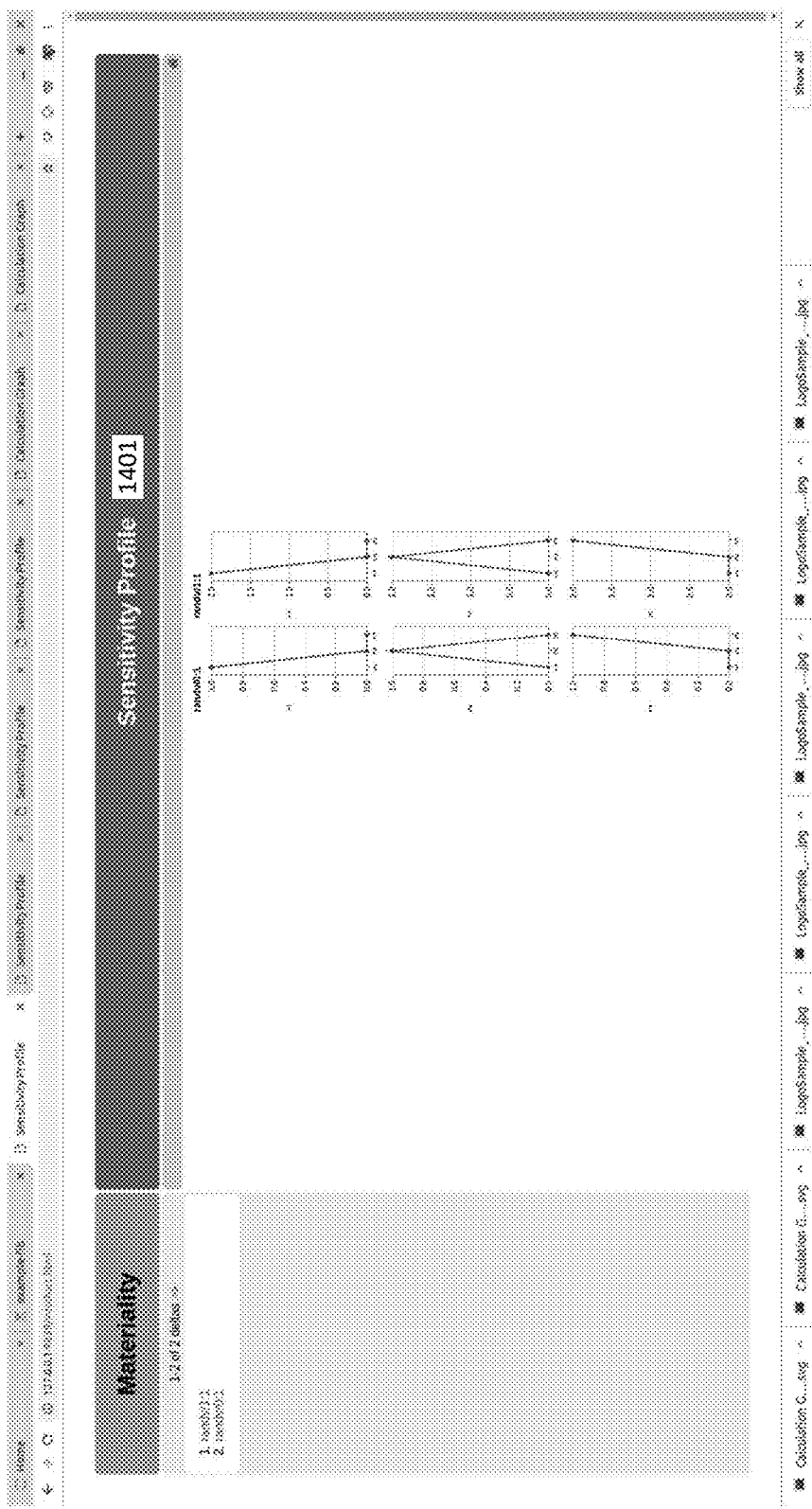
FIG. 14 shows a screen shot diagram illustrating user interface features in one embodiment of the DSGRCE.

FIG. 14 shows a screen shot diagram illustrating user interface features in one embodiment of the DSGRCE. In FIG. 14, an exemplary user interface (e.g., for a mobile device, for a website) for showing sensitivities is illustrated. Sensitivities 1401 to the two random vectors associated with the logical dependency graph 1201 (e.g., using algorithmic differentiation to obtain results) are shown. The sensitivity to each of the two input vectors is a Jacobian matrix of 3×3, and the sensitivities are displayed as two columns of line diagrams.

Figure 15:
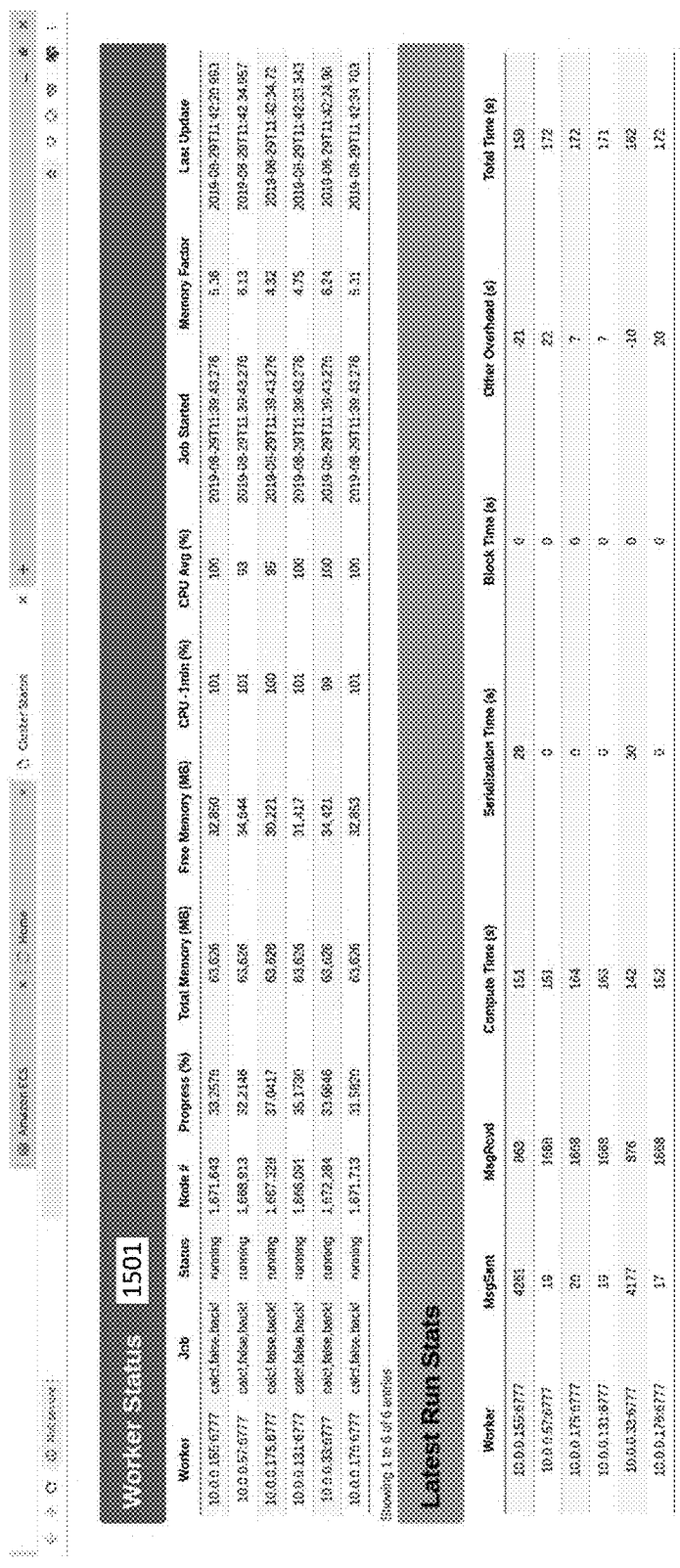
FIG. 15 shows a screen shot diagram illustrating user interface features in one embodiment of the DSGRCE.

FIG. 15 shows a screen shot diagram illustrating user interface features in one embodiment of the DSGRCE. In FIG. 15, an exemplary user interface (e.g., for a mobile device, for a website) showing status of a DSGRCE generated distributed system is illustrated. Status 1501 associated with calculating pricing results for a large portfolio with a million trades on Amazon Web Services (AWS) cloud using 6 workers in shown. The user interface shows details such as the network address, computation progress, number of nodes in distributed LDG subgraph, CPU utilization, memory utilization, messages sent for data exchanges, messages received for data exchanges, and/or the like for each of the 6 workers.

Figure 16:
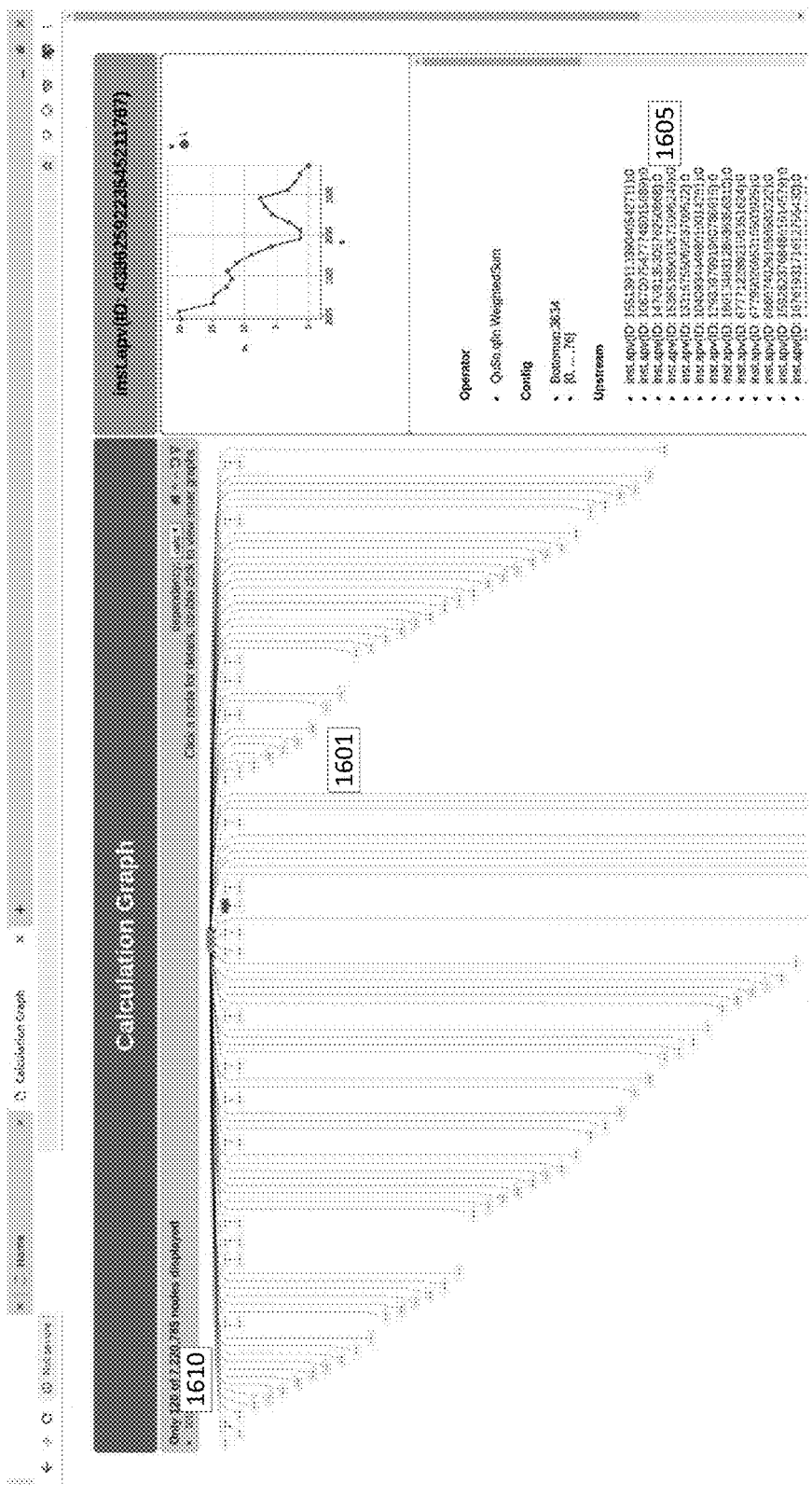
FIG. 16 shows a screen shot diagram illustrating user interface features in one embodiment of the DSGRCE.

FIG. 16 shows a screen shot diagram illustrating user interface features in one embodiment of the DSGRCE. In FIG. 16, an exemplary user interface (e.g., for a mobile device, for a website) showing a logical dependency graph 1601 for calculating the pricing results for the large portfolio and the top level results of the graph calculation once the distributed calculation is finished is illustrated. In one implementation, instead of displaying the entire 7.2 million nodes in this computation graph (e.g., which may be slow and confusing), a portion of the nodes corresponding to the final results is displayed, and those nodes whose precedents cannot be displayed fully are shown in gray colors (e.g., colors, shapes, border style, and/or the like may be used to distinguish the nodes whose precedents are fully displayed vs those with missing precedents). When a user double clicks any of the nodes, the graph display may expand and show the precedents associated with the selected node. Navigation links 1605 and 1610 facilitate navigating large graphs. Navigation links 1605 allow the user to navigate to precedence nodes and dependency nodes. Navigation link 1610 allows the user to go back to the top-level graph after the user drills down to a packaged atom's inner graph. Navigation link 1610 may show the current location of the graph to help the user navigate.

Figure 17:
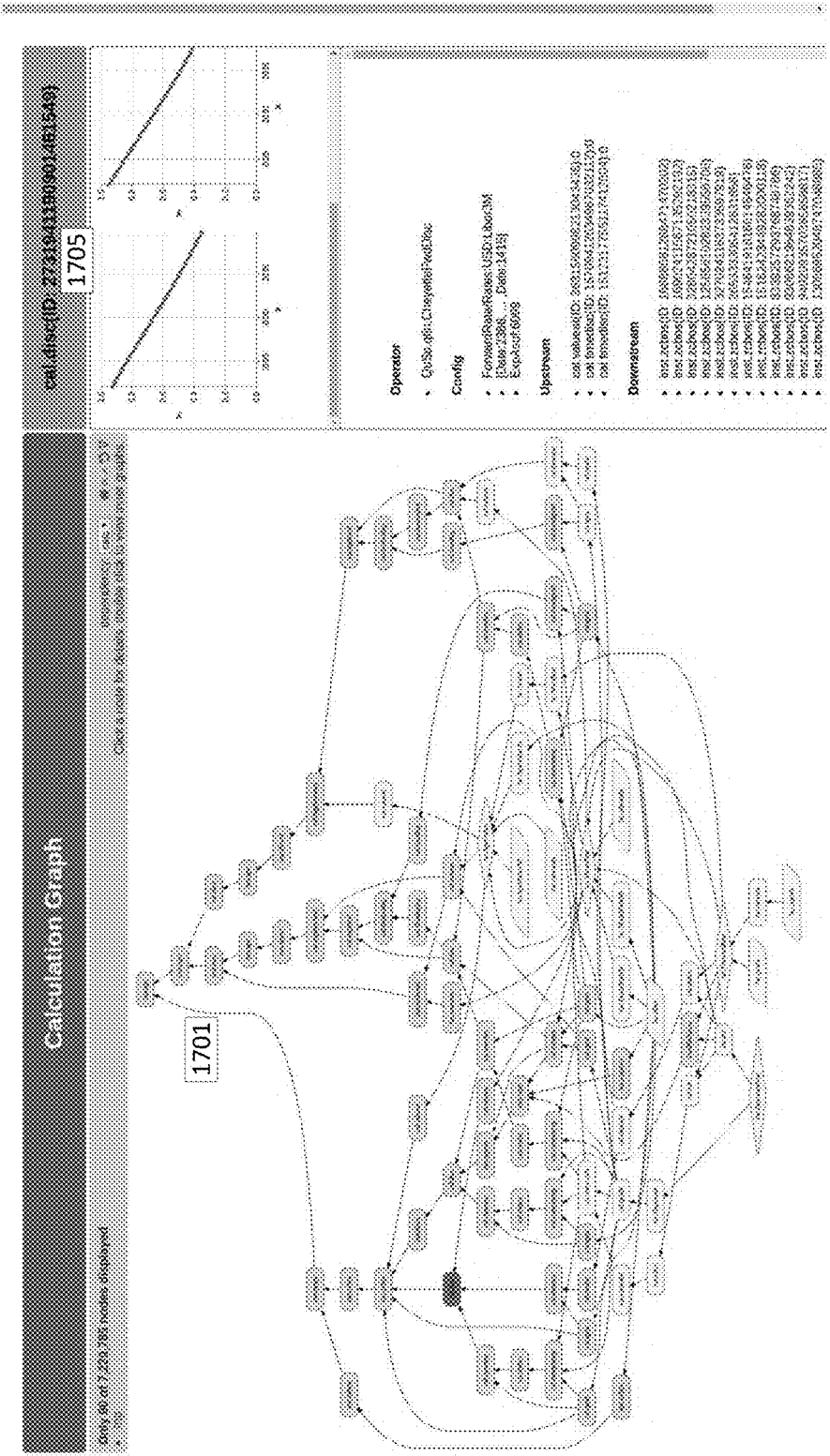
FIG. 17 shows a screen shot diagram illustrating user interface features in one embodiment of the DSGRCE.

FIG. 17 shows a screen shot diagram illustrating user interface features in one embodiment of the DSGRCE. In FIG. 17, an exemplary user interface (e.g., for a mobile device, for a website) showing a logical dependency graph 1701 that provides details regarding a single trade's preceding nodes (e.g., which are only a small portion of the 7.2 million nodes) is illustrated. Different colors may indicate each worker's identity, showing this trade valuation involves three different workers' collaboration (e.g., colors, patterns, shapes, border style, and/or the like may be used to identity which worker is associated with a node). When a user clicks one of the nodes, its values are displayed in panel 1705, allowing the user to inspect any intermediate results in the overall calculation.

Figure 18:
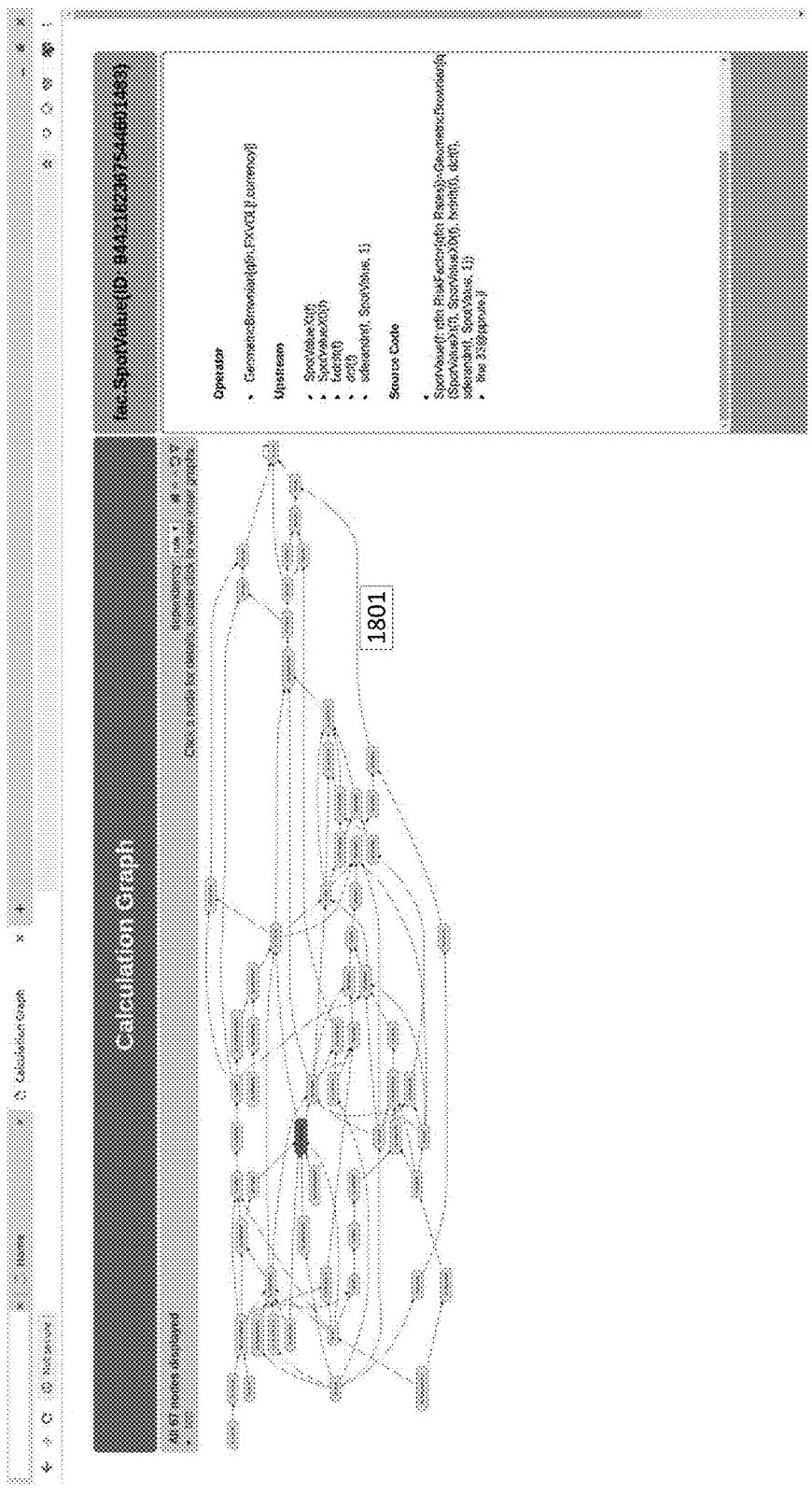
FIG. 18 shows a screen shot diagram illustrating user interface features in one embodiment of the DSGRCE.

FIG. 18 shows a screen shot diagram illustrating user interface features in one embodiment of the DSGRCE. In FIG. 18, an exemplary user interface (e.g., for a mobile device, for a website) showing a rule dependency graph 1801 corresponding to the logical dependency graph 1601 is illustrated. The rule dependency graph has 40 underlying rules for the 7.2 million calculation nodes. This example shows that it is easier to trace the logic through the 40 nodes of rules, than trying to do the same through the 7.2 million calculation nodes, in order to understand the governing logic of the calculation.

Figure 19:
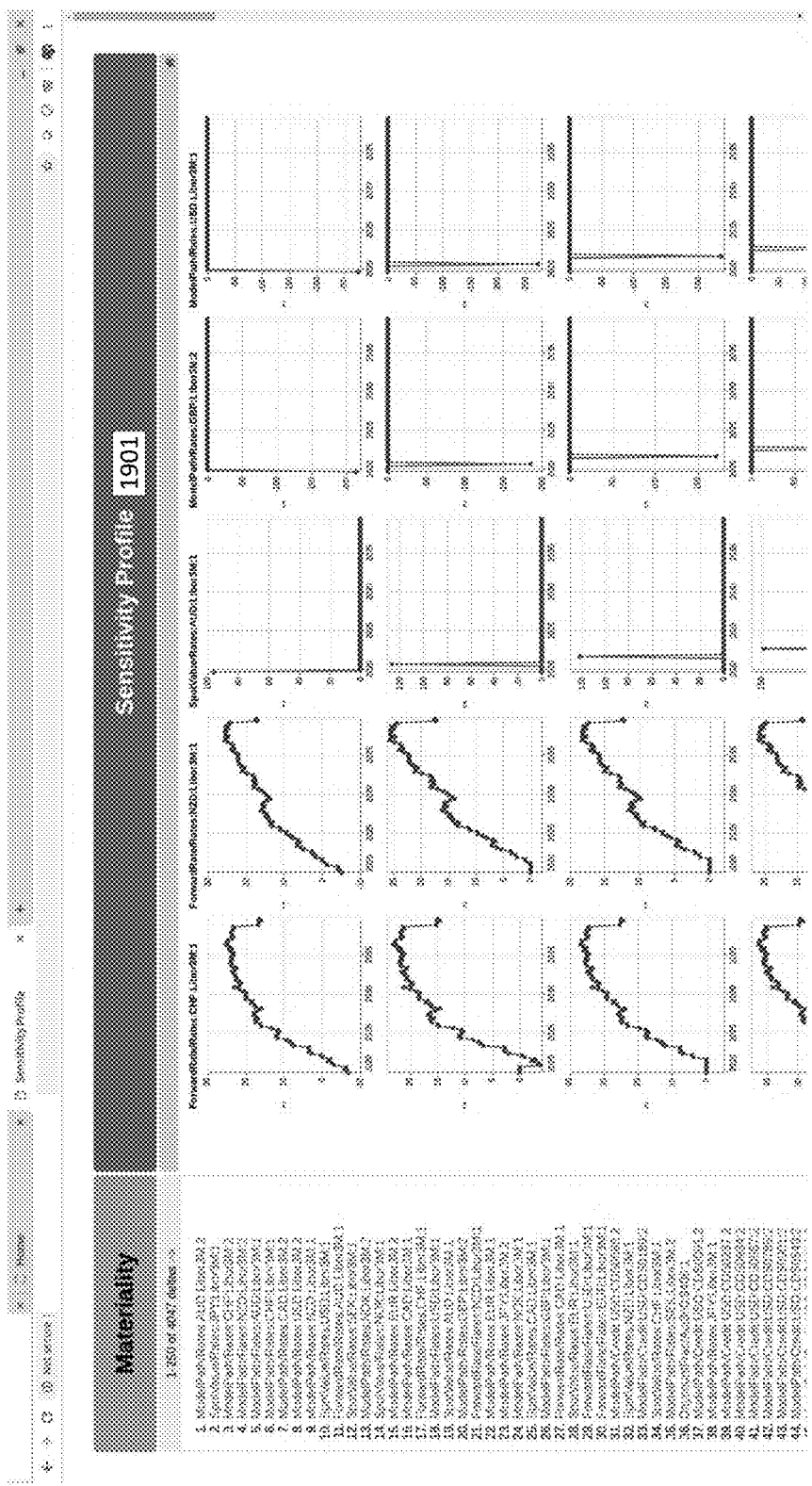
FIG. 19 shows a screen shot diagram illustrating user interface features in one embodiment of the DSGRCE.

FIG. 19 shows a screen shot diagram illustrating user interface features in one embodiment of the DSGRCE. In FIG. 19, an exemplary user interface (e.g., for a mobile device, for a website) for showing sensitivities is illustrated. Sensitivities 1901 associated with the logical dependency graph 1601 (e.g., using algorithmic differentiation to obtain results) are shown.

Figure 20:
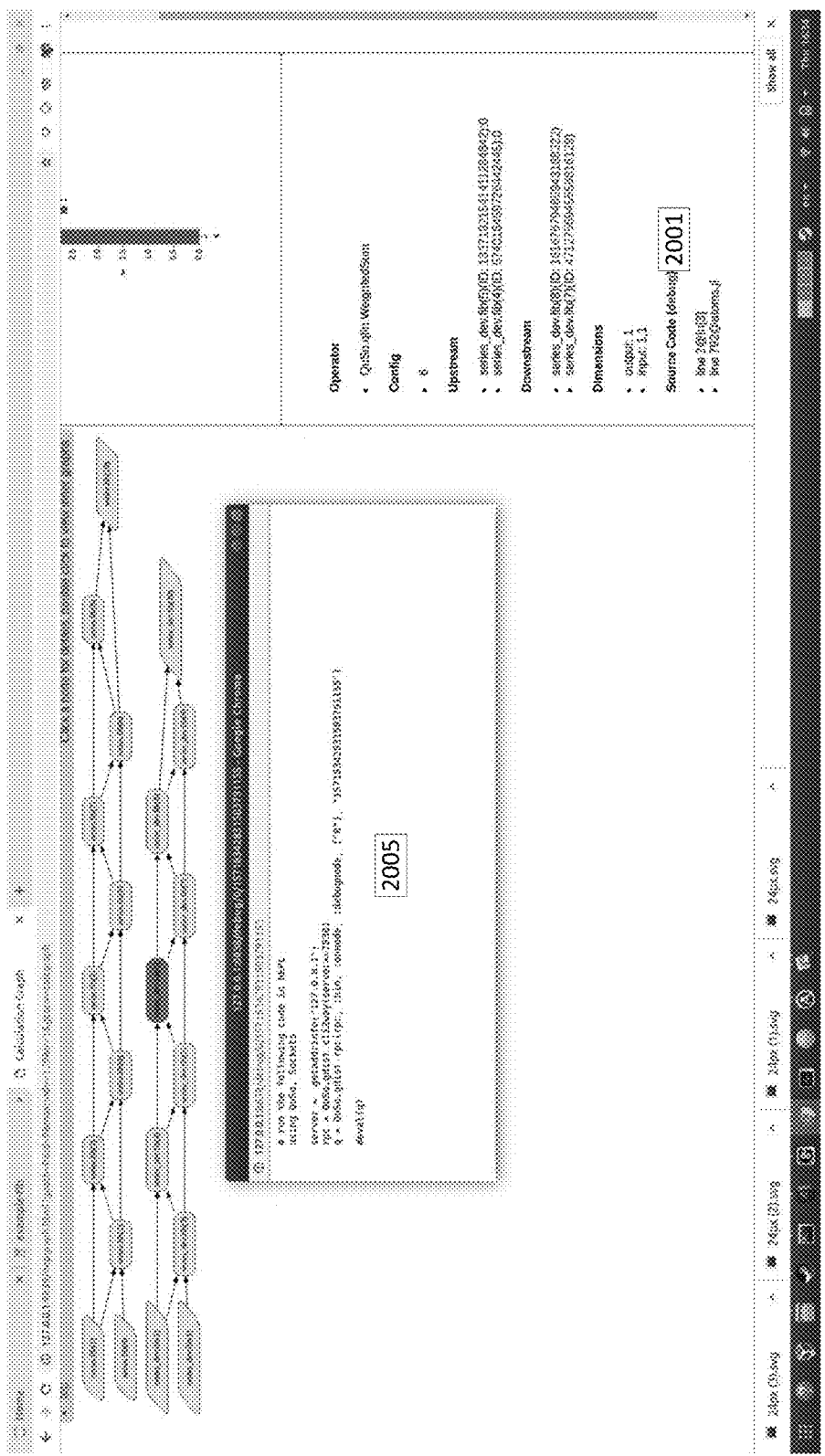
FIG. 20 shows a screen shot diagram illustrating user interface features in one embodiment of the DSGRCE.

FIG. 20 shows a screen shot diagram illustrating user interface features in one embodiment of the DSGRCE. In FIG. 20, an exemplary user interface (e.g., for a mobile device, for a website) for providing debugging capabilities is illustrated. Using the navigation features, a developer may find and inspect any intermediate calculation (e.g., on a remote system running on AWS cloud). When the developer has identified a node whose calculation might be incorrect, the developer may want to run the same calculation in a debugger and inspect the calculation step by step. However, it may not be feasible to do so on the remote system because the developer might not have the privilege to login and/or the remote system may be a production cloud that does not have any debugging information (e.g., the source or symbol files).

Instead, in some implementations, the DSGRCE may offer alternative debugging capabilities to debug a remote distributed system without the login privilege or when the production server is run without any debug symbols and information. When the developer wants to debug a given node, the developer may click on the debug link 2001, and a display (e.g., pop-up window) 2005 may show code that the developer may copy/paste to the developer's local machine and execute. After executing this code, the user may get an exact copy of the Atom in the local environment, where the developer may use a debugger locally to inspect every step of the calculation in that Atom (e.g., the source or symbol files utilized by the debugger should exist on the developer's local computer).

DETAILED DESCRIPTION OF THE DSGRCE COORDINATOR

Figure 21:
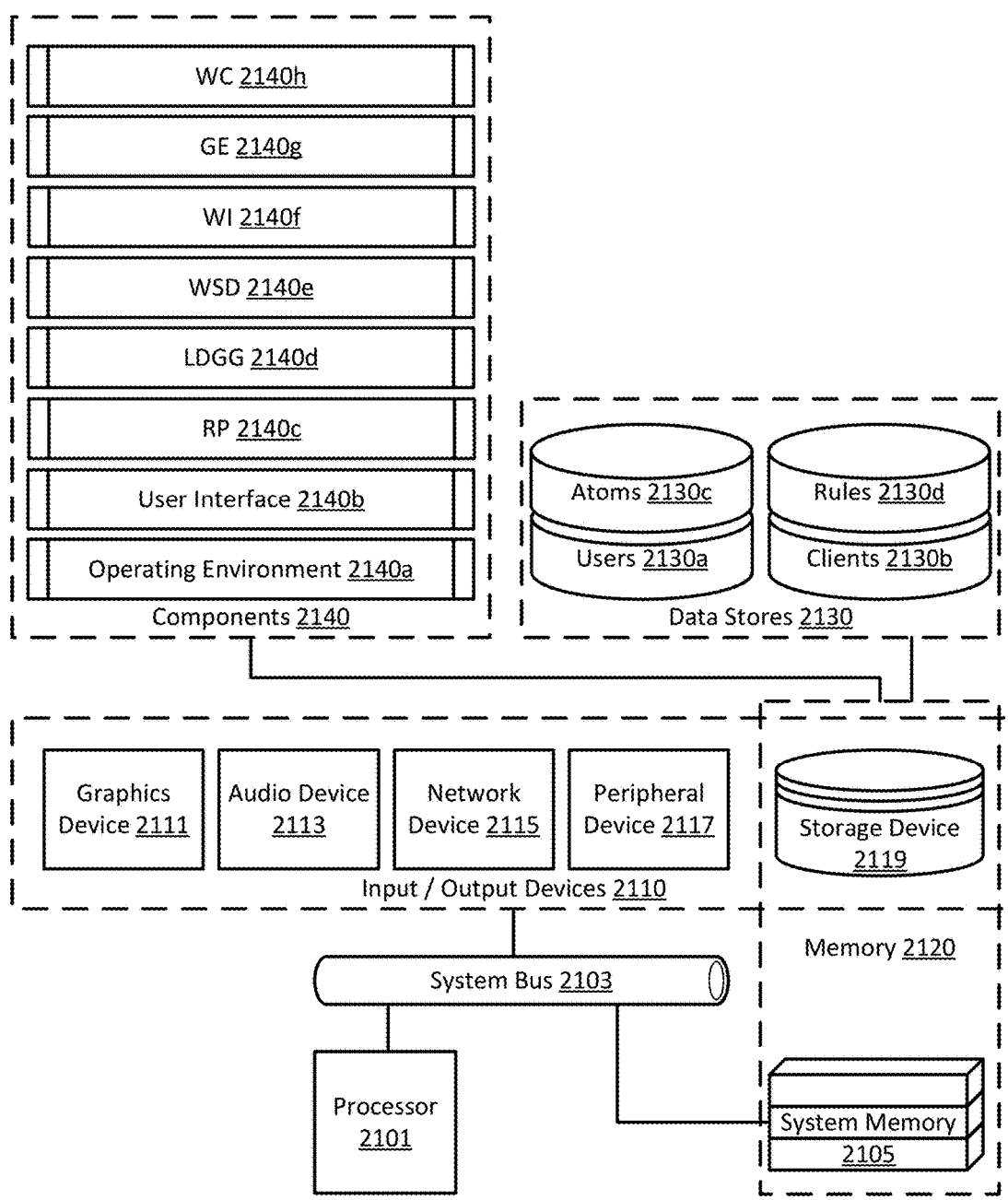
FIG. 21 shows a block diagram illustrating an exemplary DSGRCE coordinator in one embodiment of the DSGRCE.

FIG. 21 shows a block diagram illustrating an exemplary DSGRCE coordinator in one embodiment of the DSGRCE. The DSGRCE coordinator facilitates the operation of the DSGRCE via a computer system (e.g., one or more cloud computing systems (e.g., Microsoft Azure, Amazon Web Services, Google Cloud Platform), grid computing systems, virtualized computer systems, mainframe computers, servers, clients, nodes, desktops, mobile devices (e.g., such as smart phones, cellular phones, tablets, personal digital assistants (PDAs), smart watches, and/or the like), embedded computers, dedicated computers, system on a chip (SOC) devices, and/or the like). For example, the DSGRCE coordinator may receive, obtain, aggregate, process, generate, store, retrieve, send, delete, input, output, and/or the like data (including program data and program instructions); may execute program instructions; may communicate with computer systems, with nodes, with users, and/or the like. In various embodiments, the DSGRCE coordinator may comprise a standalone computer system, a distributed computer system, a node in a computer network (i.e., a network of computer systems organized in a topology), a network of DSGRCE coordinators, and/or the like. It is to be understood that the DSGRCE coordinator and/or the various DSGRCE coordinator elements (e.g., processor, system bus, memory, input/output devices) may be organized in any number of ways (i.e., using any number and configuration of computer systems, computer networks, nodes, DSGRCE coordinator elements, and/or the like) to facilitate DSGRCE operation. Furthermore, it is to be understood that the various DSGRCE coordinator computer systems, DSGRCE coordinator computer networks, DSGRCE coordinator nodes, DSGRCE coordinator elements, and/or the like may communicate among each other in any number of ways to facilitate DSGRCE operation. As used in this disclosure, the term "user" refers generally to people and/or computer systems that interact with the DSGRCE; the term "server" refers generally to a computer system, a program, and/or a combination thereof that handles requests and/or responds to requests from clients via a computer network; the term "client" refers generally to a computer system, a program, a user, and/or a combination thereof that generates requests and/or handles responses from servers via a computer network; the term "node" refers generally to a server, to a client, and/or to an intermediary computer system, program, and/or a combination thereof that facilitates transmission of and/or handling of requests and/or responses.

The DSGRCE coordinator includes a processor 2101 that executes program instructions (e.g., DSGRCE program instructions). In various embodiments, the processor may be a general purpose microprocessor (e.g., a central processing unit (CPU), an accelerated processing unit (APU)), a dedicated microprocessor (e.g., a graphics processing unit (GPU), a physics processing unit (PPU), a digital signal processor (DSP), a network processor, a tensor processing unit (TPU), a cryptographic processor, a biometrics processor, and/or the like), an external processor, a plurality of processors (e.g., working in parallel, distributed, and/or the like), a microcontroller (e.g., for an embedded system), and/or the like. The processor may be implemented using integrated circuits (ICs), application-specific integrated circuits (ASICs), field-programmable gate arrays (FPGAs), and/or the like. In various implementations, the processor may comprise one or more cores, may include embedded elements (e.g., a coprocessor such as a math coprocessor, an embedded dedicated microprocessor utilized as a coprocessor, registers, cache memory, software), may be synchronous (e.g., using a clock signal) or asynchronous (e.g., without a central clock), and/or the like. For example, the processor may be an AMD Ryzen processor, an AMD Epyc processor, an Intel Core processor, an Intel Xeon processor, an ARM Cortex processor, an Apple A processor, an Apple S processor, a Qualcomm Snapdragon processor, an IBM PowerPC processor, and/or the like.

The processor may be connected to system memory 2105 via a system bus 2103. The system bus may interconnect these and/or other elements of the DSGRCE coordinator via electrical, electronic, optical, wireless, and/or the like communication links (e.g., the system bus may be integrated into a motherboard that interconnects DSGRCE coordinator elements and provides power from a power supply). In various embodiments, the system bus may comprise one or more control buses, address buses, data buses, memory buses, peripheral buses, and/or the like. In various implementations, the system bus may be a parallel bus, a serial bus, a daisy chain design, a hub design, and/or the like. For example, the system bus may comprise a front-side bus, a back-side bus, AMD's Infinity Fabric, Intel's QuickPath Interconnect (QPI), a peripheral component interconnect (PCI) bus, a PCI Express bus, a low pin count (LPC) bus, a universal serial bus (USB), and/or the like. The system memory, in various embodiments, may comprise registers, cache memory (e.g., level one, level two, level three), volatile memory (e.g., random access memory (RAM) (e.g., static RAM (SRAM), dynamic RAM (DRAM)), non-volatile memory (e.g., read only memory (ROM), non-volatile random-access memory (NVRAM) (e.g., resistive random access memory (ReRAM), magnetoresistive random access memory (MRAM)), flash memory (e.g., NAND-type)), and/or the like. The system memory may utilize error-correcting code (ECC) technology to detect and/or correct internal data corruption. The system memory may be discreet, external, embedded, integrated into a CPU, and/or the like. The processor may access, read from, write to, store in, erase, modify, and/or the like, the system memory in accordance with program instructions (e.g., DSGRCE program instructions) executed by the processor. The system memory may facilitate accessing, storing, retrieving, modifying, deleting, and/or the like data (e.g., DSGRCE data) by the processor.

In various embodiments, input/output devices 2110 may be connected to the processor and/or to the system memory, and/or to one another via the system bus.

In some embodiments, the input/output devices may include one or more graphics devices 2111. The processor may make use of the one or more graphic devices in accordance with program instructions (e.g., DSGRCE program instructions) executed by the processor. In one implementation, a graphics device may be a video card that may obtain (e.g., via a connected video camera), process (e.g., render a frame), output (e.g., via a connected monitor, television, and/or the like), and/or the like graphical (e.g., multimedia, video, image, text) data (e.g., DSGRCE data). A video card may be connected to the system bus via an interface such as PCI, PCI Express, USB, PC Card, ExpressCard, Thunderbolt, NVLink, and/or the like. A video card may use one or more graphics processing units (GPUs), for example, by utilizing AMD's CrossFireX and/or NVIDIA's SLI technologies. A video card may be connected via an interface (e.g., video graphics array (VGA), digital video interface (DVI), Mini-DVI, Micro-DVI, high-definition multimedia interface (HDMI), DisplayPort, Thunderbolt, composite video, S-Video, component video, and/or the like) to one or more displays (e.g., cathode ray tube (CRT), liquid crystal display (LCD), touchscreen, video projector, and/or the like) that display graphics. For example, a video card may be an AMD Radeon, an NVIDIA GeForce RTX, an Intel UHD Graphics, and/or the like. In another implementation, a graphics device may be a video capture board that may obtain (e.g., via coaxial cable), process (e.g., overlay with other graphical data), capture, convert (e.g., between different formats, such as MPEG2 to H.264), and/or the like graphical data. A video capture board may be and/or include a TV tuner, may be compatible with a variety of broadcast signals (e.g., NTSC, PAL, ATSC, QAM) may be a part of a video card, and/or the like. For example, a video capture board may be a Hauppauge ImpactVCB, a Hauppauge WinTV-HVR, a Hauppauge Colossus, and/or the like. A graphics device may be discreet, external, embedded, integrated into a CPU, and/or the like. A graphics device may operate in combination with other graphics devices (e.g., in parallel) to provide improved capabilities, data throughput, color depth, and/or the like.

In some embodiments, the input/output devices may include one or more audio devices 2113. The processor may make use of the one or more audio devices in accordance with program instructions (e.g., DSGRCE program instructions) executed by the processor. In one implementation, an audio device may be a sound card that may obtain (e.g., via a connected microphone), process, output (e.g., via connected speakers), and/or the like audio data (e.g., DSGRCE data). A sound card may be connected to the system bus via an interface such as PCI, PCI Express, USB, PC Card, ExpressCard, Thunderbolt, and/or the like. A sound card may be connected via an interface (e.g., tip sleeve (TS), tip ring sleeve (TRS), RCA, TOSLINK, optical) to one or more amplifiers, speakers (e.g., mono, stereo, surround sound), subwoofers, digital musical instruments, and/or the like. For example, a sound card may be an Intel AC'97 integrated codec chip, an Intel HD Audio integrated codec chip, a Creative Sound Blaster, and/or the like. An audio device may be discreet, external, embedded, integrated into a motherboard (e.g., via a chipset), and/or the like. An audio device may operate in combination with other audio devices (e.g., in parallel) to provide improved capabilities, data throughput, audio quality, and/or the like.

In some embodiments, the input/output devices may include one or more network devices 2115. The processor may make use of the one or more network devices in accordance with program instructions (e.g., DSGRCE program instructions) executed by the processor. In one implementation, a network device may be a network card that may obtain (e.g., via a Category 6 Ethernet cable), process, output (e.g., via a wireless antenna), and/or the like network data (e.g., DSGRCE data). A network card may be connected to the system bus via an interface such as PCI, PCI Express, USB, FireWire, PC Card, ExpressCard, Thunderbolt, and/or the like. A network card may be a wired network card (e.g., 10/100/1000BASE-T, optical fiber), a wireless network card (e.g., Wi-Fi 802.11ac/ad/ax/ay, Bluetooth, Near Field Communication (NFC), TransferJet), a modem (e.g., dialup telephone-based, asymmetric digital subscriber line (ADSL), cable modem, power line modem, wireless modem based on cellular protocols such as high speed packet access (HSPA), evolution-data optimized (EV-DO), global system for mobile communications (GSM), worldwide interoperability for microwave access (WiMax), long term evolution (LTE), 5G, and/or the like, satellite modem, FM radio modem, radio-frequency identification (RFID) modem, infrared (IR) modem), and/or the like. For example, a network card may be an Intel Gigabit Adapter, a LINKSYS USB Ethernet Adapter, an ASUS wireless Bluetooth and Gigagbit WiFi adapter, a Motorola SURFboard Cable Modem, a U.S. Robotics Faxmodem, a Zoom ADSL Modem/Router, a TRENDnet Powerline Ethernet Adapter, a StarTech Gigabit Ethernet Multi Mode Fiber Media Converter, a Broadcom NFC controller, a Qualcomm Snapdragon 4G LTE and 5G modem, a Toshiba TransferJet device, and/or the like. A network device may be discreet, external, embedded, integrated into a motherboard, and/or the like. A network device may operate in combination with other network devices (e.g., in parallel) to provide improved data throughput, redundancy, and/or the like. For example, protocols such as link aggregation control protocol (LACP) (e.g., based on IEEE 802.3AD or IEEE 802.1AX standards) may be used. A network device may be used to connect to a local area network (LAN), a wide area network (WAN), a metropolitan area network (MAN), a personal area network, the Internet, an intranet, a Bluetooth network, an NFC network, a Wi-Fi network, a cellular network, and/or the like.

In some embodiments, the input/output devices may include one or more peripheral devices 2117. The processor may make use of the one or more peripheral devices in accordance with program instructions (e.g., DSGRCE program instructions) executed by the processor. In various implementations, a peripheral device may be a digital camera, a video camera, a webcam, an electronically moveable pan tilt zoom (PTZ) camera, a monitor, a touchscreen display, active shutter 3D glasses, head-tracking 3D glasses, a virtual reality (VR) headset, an augmented reality (AR) headset, a remote control, an audio line-in, an audio line-out, a microphone, headphones, speakers, a subwoofer, an amplifier, a router, a hub, a switch, a firewall, an antenna, a keyboard, a mouse, a trackpad, a trackball, a digitizing tablet, a stylus, a joystick, a gamepad, a game controller, a force-feedback device, a laser, sensors (e.g., proximity sensor, rangefinder, ambient temperature sensor, ambient light sensor, humidity sensor, an accelerometer, a gyroscope, a motion sensor, an olfaction sensor, a biosensor, a biometric sensor, a chemical sensor, a magnetometer, a radar, a sonar, a location sensor such as global positioning system (GPS), Galileo, GLONASS, and/or the like), a printer, a fax, a scanner, a copier, a card reader, a fingerprint reader, a pin entry device (PED), a Trusted Platform Module (TPM), a hardware security module (HSM), and/or the like. A peripheral device may be connected to the system bus via an interface such as PCI, PCI Express, USB, FireWire, VGA, DVI, Mini-DVI, Micro-DVI, HDMI, DisplayPort, Thunderbolt, composite video, S-Video, component video, PC Card, ExpressCard, serial port, parallel port, PS/2, TS, TRS, RCA, TOSLINK, network connection (e.g., wired such as Ethernet, optical fiber, and/or the like; wireless such as Wi-Fi, Bluetooth, NFC, cellular, 5G, and/or the like), a connector of another input/output device, and/or the like. A peripheral device may be discreet, external, embedded, integrated (e.g., into a processor, into a motherboard), and/or the like. A peripheral device may operate in combination with other peripheral devices (e.g., in parallel) to provide the DSGRCE coordinator with a variety of input, output and processing capabilities.

In some embodiments, the input/output devices may include one or more storage devices 2119. The processor may access, read from, write to, store in, erase, modify, and/or the like a storage device in accordance with program instructions (e.g., DSGRCE program instructions) executed by the processor. A storage device may facilitate accessing, storing, retrieving, modifying, deleting, and/or the like data (e.g., DSGRCE data) by the processor. In one implementation, the processor may access data from the storage device directly via the system bus. In another implementation, the processor may access data from the storage device by instructing the storage device to transfer the data to the system memory and accessing the data from the system memory. In various embodiments, a storage device may be a hard disk drive (HDD), a solid-state drive (SSD), an optical disk drive (e.g., compact disk (CD-ROM) drive, CD-Recordable (CD-R) drive, CD-Rewriteable (CD-RW) drive, digital versatile disc (DVD-ROM) drive, DVD-R drive, DVD-RW drive, Blu-ray disk (BD) drive) using an optical medium, a magnetic tape drive using a magnetic tape, a memory card (e.g., a USB flash drive, a compact flash (CF) card, a secure digital extended capacity (SDXC) card), a network attached storage (NAS), a direct-attached storage (DAS), a storage area network (SAN), other processor-readable physical mediums, and/or the like. A storage device may be connected to the system bus via an interface such as PCI, PCI Express, USB, FireWire, PC Card, ExpressCard, Thunderbolt, integrated drive electronics (IDE), serial advanced technology attachment (SATA), non-volatile memory express (NVMe), external SATA (eSATA), small computer system interface (SCSI), serial attached SCSI (SAS), fibre channel (FC), network connection (e.g., wired such as Ethernet, optical fiber, and/or the like; wireless such as Wi-Fi, Bluetooth, NFC, cellular, 5G, and/or the like), and/or the like. A storage device may be discreet, external, embedded, integrated (e.g., into a motherboard, into another storage device), and/or the like. A storage device may operate in combination with other storage devices to provide improved capacity, data throughput, data redundancy, and/or the like. For example, protocols such as redundant array of independent disks (RAID) (e.g., RAID 0 (striping), RAID 1 (mirroring), RAID 5 (striping with distributed parity), hybrid RAID), just a bunch of drives (JBOD), and/or the like may be used. In another example, virtual and/or physical drives may be pooled to create a storage pool (e.g., for virtual storage, cloud storage, and/or the like). In yet another example, an SSD cache may be used with an HDD to improve speed.

Together and/or separately the system memory 2105 and the one or more storage devices 2119 may be referred to as memory 2120 (i.e., physical memory).

DSGRCE memory 2120 contains processor-operable (e.g., accessible) DSGRCE data stores 2130. Data stores 2130 comprise data that may be used (e.g., by the DSGRCE) via the DSGRCE coordinator. Such data may be organized using one or more data formats such as a database (e.g., a relational database with database tables, an object-oriented database, a graph database, a hierarchical database, a key-value NoSQL database), a flat file (e.g., organized into a tabular format), a binary file (e.g., a GIF file, an MPEG-4 file), a structured file (e.g., an HTML file, an XML file), a text file, and/or the like. Furthermore, data may be organized using one or more data structures such as an array, a queue, a stack, a set, a linked list, a map, a tree, a hash, a record, an object, a directed graph, and/or the like. In various embodiments, data stores may be organized in any number of ways (i.e., using any number and configuration of data formats, data structures, DSGRCE coordinator elements, and/or the like) to facilitate DSGRCE operation. For example, DSGRCE data stores may comprise data stores 2130a-d implemented as one or more databases. A users data store 2130a may be a collection of database tables that include fields such as UserID, UserName, UserPreferences, and/or the like. A clients data store 2130*b* may be a collection of database tables that include fields such as ClientID, ClientName, ClientDeviceType, ClientScreenResolution, and/or the like. An atoms data store 2130*c* may be a collection of database tables that include fields such as AtomID, AtomName, AtomParameters, AtomVersion, AtomDeveloperID, AtomAccessPriveleges, and/or the like. A rules data store 2130*d* may be a collection of database tables that include fields such as RuleID, RuleNamespace, RuleName, RuleParameters, RulePrecedentRules, RuleDependentRules, RuleAtomID, RuleAtomParameters, RuleAccessPriveleges, and/or the like. The DSGRCE coordinator may use data stores 2130 to keep track of inputs, parameters, settings, variables, records, outputs, and/or the like.

DSGRCE memory 2120 contains processor-operable (e.g., executable) DSGRCE components 2140. Components 2140 comprise program components (including program instructions and any associated data stores) that are executed (e.g., by the DSGRCE) via the DSGRCE coordinator (i.e., via the processor) to transform DSGRCE inputs into DSGRCE outputs. It is to be understood that the various components and their subcomponents, capabilities, applications, and/or the like may be organized in any number of ways (i.e., using any number and configuration of components, subcomponents, capabilities, applications, DSGRCE coordinator elements, and/or the like) to facilitate DSGRCE operation. Furthermore, it is to be understood that the various components and their subcomponents, capabilities, applications, and/or the like may communicate among each other in any number of ways to facilitate DSGRCE operation. For example, the various components and their subcomponents, capabilities, applications, and/or the like may be combined, integrated, consolidated, split up, distributed, and/or the like in any number of ways to facilitate DSGRCE operation. In another example, a single or multiple instances of the various components and their subcomponents, capabilities, applications, and/or the like may be instantiated on each of a single DSGRCE coordinator node, across multiple DSGRCE coordinator nodes, and/or the like.

In various embodiments, program components may be developed using one or more programming languages, techniques, tools, and/or the like such as an assembly language, Ada, BASIC, C, C++, C#, COBOL, Fortran, Java, LabVIEW, Lisp, Mathematica, MATLAB, OCaml, PL/I, Smalltalk, Visual Basic for Applications (VBA), HTML, XML, CSS, JavaScript, JavaScript Object Notation (JSON), PHP, Perl, Ruby, Python, Asynchronous JavaScript and XML (AJAX), WebSocket Protocol, Simple Object Access Protocol (SOAP), SSL, ColdFusion, Microsoft .NET, Apache modules, Adobe Flash, Adobe AIR, Microsoft Silverlight, Windows PowerShell, batch files, Tcl, graphical user interface (GUI) toolkits, SQL, database adapters, web application programming interfaces (APIs), web frameworks (e.g., Ruby on Rails, AngularJS), application server extensions, integrated development environments (IDEs), libraries (e.g., object libraries, class libraries, remote libraries), remote procedure calls (RPCs), Common Object Request Broker Architecture (CORBA), and/or the like.

In some embodiments, components 2140 may include an operating environment component 2140*a*. The operating environment component may facilitate operation of the DSGRCE via various subcomponents.

In some implementations, the operating environment component may include an operating system subcomponent. The operating system subcomponent may provide an abstraction layer that facilitates the use of, communication among, common services for, interaction with, security of, and/or the like of various DSGRCE coordinator elements, components, data stores, and/or the like.

In some embodiments, the operating system subcomponent may facilitate execution of program instructions (e.g., DSGRCE program instructions) by the processor by providing process management capabilities. For example, the operating system subcomponent may facilitate the use of multiple processors, the execution of multiple processes, the execution of multiple threads, multitasking, and/or the like.

In some embodiments, the operating system subcomponent may facilitate the use of memory by the DSGRCE. For example, the operating system subcomponent may allocate and/or free memory, facilitate memory addressing, provide memory segmentation and/or protection, provide virtual memory capability, facilitate caching, and/or the like. In another example, the operating system subcomponent may include a file system (e.g., File Allocation Table (FAT), New Technology File System (NTFS), Hierarchical File System Plus (HFS+), Apple File System (APFS), Universal Disk Format (UDF), Linear Tape File System (LTFS)) to facilitate storage, retrieval, deletion, aggregation, processing, generation, and/or the like of data.

In some embodiments, the operating system subcomponent may facilitate operation of and/or processing of data for and/or from input/output devices. For example, the operating system subcomponent may include one or more device drivers, interrupt handlers, file systems, and/or the like that allow interaction with input/output devices.

In some embodiments, the operating system subcomponent may facilitate operation of the DSGRCE coordinator as a node in a computer network by providing support for one or more communications protocols. For example, the operating system subcomponent may include support for the internet protocol suite (i.e., Transmission Control Protocol/Internet Protocol (TCP/IP)) of network protocols such as IP, IPsec, Mobile IP, TCP, User Datagram Protocol (UDP), and/or the like. In another example, the operating system subcomponent may include support for security protocols (e.g., Wired Equivalent Privacy (WEP), Wi-Fi Protected Access (WPA), WPA2, WPA3) for wireless computer networks. In yet another example, the operating system subcomponent may include support for virtual private networks (VPNs).

In some embodiments, the operating system subcomponent may facilitate security of the DSGRCE coordinator. For example, the operating system subcomponent may provide services such as authentication, authorization, audit, network intrusion-detection capabilities, firewall capabilities, antivirus capabilities, and/or the like.

In some embodiments, the operating system subcomponent may facilitate user interaction with the DSGRCE by providing user interface elements that may be used by the DSGRCE to generate a user interface. In one implementation, such user interface elements may include widgets (e.g., windows, dialog boxes, scrollbars, menu bars, tabs, ribbons, menus, buttons, text boxes, checkboxes, combo boxes, drop-down lists, list boxes, radio buttons, sliders, spinners, grids, labels, progress indicators, icons, tooltips, and/or the like) that may be used to obtain input from and/or provide output to the user. For example, such widgets may be used via a widget toolkit such as Microsoft Foundation Classes (MFC), Apple Cocoa Touch, Java Swing, JavaFX, jQuery UI, GTK, Qt, and/or the like. In another implementation, such user interface elements may include sounds (e.g., event notification sounds stored in MP3 file format), animations, vibrations, and/or the like that may be used to inform the user regarding occurrence of various events. For example, the operating system subcomponent may include a user interface such as Windows Aero, Windows Metro, macOS X Aqua, macOS X Flat, GNOME Shell, KDE Plasma Workspaces (e.g., Plasma Desktop, Plasma Netbook, Plasma Contour, Plasma Mobile), and/or the like.

In various embodiments the operating system subcomponent may comprise a single-user operating system, a multi-user operating system, a single-tasking operating system, a multitasking operating system, a single-processor operating system, a multiprocessor operating system, a distributed operating system, an embedded operating system, a real-time operating system, and/or the like. For example, the operating system subcomponent may comprise an operating system such as UNIX, LINUX, IBM i, Sun Solaris, Microsoft Windows Server, Microsoft DOS, Microsoft Windows 10, Apple Mac OS X, Apple iOS, Google Android, and/or the like.

In some implementations, the operating environment component may include a database subcomponent. The database subcomponent may facilitate DSGRCE capabilities such as storage, analysis, retrieval, access, modification, deletion, aggregation, generation, and/or the like of data (e.g., the use of data stores 2130). The database subcomponent may make use of database languages (e.g., Structured Query Language (SQL), XQuery, Cassandra Query Language (CQL)), stored procedures, triggers, APIs, and/or the like to provide these capabilities. In various embodiments the database subcomponent may comprise a cloud database, a data warehouse, a distributed database, an embedded database, a parallel database, a real-time database, and/or the like. For example, the database subcomponent may comprise a database such as Microsoft SQL Server, Microsoft Access, MySQL, IBM DB2, Oracle Database, Apache Cassandra database, MongoDB, and/or the like.

In some implementations, the operating environment component may include an information handling subcomponent. The information handling subcomponent may provide the DSGRCE with capabilities to serve, deliver, upload, obtain, present, download, and/or the like a variety of information. The information handling subcomponent may use protocols such as Hypertext Transfer Protocol (HTTP), Hypertext Transfer Protocol Secure (HTTPS), File Transfer Protocol (FTP), Telnet, Secure Shell (SSH), Transport Layer Security (TLS), Secure Sockets Layer (SSL), peer-to-peer (P2P) protocols (e.g., BitTorrent, Bitcoin), and/or the like to handle communication of information such as web pages, files, multimedia content (e.g., streaming media), applications, transactions, and/or the like.

In some embodiments, the information handling subcomponent may facilitate the serving of information to users, DSGRCE components, nodes in a computer network, web browsers, and/or the like. For example, the information handling subcomponent may comprise a web server such as Apache HTTP Server, Microsoft Internet Information Services (IIS), Oracle WebLogic Server, Adobe Flash Media Server, Adobe Content Server, and/or the like. Furthermore, a web server may include extensions, plug-ins, add-ons, servlets, and/or the like. For example, these may include Apache modules, IIS extensions, Java servlets, and/or the like. In some implementations, the information handling subcomponent may communicate with the database subcomponent via standards such as Open Database Connectivity (ODBC), Java Database Connectivity (JDBC), ActiveX Data Objects for .NET (ADO.NET), and/or the like. For example, the information handling subcomponent may use such standards to store, analyze, retrieve, access, modify, delete, aggregate, generate, and/or the like data (e.g., data from data stores 2130) via the database subcomponent.

In some embodiments, the information handling subcomponent may facilitate presentation of information obtained from users, DSGRCE components, nodes in a computer network, web servers, and/or the like. For example, the information handling subcomponent may comprise a web browser such as Microsoft Internet Explorer, Microsoft Edge, Mozilla Firefox, Apple Safari, Google Chrome, Opera Mobile, Amazon Silk, Nintendo 3DS Internet Browser, and/or the like. Furthermore, a web browser may include extensions, plug-ins, add-ons, applets, and/or the like. For example, these may include Adobe Flash Player, Adobe Acrobat plug-in, Microsoft Silverlight plug-in, Microsoft Office plug-in, Java plug-in, and/or the like.

In some implementations, the operating environment component may include a messaging subcomponent. The messaging subcomponent may facilitate DSGRCE message communications capabilities. The messaging subcomponent may use protocols such as Simple Mail Transfer Protocol (SMTP), Internet Message Access Protocol (IMAP), Post Office Protocol (POP), Extensible Messaging and Presence Protocol (XMPP), Real-time Transport Protocol (RTP), Internet Relay Chat (IRC), Skype protocol, Messaging Application Programming Interface (MAPI), Facebook API, a custom protocol, and/or the like to facilitate DSGRCE message communications. The messaging subcomponent may facilitate message communications such as email, instant messaging, Voice over IP (VoIP), video conferencing, Short Message Service (SMS), web chat, in-app messaging (e.g., alerts, notifications), and/or the like. For example, the messaging subcomponent may comprise Microsoft Exchange Server, Microsoft Outlook, Sendmail, IBM Domino, IBM Notes, Gmail, ICQ, Trillian, Skype, Google Hangouts, Apple FaceTime, Apple iChat, Facebook Chat, and/or the like.

In some implementations, the operating environment component may include a security subcomponent that facilitates DSGRCE security. In some embodiments, the security subcomponent may restrict access to the DSGRCE, to one or more services provided by the DSGRCE, to data associated with the DSGRCE (e.g., stored in data stores 2130), to communication messages associated with the DSGRCE, and/or the like to authorized users. Access may be granted via a login screen, via an API that obtains authentication information, via an authentication token, via a cryptographic key (e.g., stored in an HSM), and/or the like. For example, the user may obtain access by providing a username and/or a password (e.g., a string of characters, a picture password), a personal identification number (PIN), an identification card, a magnetic stripe card, a smart card, a biometric identifier (e.g., a finger print, a voice print, a retina scan, a face scan), a gesture (e.g., a swipe), a media access control (MAC) address, an IP address, and/or the like. Various security models such as access-control lists (ACLs), capability-based security, hierarchical protection domains, multi-factor authentication, and/or the like may be used to control access. For example, the security subcomponent may facilitate digital rights management (DRM), network intrusion detection, firewall capabilities, cryptographic wallet access (e.g., for cryptocurrencies such as Bitcoin, Ethereum, and/or the like), and/or the like.

In some embodiments, the security subcomponent may use cryptographic techniques to secure information (e.g., by storing encrypted data), verify message authentication (e.g., via a digital signature), provide integrity checking (e.g., a checksum), authorize transactions (e.g., using a private key), and/or the like by facilitating encryption and/or decryption of data. Furthermore, steganographic techniques may be used instead of or in combination with cryptographic techniques. Cryptographic techniques used by the DSGRCE may include symmetric key cryptography using shared keys (e.g., using one or more block ciphers such as triple Data Encryption Standard (DES), Advanced Encryption Standard (AES); stream ciphers such as Rivest Cipher 4 (RC4), Rabbit), asymmetric key cryptography using a public key/private key pair (e.g., using algorithms such as Rivest-Shamir-Adleman (RSA), Elliptic Curve Digital Signature Algorithm (ECDSA)), cryptographic hash functions (e.g., using algorithms such as Message-Digest 5 (MD5), Secure Hash Algorithm 3 (SHA-3)), and/or the like. For example, the security subcomponent may comprise a cryptographic system such as Pretty Good Privacy (PGP).

In some implementations, the operating environment component may include a virtualization subcomponent that facilitates DSGRCE virtualization capabilities. The virtualization subcomponent may include hypervisors (e.g., Type-1 native hypervisors, Type-2 hosted hypervisors), virtual machines (VMs), and/or the like. In some embodiments, the virtualization subcomponent may provide support for platform virtualization (e.g., via a virtual machine). Platform virtualization types may include full virtualization, partial virtualization, paravirtualization, and/or the like. In some implementations, platform virtualization may be hardware-assisted (e.g., via support from the processor using technologies such as AMD-V, Intel VT-x, and/or the like). In some embodiments, the virtualization subcomponent may provide support for various other virtualized environments such as via operating-system level virtualization, desktop virtualization, workspace virtualization, mobile virtualization, application virtualization, database virtualization, and/or the like. In some embodiments, the virtualization subcomponent may provide support for various virtualized resources such as via processing resources virtualization, memory virtualization, storage virtualization, data virtualization, network virtualization, and/or the like. For example, the virtualization subcomponent may comprise VMware software suite (e.g., VMware Workstation, VMware Player, VMware ESXi, VMware ThinApp, VMware Infrastructure), Parallels software suite (e.g., Parallels Server, Parallels Desktop), Virtuozzo software suite (e.g., Virtuozzo Infrastructure Platform, Virtuozzo), Oracle software suite (e.g., Oracle VM Server for SPARC, Oracle VM Server for x86, Oracle VM VirtualBox, Oracle Solaris 11), Wine, and/or the like.

In some embodiments, components 2140 may include a user interface component 2140b. The user interface component may facilitate user interaction with the DSGRCE by providing a user interface. In various implementations, the user interface component may include programmatic instructions to obtain input from and/or provide output to the user via physical controls (e.g., physical buttons, switches, knobs, wheels, dials), textual user interface, audio user interface, GUI, voice recognition, gesture recognition, touch and/or multi-touch user interface, messages, APIs, and/or the like. In some implementations, the user interface component may make use of the user interface elements provided by the operating system subcomponent of the operating environment component. For example, the user interface component may make use of the operating system subcomponent's user interface elements via a widget toolkit. In some implementations, the user interface component may make use of information presentation capabilities provided by the information handling subcomponent of the operating environment component. For example, the user interface component may make use of a web browser to provide a user interface via HTML5, Adobe Flash, Microsoft Silverlight, and/or the like.

In some embodiments, components 2140 may include any of the components RP 2140c, LDGG 2140d, WSD 2140e, WI 2140f, GE 2140g, WC 2140h, etc. described in more detail in preceding figures.

Additional embodiments may include:

1. A distributed system generating rule compiler apparatus, comprising: a memory;
   a processor in communication with the memory, and configured to issue a plurality of processing instructions stored in the memory, wherein the processor issues instructions to:
   (a) obtain, via the processor, a distributed system execution request data structure;
   (b) determine, via the processor, an output rule and the output rule's set of rule parameters specified via the distributed system execution request data structure for a requested calculation, wherein a current rule is initialized to the output rule;
   (c) query, via the processor, a rule lookup table data structure to determine a set of matching rules, corresponding to the current rule, based on the current rule's identification tuple;
   (d) select, via the processor, the best matching rule from the set of matching rules, wherein the best matching rule's set of rule parameters best corresponds to the current rule's set of rule parameters;
   (e) generate, via the processor, a logical dependency graph data structure by adding logical dependency graph nodes and logical dependency graph edges corresponding to the best matching rule, precedent rules of the best matching rule, and precedent rules of each precedent rule;
   (f) determine, via the processor, an execution complexity gauge value associated with the generated logical dependency graph data structure;
   (g) determine, via the processor, a set of distributed worker processes to be utilized to execute the requested calculation;
   (h) divide, via the processor, the generated logical dependency graph data structure into a set of subgraphs based on the execution complexity gauge value, wherein each worker process in the set of distributed worker processes is assigned a subgraph from the set of subgraphs;
   (i) initialize, via the processor, each respective worker process in the set of distributed worker processes with the subgraph assigned to the respective worker process;
   (j) coordinate, via the processor, execution of the requested calculation by worker processes in the set of distributed worker processes, wherein each respective worker process calculates results for logical dependency graph nodes in the subgraph assigned to the respective worker process; and
   (k) obtain, via the processor, a computation result of the logical dependency graph node corresponding to the output rule, from the worker process in the set of distributed worker processes that is assigned the subgraph that contains the logical dependency graph node corresponding to the output rule.

2. The apparatus of embodiment 1, wherein the rule lookup table data structure contains a set of identification tuple to rule data structure mappings.
3. The apparatus of embodiment 2, wherein a rule data structure includes a data field that references an associated concrete atom data structure that implements a forward calculation operation of a generic atom interface to calculate a result.
4. The apparatus of embodiment 3, wherein a rule data structure includes a data field that references a factory function that creates an instance of the associated concrete atom data structure.
5. The apparatus of one of the embodiments 1-4, wherein an identification tuple comprises an ordered list that includes a rule's namespace and rule name.
6. The apparatus of one of the embodiments 1-4, wherein an identification tuple comprises a hash value calculated based on an ordered list that includes a rule's namesp ace and rule name.
7. The apparatus of one of the embodiments 1-6, wherein a single rule exists in the set of matching rules, and the single rule is selected as the best matching rule.
8. The apparatus of one of the embodiments 1-6, wherein multiple rules exist in the set of matching rules, and a rule with the minimum inheritance distance is selected as the best matching rule.
9. The apparatus of embodiment 8, wherein multiple rules with the minimum inheritance distance exist, and the best matching rule is selected using a tie breaker technique based on one of: position of rule parameters, types of rule parameters.
10. The apparatus of one of the embodiments 1-9, wherein the instructions to (e) generate the logical dependency graph data structure further comprise instructions to:
    (e1) determine, via the processor, a logical dependency graph node identifier for the best matching rule;
    (e2) either, upon determining, via the processor, that the logical dependency graph node identifier does not yet exist in the logical dependency graph data structure:
        add, via the processor, a new logical dependency graph node, corresponding to the best matching rule, to the logical dependency graph data structure, wherein the new logical dependency graph node is assigned the logical dependency graph node identifier;
        upon determining, via the processor, that the current rule is not the output rule, add a logical dependency graph edge between the new logical dependency graph node and a logical dependency graph node corresponding to the best matching rule's dependent rule;
        determine, via the processor, a set of precedent rules for the best matching rule, wherein the best matching rule is a dependent rule for precedent rules in the set of precedent rules; and
        process, via the processor, each respective precedent rule in the set of precedent rules by: setting the current rule to the respective precedent rule, and repeating elements (c)-(e); and
        return, via the processor, to processing precedent rules of the best matching rule's dependent rule until precedent rules for the output rule are processed;
    (e3) or, upon determining, via the processor, that the logical dependency graph node identifier already exists in the logical dependency graph data structure:
        add, via the processor, a logical dependency graph edge between an existing logical dependency graph node, associated with the logical dependency graph node identifier, and a logical dependency graph node corresponding to the best matching rule's dependent rule; and
        return, via the processor, to processing precedent rules of the best matching rule's dependent rule.
11. The apparatus of one of the embodiments 1-10, wherein a logical dependency graph node is a data structure that includes a data field that that references a corresponding rule's identification tuple.
12. The apparatus of one of the embodiments 1-11, wherein a logical dependency graph edge is a data field in a logical dependency graph node that refers to another logical dependency graph node.
13. The apparatus of one of the embodiments 1-12, wherein the execution complexity gauge value is determined based on at least one of: the number of nodes in the logical dependency graph, the sum of output tensor sizes of logical dependency graph nodes, network data transfer size associated with the logical dependency graph, computation time of the requested calculation.
14. The apparatus of one of the embodiments 1-13, wherein the carclinality of the set of distributed worker processes is determined based on a specified fixed number of available worker processes.
15. The apparatus of one of the embodiments 1-13, wherein the carclinality of the set of distributed worker processes is determined based on the execution complexity gauge value and a scaling parameter value, wherein the scaling parameter value is determined based on at least one of: target processing time, target available memory, target cost, target data transfer size.
16. The apparatus of embodiment 15, wherein the cardinality of the set of distributed worker processes is further determined based on an average worker execution capability.
17. The apparatus of one of the embodiments 1-16, wherein the number of nodes in a subgraph assigned to each respective worker process is determined based on the respective worker's worker execution capability, wherein worker execution capability is determined based on at least one of: processor speed, memory size, network speed.
18. The apparatus of one of the embodiments 1-17, wherein at least some of logical dependency graph nodes in the generated logical dependency graph data structure are duplicated in multiple subgraphs that are assigned to different worker processes.
19. The apparatus of one of the embodiments 1-18, wherein the generated logical dependency graph data structure includes a packaged logical dependency graph node that utilizes an internal logical dependency graph data structure, wherein the internal logical dependency graph data structure is constructed using an associated packaged atom data structure.
20. The apparatus of embodiment 19, wherein the internal logical dependency graph data structure is in the same memory space as the worker process in the set of distributed worker processes that is assigned the subgraph that contains the packaged logical dependency graph node.
21. The apparatus of embodiment 19, wherein the internal logical dependency graph data structure is distributed across multiple worker processes in the set of distributed worker processes.

22. The apparatus of one of the embodiments 1-21, further comprising:
the processor issues instructions to:
provide a graph representation of the logical dependency graph data structure;
obtain a user selection of a target node in the graph representation;
determine a target logical dependency graph node in the logical dependency graph data structure corresponding to the user selected target node in the graph representation;
obtain a computation result of the target logical dependency graph node from the worker process in the set of distributed worker processes that is assigned the subgraph that contains the target logical dependency graph node; and
provide the computation result for display.

23. The apparatus of embodiment 22, wherein the target node in the graph representation includes a visual indicator that specifies the worker process in the set of distributed worker processes that is assigned the subgraph that contains the target logical dependency graph node.

24. The apparatus of embodiment 23, wherein the visual indicator is at least one of: color, color pattern, shape, or border style of the target node.

25. The apparatus of embodiment 22, wherein each node in the graph representation includes a visual indicator that specifies whether the respective node's precedent nodes are displayed.

26. The apparatus of embodiment 25, wherein the visual indicator is at least one of: color, color pattern, shape, or border style of the respective node.

27. The apparatus of one of the embodiments 22-26, further comprising:
the processor issues instructions to:
obtain a user command to view state replication code, wherein execution of state replication code on a remote client replicates state of an associated logical dependency graph node on the remote client;
determine state replication code associated with the target logical dependency graph node; and
generate a display containing the determined state replication code.

28. The apparatus of one of the embodiments 22-27, further comprising:
the processor issues instructions to:
obtain a user command to switch graph display mode;
provide a second graph representation of a rule dependency graph data structure corresponding to the logical dependency graph data structure;
obtain a user selection of a second target node in the second graph representation; and
provide display information associated with the second target node, wherein the display information includes a list of logical dependency graph nodes associated with the second target node and metadata associated with the second target node.

29. The apparatus of one of the embodiments 1-21, further comprising:
the processor issues instructions to:
provide a graph representation of the logical dependency graph data structure;
obtain a user selection of a target node in the graph representation;
determine a target logical dependency graph node in the logical dependency graph data structure corresponding to the user selected target node in the graph representation; and
provide a second graph representation of the target logical dependency graph node's internal logical dependency graph data structure upon determining that the target logical dependency graph node is a packaged atom.

30. The apparatus of embodiment 29, further comprising:
the processor issues instructions to:
obtain a user command to switch graph display mode; and
provide a third graph representation of a rule dependency graph data structure corresponding to the target logical dependency graph node's internal logical dependency graph data structure.

31. The apparatus of embodiment 30, wherein the third graph representation further includes a graph representation of a rule dependency graph data structure corresponding to the logical dependency graph data structure.

32. The apparatus of one of the embodiments 30-31, wherein nested graph representations of rule dependency graph data structures include navigation links that facilitate navigation among the nested graph representations.

33. The apparatus of one of the embodiments 1-32, wherein at least one of: the best matching rule, a precedent rule of the best matching rule, and a precedent rule of another precedent rule utilizes dynamic precedents.

34. The apparatus of one of the embodiments 1-33, wherein at least one of: the best matching rule, a precedent rule of the best matching rule, and a precedent rule of another precedent rule corresponds to a rule entry in the rule lookup table data structure for a cloned namespace.

35. The apparatus of one of the embodiments 1-34, wherein at least one of: the best matching rule, a precedent rule of the best matching rule, and a precedent rule of another precedent rule is an overriding rule in a cloned namespace determined via a namespace lookup table data structure.

101. A distributed system generating rule compiler processor-readable non-transitory physical medium storing processor-issuable instructions to:
(a) obtain, via the processor, a distributed system execution request data structure;
(b) determine, via the processor, an output rule and the output rule's set of rule parameters specified via the distributed system execution request data structure for a requested calculation, wherein a current rule is initialized to the output rule;
(c) query, via the processor, a rule lookup table data structure to determine a set of matching rules, corresponding to the current rule, based on the current rule's identification tuple;
(d) select, via the processor, the best matching rule from the set of matching rules, wherein the best matching rule's set of rule parameters best corresponds to the current rule's set of rule parameters;
(e) generate, via the processor, a logical dependency graph data structure by adding logical dependency graph nodes and logical dependency graph edges corresponding to the best matching rule, precedent rules of the best matching rule, and precedent rules of each precedent rule;
(f) determine, via the processor, an execution complexity gauge value associated with the generated logical dependency graph data structure;

(g) determine, via the processor, a set of distributed worker processes to be utilized to execute the requested calculation;

(h) divide, via the processor, the generated logical dependency graph data structure into a set of subgraphs based on the execution complexity gauge value, wherein each worker process in the set of distributed worker processes is assigned a subgraph from the set of subgraphs;

(i) initialize, via the processor, each respective worker process in the set of distributed worker processes with the subgraph assigned to the respective worker process;

(j) coordinate, via the processor, execution of the requested calculation by worker processes in the set of distributed worker processes, wherein each respective worker process calculates results for logical dependency graph nodes in the subgraph assigned to the respective worker process; and (k) obtain, via the processor, a computation result of the logical dependency graph node corresponding to the output rule, from the worker process in the set of distributed worker processes that is assigned the subgraph that contains the logical dependency graph node corresponding to the output rule.

102. The medium of embodiment 101, wherein the rule lookup table data structure contains a set of identification tuple to rule data structure mappings.

103. The medium of embodiment 102, wherein a rule data structure includes a data field that references an associated concrete atom data structure that implements a forward calculation operation of a generic atom interface to calculate a result.

104. The medium of embodiment 103, wherein a rule data structure includes a data field that references a factory function that creates an instance of the associated concrete atom data structure.

105. The medium of one of the embodiments 101-104, wherein an identification tuple comprises an ordered list that includes a rule's namespace and rule name.

106. The medium of one of the embodiments 101-104, wherein an identification tuple comprises a hash value calculated based on an ordered list that includes a rule's namespace and rule name.

107. The medium of one of the embodiments 101-106, wherein a single rule exists in the set of matching rules, and the single rule is selected as the best matching rule.

108. The medium of one of the embodiments 101-106, wherein multiple rules exist in the set of matching rules, and a rule with the minimum inheritance distance is selected as the best matching rule.

109. The medium of embodiment 108, wherein multiple rules with the minimum inheritance distance exist, and the best matching rule is selected using a tie breaker technique based on one of: position of rule parameters, types of rule parameters.

110. The medium of one of the embodiments 101-109, wherein the instructions to (e) generate the logical dependency graph data structure further comprise instructions to:

(e1) determine, via the processor, a logical dependency graph node identifier for the best matching rule;

(e2) either, upon determining, via the processor, that the logical dependency graph node identifier does not yet exist in the logical dependency graph data structure:

add, via the processor, a new logical dependency graph node, corresponding to the best matching rule, to the logical dependency graph data structure, wherein the new logical dependency graph node is assigned the logical dependency graph node identifier;

upon determining, via the processor, that the current rule is not the output rule, add a logical dependency graph edge between the new logical dependency graph node and a logical dependency graph node corresponding to the best matching rule's dependent rule;

determine, via the processor, a set of precedent rules for the best matching rule, wherein the best matching rule is a dependent rule for precedent rules in the set of precedent rules; and process, via the processor, each respective precedent rule in the set of precedent rules by: setting the current rule to the respective precedent rule, and repeating elements (c)-(e); and return, via the processor, to processing precedent rules of the best matching rule's dependent rule until precedent rules for the output rule are processed;

(e3) or, upon determining, via the processor, that the logical dependency graph node identifier already exists in the logical dependency graph data structure:

add, via the processor, a logical dependency graph edge between an existing logical dependency graph node, associated with the logical dependency graph node identifier, and a logical dependency graph node corresponding to the best matching rule's dependent rule; and return, via the processor, to processing precedent rules of the best matching rule's dependent rule.

111. The medium of one of the embodiments 101-110, wherein a logical dependency graph node is a data structure that includes a data field that that references a corresponding rule's identification tuple.

112. The medium of one of the embodiments 101-111, wherein a logical dependency graph edge is a data field in a logical dependency graph node that refers to another logical dependency graph node.

113. The medium of one of the embodiments 101-112, wherein the execution complexity gauge value is determined based on at least one of: the number of nodes in the logical dependency graph, the sum of output tensor sizes of logical dependency graph nodes, network data transfer size associated with the logical dependency graph, computation time of the requested calculation.

114. The medium of one of the embodiments 101-113, wherein the cardinality of the set of distributed worker processes is determined based on a specified fixed number of available worker processes.

115. The medium of one of the embodiments 101-113, wherein the cardinality of the set of distributed worker processes is determined based on the execution complexity gauge value and a scaling parameter value, wherein the scaling parameter value is determined based on at least one of: target processing time, target available memory, target cost, target data transfer size.

116. The medium of embodiment 115, wherein the cardinality of the set of distributed worker processes is further determined based on an average worker execution capability.

117. The medium of one of the embodiments 101-116, wherein the number of nodes in a subgraph assigned to each respective worker process is determined based on the respective worker's worker execution capability, wherein worker execution capability is determined based on at least one of: processor speed, memory size, network speed.

118. The medium of one of the embodiments 101-117, wherein at least some of logical dependency graph nodes in the generated logical dependency graph data structure are duplicated in multiple subgraphs that are assigned to different worker processes.

119. The medium of one of the embodiments 101-118, wherein the generated logical dependency graph data structure includes a packaged logical dependency graph node that utilizes an internal logical dependency graph data structure, wherein the internal logical dependency graph data structure is constructed using an associated packaged atom data structure.

120. The medium of embodiment 119, wherein the internal logical dependency graph data structure is in the same memory space as the worker process in the set of distributed worker processes that is assigned the subgraph that contains the packaged logical dependency graph node.

121. The medium of embodiment 119, wherein the internal logical dependency graph data structure is distributed across multiple worker processes in the set of distributed worker processes.

122. The medium of one of the embodiments 101-121, further comprising:
    the medium stores processor-issuable instructions to:
        provide a graph representation of the logical dependency graph data structure;
        obtain a user selection of a target node in the graph representation;
        determine a target logical dependency graph node in the logical dependency graph data structure corresponding to the user selected target node in the graph representation;
        obtain a computation result of the target logical dependency graph node from the worker process in the set of distributed worker processes that is assigned the subgraph that contains the target logical dependency graph node; and
        provide the computation result for display.

123. The medium of embodiment 122, wherein the target node in the graph representation includes a visual indicator that specifies the worker process in the set of distributed worker processes that is assigned the subgraph that contains the target logical dependency graph node.

124. The medium of embodiment 123, wherein the visual indicator is at least one of: color, color pattern, shape, or border style of the target node.

125. The medium of embodiment 122, wherein each node in the graph representation includes a visual indicator that specifies whether the respective node's precedent nodes are displayed.

126. The medium of embodiment 125, wherein the visual indicator is at least one of: color, color pattern, shape, or border style of the respective node.

127. The medium of one of the embodiments 122-126, further comprising:
    the medium stores processor-issuable instructions to:
        obtain a user command to view state replication code, wherein execution of state replication code on a remote client replicates state of an associated logical dependency graph node on the remote client;
        determine state replication code associated with the target logical dependency graph node; and
        generate a display containing the determined state replication code.

128. The medium of one of the embodiments 122-127, further comprising:
    the medium stores processor-issuable instructions to:
        obtain a user command to switch graph display mode;
        provide a second graph representation of a rule dependency graph data structure corresponding to the logical dependency graph data structure;
        obtain a user selection of a second target node in the second graph representation; and
        provide display information associated with the second target node, wherein the display information includes a list of logical dependency graph nodes associated with the second target node and metadata associated with the second target node.

129. The medium of one of the embodiments 101-121, further comprising:
    the medium stores processor-issuable instructions to:
        provide a graph representation of the logical dependency graph data structure;
        obtain a user selection of a target node in the graph representation;
        determine a target logical dependency graph node in the logical dependency graph data structure corresponding to the user selected target node in the graph representation; and
        provide a second graph representation of the target logical dependency graph node's internal logical dependency graph data structure upon determining that the target logical dependency graph node is a packaged atom.

130. The medium of embodiment 129, further comprising:
    the medium stores processor-issuable instructions to:
        obtain a user command to switch graph display mode; and
        provide a third graph representation of a rule dependency graph data structure corresponding to the target logical dependency graph node's internal logical dependency graph data structure.

131. The medium of embodiment 130, wherein the third graph representation further includes a graph representation of a rule dependency graph data structure corresponding to the logical dependency graph data structure.

132. The medium of one of the embodiments 130-131, wherein nested graph representations of rule dependency graph data structures include navigation links that facilitate navigation among the nested graph representations.

133. The medium of one of the embodiments 101-132, wherein at least one of: the best matching rule, a precedent rule of the best matching rule, and a precedent rule of another precedent rule utilizes dynamic precedents.

134. The medium of one of the embodiments 101-133, wherein at least one of: the best matching rule, a precedent rule of the best matching rule, and a precedent rule of another precedent rule corresponds to a rule entry in the rule lookup table data structure for a cloned namespace.

135. The medium of one of the embodiments 101-134, wherein at least one of: the best matching rule, a precedent rule of the best matching rule, and a precedent rule of another precedent rule is an overriding rule in a cloned namespace determined via a namespace lookup table data structure.

201. A processor-implemented distributed system generating rule compiler method, comprising executing processor-implemented instructions to:
    (a) obtain, via the processor, a distributed system execution request data structure;

(b) determine, via the processor, an output rule and the output rule's set of rule parameters specified via the distributed system execution request data structure for a requested calculation, wherein a current rule is initialized to the output rule;
(c) query, via the processor, a rule lookup table data structure to determine a set of matching rules, corresponding to the current rule, based on the current rule's identification tuple;
(d) select, via the processor, the best matching rule from the set of matching rules, wherein the best matching rule's set of rule parameters best corresponds to the current rule's set of rule parameters;
(e) generate, via the processor, a logical dependency graph data structure by adding logical dependency graph nodes and logical dependency graph edges corresponding to the best matching rule, precedent rules of the best matching rule, and precedent rules of each precedent rule;
(f) determine, via the processor, an execution complexity gauge value associated with the generated logical dependency graph data structure;
(g) determine, via the processor, a set of distributed worker processes to be utilized to execute the requested calculation;
(h) divide, via the processor, the generated logical dependency graph data structure into a set of subgraphs based on the execution complexity gauge value, wherein each worker process in the set of distributed worker processes is assigned a subgraph from the set of subgraphs;
(i) initialize, via the processor, each respective worker process in the set of distributed worker processes with the subgraph assigned to the respective worker process;
(j) coordinate, via the processor, execution of the requested calculation by worker processes in the set of distributed worker processes, wherein each respective worker process calculates results for logical dependency graph nodes in the subgraph assigned to the respective worker process; and
(k) obtain, via the processor, a computation result of the logical dependency graph node corresponding to the output rule, from the worker process in the set of distributed worker processes that is assigned the subgraph that contains the logical dependency graph node corresponding to the output rule.

202. The method of embodiment 201, wherein the rule lookup table data structure contains a set of identification tuple to rule data structure mappings.

203. The method of embodiment 202, wherein a rule data structure includes a data field that references an associated concrete atom data structure that implements a forward calculation operation of a generic atom interface to calculate a result.

204. The method of embodiment 203, wherein a rule data structure includes a data field that references a factory function that creates an instance of the associated concrete atom data structure.

205. The method of one of the embodiments 201-204, wherein an identification tuple comprises an ordered list that includes a rule's namespace and rule name.

206. The method of one of the embodiments 201-204, wherein an identification tuple comprises a hash value calculated based on an ordered list that includes a rule's namesp ace and rule name.

207. The method of one of the embodiments 201-206, wherein a single rule exists in the set of matching rules, and the single rule is selected as the best matching rule.

208. The method of one of the embodiments 201-206, wherein multiple rules exist in the set of matching rules, and a rule with the minimum inheritance distance is selected as the best matching rule.

209. The method of embodiment 208, wherein multiple rules with the minimum inheritance distance exist, and the best matching rule is selected using a tie breaker technique based on one of: position of rule parameters, types of rule parameters.

210. The method of one of the embodiments 201-209, wherein the instructions to (e) generate the logical dependency graph data structure further comprise instructions to:
(e1) determine, via the processor, a logical dependency graph node identifier for the best matching rule;
(e2) either, upon determining, via the processor, that the logical dependency graph node identifier does not yet exist in the logical dependency graph data structure:
add, via the processor, a new logical dependency graph node, corresponding to the best matching rule, to the logical dependency graph data structure, wherein the new logical dependency graph node is assigned the logical dependency graph node identifier;
upon determining, via the processor, that the current rule is not the output rule, add a logical dependency graph edge between the new logical dependency graph node and a logical dependency graph node corresponding to the best matching rule's dependent rule;
determine, via the processor, a set of precedent rules for the best matching rule, wherein the best matching rule is a dependent rule for precedent rules in the set of precedent rules; and
process, via the processor, each respective precedent rule in the set of precedent rules by: setting the current rule to the respective precedent rule, and repeating elements (c)-(e); and
return, via the processor, to processing precedent rules of the best matching rule's dependent rule until precedent rules for the output rule are processed;
(e3) or, upon determining, via the processor, that the logical dependency graph node identifier already exists in the logical dependency graph data structure:
add, via the processor, a logical dependency graph edge between an existing logical dependency graph node, associated with the logical dependency graph node identifier, and a logical dependency graph node corresponding to the best matching rule's dependent rule; and
return, via the processor, to processing precedent rules of the best matching rule's dependent rule.

211. The method of one of the embodiments 201-210, wherein a logical dependency graph node is a data structure that includes a data field that that references a corresponding rule's identification tuple.

212. The method of one of the embodiments 201-211, wherein a logical dependency graph edge is a data field in a logical dependency graph node that refers to another logical dependency graph node.

213. The method of one of the embodiments 201-212, wherein the execution complexity gauge value is determined based on at least one of: the number of nodes in the logical dependency graph, the sum of output tensor sizes of logical dependency graph nodes, network data transfer size associated with the logical dependency graph, computation time of the requested calculation.

214. The method of one of the embodiments 201-213, wherein the cardinality of the set of distributed worker processes is determined based on a specified fixed number of available worker processes.
215. The method of one of the embodiments 201-213, wherein the cardinality of the set of distributed worker processes is determined based on the execution complexity gauge value and a scaling parameter value, wherein the scaling parameter value is determined based on at least one of: target processing time, target available memory, target cost, target data transfer size.
216. The method of embodiment 215, wherein the cardinality of the set of distributed worker processes is further determined based on an average worker execution capability.
217. The method of one of the embodiments 201-216, wherein the number of nodes in a subgraph assigned to each respective worker process is determined based on the respective worker's worker execution capability, wherein worker execution capability is determined based on at least one of: processor speed, memory size, network speed.
218. The method of one of the embodiments 201-217, wherein at least some of logical dependency graph nodes in the generated logical dependency graph data structure are duplicated in multiple subgraphs that are assigned to different worker processes.
219. The method of one of the embodiments 201-218, wherein the generated logical dependency graph data structure includes a packaged logical dependency graph node that utilizes an internal logical dependency graph data structure, wherein the internal logical dependency graph data structure is constructed using an associated packaged atom data structure.
220. The method of embodiment 219, wherein the internal logical dependency graph data structure is in the same memory space as the worker process in the set of distributed worker processes that is assigned the subgraph that contains the packaged logical dependency graph node.
221. The method of embodiment 219, wherein the internal logical dependency graph data structure is distributed across multiple worker processes in the set of distributed worker processes.
222. The method of one of the embodiments 201-221, further comprising:
executing processor-implemented instructions to:
provide a graph representation of the logical dependency graph data structure;
obtain a user selection of a target node in the graph representation;
determine a target logical dependency graph node in the logical dependency graph data structure corresponding to the user selected target node in the graph representation;
obtain a computation result of the target logical dependency graph node from the worker process in the set of distributed worker processes that is assigned the subgraph that contains the target logical dependency graph node; and
provide the computation result for display.
223. The method of embodiment 222, wherein the target node in the graph representation includes a visual indicator that specifies the worker process in the set of distributed worker processes that is assigned the subgraph that contains the target logical dependency graph node.
224. The method of embodiment 223, wherein the visual indicator is at least one of: color, color pattern, shape, or border style of the target node.
225. The method of embodiment 222, wherein each node in the graph representation includes a visual indicator that specifies whether the respective node's precedent nodes are displayed.
226. The method of embodiment 225, wherein the visual indicator is at least one of: color, color pattern, shape, or border style of the respective node.
227. The method of one of the embodiments 222-226, further comprising:
executing processor-implemented instructions to:
obtain a user command to view state replication code, wherein execution of state replication code on a remote client replicates state of an associated logical dependency graph node on the remote client;
determine state replication code associated with the target logical dependency graph node; and
generate a display containing the determined state replication code.
228. The method of one of the embodiments 222-227, further comprising:
executing processor-implemented instructions to:
obtain a user command to switch graph display mode;
provide a second graph representation of a rule dependency graph data structure corresponding to the logical dependency graph data structure;
obtain a user selection of a second target node in the second graph representation; and
provide display information associated with the second target node, wherein the display information includes a list of logical dependency graph nodes associated with the second target node and metadata associated with the second target node.
229. The method of one of the embodiments 201-221, further comprising:
executing processor-implemented instructions to:
provide a graph representation of the logical dependency graph data structure;
obtain a user selection of a target node in the graph representation;
determine a target logical dependency graph node in the logical dependency graph data structure corresponding to the user selected target node in the graph representation; and
provide a second graph representation of the target logical dependency graph node's internal logical dependency graph data structure upon determining that the target logical dependency graph node is a packaged atom.
230. The method of embodiment 229, further comprising:
executing processor-implemented instructions to:
obtain a user command to switch graph display mode; and
provide a third graph representation of a rule dependency graph data structure corresponding to the target logical dependency graph node's internal logical dependency graph data structure.
231. The method of embodiment 230, wherein the third graph representation further includes a graph representation of a rule dependency graph data structure corresponding to the logical dependency graph data structure.
232. The method of one of the embodiments 230-231, wherein nested graph representations of rule dependency graph data structures include navigation links that facilitate navigation among the nested graph representations.

233. The method of one of the embodiments 201-232, wherein at least one of: the best matching rule, a precedent rule of the best matching rule, and a precedent rule of another precedent rule utilizes dynamic precedents.

234. The method of one of the embodiments 201-233, wherein at least one of: the best matching rule, a precedent rule of the best matching rule, and a precedent rule of another precedent rule corresponds to a rule entry in the rule lookup table data structure for a cloned namespace.

235. The method of one of the embodiments 201-234, wherein at least one of: the best matching rule, a precedent rule of the best matching rule, and a precedent rule of another precedent rule is an overriding rule in a cloned namespace determined via a namespace lookup table data structure.

THE EMBODIMENTS OF THE DSGRCE

The entirety of this disclosure (including the written description, figures, claims, abstract, appendices, and/or the like) for DISTRIBUTED SYSTEM GENERATING RULE COMPILER ENGINE APPARATUSES, METHODS, SYSTEMS AND MEDIA shows various embodiments via which the claimed innovations may be practiced. It is to be understood that these embodiments and the features they describe are a representative sample presented to assist in understanding the claimed innovations, and are not exhaustive and/or exclusive. As such, the various embodiments, implementations, examples, and/or the like are deemed non-limiting throughout this disclosure. Furthermore, alternate undescribed embodiments may be available (e.g., equivalent embodiments). Such alternate embodiments have not been discussed in detail to preserve space and/or reduce repetition. That alternate embodiments have not been discussed in detail is not to be considered a disclaimer of such alternate undescribed embodiments, and no inference should be drawn regarding such alternate undescribed embodiments relative to those discussed in detail in this disclosure. It is to be understood that such alternate undescribed embodiments may be utilized without departing from the spirit and/or scope of the disclosure. For example, the organizational, logical, physical, functional, topological, and/or the like structures of various embodiments may differ. In another example, the organizational, logical, physical, functional, topological, and/or the like structures of the DSGRCE coordinator, DSGRCE coordinator elements, DSGRCE data stores, DSGRCE components and their subcomponents, capabilities, applications, and/or the like described in various embodiments throughout this disclosure are not limited to a fixed operating order and/or arrangement, instead, all equivalent operating orders and/or arrangements are contemplated by this disclosure. In yet another example, the DSGRCE coordinator, DSGRCE coordinator elements, DSGRCE data stores, DSGRCE components and their subcomponents, capabilities, applications, and/or the like described in various embodiments throughout this disclosure are not limited to serial execution, instead, any number and/or configuration of threads, processes, instances, services, servers, clients, nodes, and/or the like that execute in parallel, concurrently, simultaneously, synchronously, asynchronously, and/or the like is contemplated by this disclosure. Furthermore, it is to be understood that some of the features described in this disclosure may be mutually contradictory, incompatible, inapplicable, and/or the like, and are not present simultaneously in the same embodiment. Accordingly, the various embodiments, implementations, examples, and/or the like are not to be considered limitations on the disclosure as defined by the claims or limitations on equivalents to the claims This disclosure includes innovations not currently claimed. Applicant reserves all rights in such currently unclaimed innovations including the rights to claim such innovations and to file additional provisional applications, nonprovisional applications, continuation applications, continuation-in-part applications, divisional applications, and/or the like. Further, this disclosure is not limited to the combination of features specified in the claims and includes combinations of features other than those explicitly recited in the claims. It is to be understood that while some embodiments of the DSGRCE discussed in this disclosure have been directed to cloud-based distributed systems, the innovations described in this disclosure may be readily applied to a wide variety of other fields and/or applications.

The following is claimed:

1. A rule compiler apparatus for generating a distributed system, comprising:
   a memory;
   a processor in communication with the memory, and configured to issue a plurality of processing instructions stored in the memory, wherein the processor issues instructions to:
   (a) obtain, via the processor, a distributed system execution request data structure;
   (b) determine, via the processor, an output rule structured to comprise a declaration implementing polymorphic parameterization via a declarative rules syntax and a set of rule parameters specifying concrete parameterization for the declaration in accordance with the declarative rules syntax associated with the output rule specified via the distributed system execution request data structure for a requested calculation, wherein a current rule is initialized to the output rule;
   (c) query, via the processor, a rule lookup table data structure to determine a set of matching rules, corresponding to the current rule, based on an identification tuple associated with the current rule;
   (d) select, via the processor, a best matching rule from the set of matching rules, wherein a set of rule parameters associated with the best matching rule best corresponds to a set of rule parameters associated with the current rule;
   (e) generate, via the processor, a logical dependency graph data structure by adding logical dependency graph nodes and logical dependency graph edges corresponding to the best matching rule, precedent rules of the best matching rule, and precedent rules of each of the precedent rules of the best matching rule;
   (f) determine, via the processor, an execution complexity gauge value associated with the generated logical dependency graph data structure;
   (g) determine, via the processor, a set of distributed worker processes to be utilized to execute the requested calculation;
   (h) divide, via the processor, the generated logical dependency graph data structure into a set of subgraphs based on the execution complexity gauge value, wherein each worker process in the set of distributed worker processes is assigned a subgraph from the set of subgraphs;

(i) initialize, via the processor, each respective worker process in the set of distributed worker processes with the subgraph assigned to the respective worker process;

(j) coordinate, via the processor, execution of the requested calculation by worker processes in the set of distributed worker processes, wherein each respective worker process calculates results for logical dependency graph nodes in the subgraph assigned to the respective worker process; and (k) obtain, via the processor, a computation result of a logical dependency graph node from the logical dependency graph nodes corresponding to the output rule, from the worker process in the set of distributed worker processes that is assigned the subgraph that contains the logical dependency graph node corresponding to the output rule.

2. The apparatus of claim 1, wherein the rule lookup table data structure contains a set of identification tuple to rule data structure mappings.

3. The apparatus of claim 2, wherein a rule data structure includes a data field that references an associated concrete atom data structure that implements a forward calculation operation of a generic atom interface to calculate a result associated with the respective rule data structure.

4. The apparatus of claim 3, wherein a rule data structure includes a data field that references a factory function that creates an instance of the associated concrete atom data structure.

5. The apparatus of claim 1, wherein an identification tuple comprises an ordered list that includes a rule's namespace and rule name.

6. The apparatus of claim 1, wherein an identification tuple comprises a hash value calculated based on an ordered list that includes a rule's namespace and rule name.

7. The apparatus of claim 1, wherein a single rule exists in the set of matching rules, and the single rule is selected as the best matching rule.

8. The apparatus of claim 1, wherein multiple rules exist in the set of matching rules, and a rule with a minimum inheritance distance is selected as the best matching rule.

9. The apparatus of claim 8, wherein multiple rules with the minimum inheritance distance exist, and the best matching rule is selected using a tie breaker technique based on one of: position of rule parameters, types of rule parameters.

10. The apparatus of claim 1, wherein the instructions to (e) generate the logical dependency graph data structure further comprise instructions to:

(e1) determine, via the processor, a logical dependency graph node identifier for the best matching rule;

(e2) either, upon determining, via the processor, that the logical dependency graph node identifier does not yet exist in the logical dependency graph data structure:

add, via the processor, a new logical dependency graph node, corresponding to the best matching rule, to the logical dependency graph data structure, wherein the new logical dependency graph node is assigned the logical dependency graph node identifier;

upon determining, via the processor, that the current rule is not the output rule, add a logical dependency graph edge between the new logical dependency graph node and a logical dependency graph node corresponding to a dependent rule for the best matching rule;

determine, via the processor, a set of precedent rules for the best matching rule, wherein the best matching rule is a dependent rule for precedent rules in the set of precedent rules; and process, via the processor, each respective precedent rule in the set of precedent rules by: setting the current rule to the respective precedent rule, and repeating elements (c)-(e); and return, via the processor, to processing precedent rules of the dependent rule for the best matching rule until precedent rules for the output rule are processed;

(e3) or, upon determining, via the processor, that the logical dependency graph node identifier already exists in the logical dependency graph data structure:

add, via the processor, a logical dependency graph edge between an existing logical dependency graph node, associated with the logical dependency graph node identifier, and a logical dependency graph node corresponding to the dependent rule for the best matching rule; and return, via the processor, to processing precedent rules of the dependent rule for the best matching rule.

11. The apparatus of claim 1, wherein a logical dependency graph node is a data structure that includes a data field that references a corresponding rule's identification tuple.

12. The apparatus of claim 1, wherein a logical dependency graph edge is a data field in a logical dependency graph node that refers to another logical dependency graph node.

13. The apparatus of claim 1, wherein the execution complexity gauge value is determined based on at least one of: number of nodes in the logical dependency graph, sum of output tensor sizes of logical dependency graph nodes, network data transfer size associated with the logical dependency graph, computation time of the requested calculation.

14. The apparatus of claim 1, wherein cardinality of the set of distributed worker processes is determined based on a specified fixed number of available worker processes.

15. The apparatus of claim 1, wherein cardinality of the set of distributed worker processes is determined based on the execution complexity gauge value and a scaling parameter value, wherein the scaling parameter value is determined based on at least one of: target processing time, target available memory, target cost, target data transfer size.

16. The apparatus of claim 15, wherein the cardinality of the set of distributed worker processes is further determined based on an average worker execution capability.

17. The apparatus of claim 1, wherein number of nodes in a subgraph assigned to each respective worker process is determined based on worker execution capability associated with the respective worker process, wherein the worker execution capability is determined based on at least one of: processor speed, memory size, network speed.

18. The apparatus of claim 1, wherein at least some of logical dependency graph nodes in the generated logical dependency graph data structure are duplicated in multiple subgraphs that are assigned to different worker processes.

19. The apparatus of claim 1, wherein the generated logical dependency graph data structure includes a packaged logical dependency graph node that utilizes an internal logical dependency graph data structure, wherein the internal logical dependency graph data structure is constructed using an associated packaged atom data structure.

20. The apparatus of claim 19, wherein the internal logical dependency graph data structure is in same memory space as the worker process in the set of distributed worker processes that is assigned the subgraph that contains the packaged logical dependency graph node.

21. The apparatus of claim 19, wherein the internal logical dependency graph data structure is distributed across multiple worker processes in the set of distributed worker processes.

22. The apparatus of claim 1, further comprising:
the processor issues instructions to:
provide a graph representation of the logical dependency graph data structure;
obtain a user selection of a target node in the graph representation;
determine a target logical dependency graph node in the logical dependency graph data structure corresponding to the user selected target node in the graph representation;
obtain a computation result of the target logical dependency graph node from the worker process in the set of distributed worker processes that is assigned the subgraph that contains the target logical dependency graph node; and
provide the computation result of the target logical dependency graph node for display.

23. The apparatus of claim 22, wherein the target node in the graph representation includes a visual indicator that specifies the worker process in the set of distributed worker processes that is assigned the subgraph that contains the target logical dependency graph node.

24. The apparatus of claim 23, wherein the visual indicator is at least one of: color, color pattern, shape, or border style of the target node.

25. The apparatus of claim 22, wherein each respective node in the graph representation includes a visual indicator that specifies whether precedent nodes associated with the respective node are displayed.

26. The apparatus of claim 25, wherein the visual indicator is at least one of: color, color pattern, shape, or border style of the respective node.

27. The apparatus of claim 22, further comprising:
the processor issues instructions to:
obtain a user command to view state replication code, wherein execution of the state replication code on a remote client replicates state of an associated logical dependency graph node on the remote client;
determine state replication code associated with the target logical dependency graph node; and
generate a display containing the determined state replication code.

28. The apparatus of claim 22, further comprising:
the processor issues instructions to:
obtain a user command to switch graph display mode;
provide a second graph representation of a rule dependency graph data structure corresponding to the logical dependency graph data structure;
obtain a user selection of a second target node in the second graph representation; and
provide display information associated with the second target node, wherein the display information includes a list of logical dependency graph nodes associated with the second target node and metadata associated with the second target node.

29. The apparatus of claim 1, further comprising:
the processor issues instructions to:
provide a graph representation of the logical dependency graph data structure;
obtain a user selection of a target node in the graph representation;
determine a target logical dependency graph node in the logical dependency graph data structure corresponding to the user selected target node in the graph representation; and
provide a second graph representation of internal logical dependency graph data structure associated with the target logical dependency graph node upon determining that the target logical dependency graph node is a packaged atom.

30. The apparatus of claim 29, further comprising:
the processor issues instructions to:
obtain a user command to switch graph display mode; and
provide a third graph representation of a rule dependency graph data structure corresponding to the target logical dependency graph node's internal logical dependency graph data structure.

31. The apparatus of claim 30, wherein the third graph representation further includes a graph representation of a rule dependency graph data structure corresponding to the logical dependency graph data structure.

32. The apparatus of claim 30, wherein nested graph representations of rule dependency graph data structures include navigation links that facilitate navigation among the nested graph representations.

33. The apparatus of claim 1, wherein at least one of: the best matching rule, a precedent rule of the best matching rule, and a precedent rule of another precedent rule utilizes dynamic precedents.

34. The apparatus of claim 1, wherein at least one of: the best matching rule, a precedent rule of the best matching rule, and a precedent rule of another precedent rule corresponds to a rule entry in the rule lookup table data structure for a cloned namespace.

35. The apparatus of claim 1, wherein at least one of: the best matching rule, a precedent rule of the best matching rule, and a precedent rule of another precedent rule is an overriding rule in a cloned namespace determined via a namespace lookup table data structure.

36. The apparatus of claim 1, wherein the declaration of the output rule implements type polymorphism.

37. The apparatus of claim 1, wherein the declaration of the output rule implements value polymorphism.

38. The apparatus of claim 1, wherein the declaration of the output rule implements type and value polymorphism.

39. The apparatus of claim 1, wherein each rule in the set of matching rules is structured to comprise a declaration implementing polymorphic parameterization.

40. A rule compiler processor-readable non-transitory physical medium for generating a distributed system storing processor-issuable instructions to:
(a) obtain, via the processor, a distributed system execution request data structure;
(b) determine, via the processor, an output rule structured to comprise a declaration implementing polymorphic parameterization via a declarative rules syntax and a set of rule parameters specifying concrete parameterization for the declaration in accordance with the declarative rules syntax associated with the output rule specified via the distributed system execution request data structure for a requested calculation, wherein a current rule is initialized to the output rule;
(c) query, via the processor, a rule lookup table data structure to determine a set of matching rules, corresponding to the current rule, based on an identification tuple associated with the current rule;

(d) select, via the processor, a best matching rule from the set of matching rules, wherein a set of rule parameters associated with the best matching rule best corresponds to a set of rule parameters associated with the current rule;
(e) generate, via the processor, a logical dependency graph data structure by adding logical dependency graph nodes and logical dependency graph edges corresponding to the best matching rule, precedent rules of the best matching rule, and precedent rules of each of the precedent rules of the best matching rule;
(f) determine, via the processor, an execution complexity gauge value associated with the generated logical dependency graph data structure;
(g) determine, via the processor, a set of distributed worker processes to be utilized to execute the requested calculation;
(h) divide, via the processor, the generated logical dependency graph data structure into a set of subgraphs based on the execution complexity gauge value, wherein each worker process in the set of distributed worker processes is assigned a subgraph from the set of subgraphs;
(i) initialize, via the processor, each respective worker process in the set of distributed worker processes with the subgraph assigned to the respective worker process;
(j) coordinate, via the processor, execution of the requested calculation by worker processes in the set of distributed worker processes, wherein each respective worker process calculates results for logical dependency graph nodes in the subgraph assigned to the respective worker process; and
(k) obtain, via the processor, a computation result of a logical dependency graph node from the logical dependency graph nodes corresponding to the output rule, from the worker process in the set of distributed worker processes that is assigned the subgraph that contains the logical dependency graph node corresponding to the output rule.

41. A processor-implemented rule compiler method for generating a distributed system, comprising executing processor-implemented instructions to:
(a) obtain, via the processor, a distributed system execution request data structure;
(b) determine, via the processor, an output rule structured to comprise a declaration implementing polymorphic parameterization via a declarative rules syntax and a set of rule parameters specifying concrete parameterization for the declaration in accordance with the declarative rules syntax associated with the output rule specified via the distributed system execution request data structure for a requested calculation, wherein a current rule is initialized to the output rule;
(c) query, via the processor, a rule lookup table data structure to determine a set of matching rules, corresponding to the current rule, based on an identification tuple associated with the current rule;
(d) select, via the processor, a best matching rule from the set of matching rules, wherein a set of rule parameters associated with the best matching rule best corresponds to a set of rule parameters associated with the current rule;
(e) generate, via the processor, a logical dependency graph data structure by adding logical dependency graph nodes and logical dependency graph edges corresponding to the best matching rule, precedent rules of the best matching rule, and precedent rules of each of the precedent rules of the best matching rule;
(f) determine, via the processor, an execution complexity gauge value associated with the generated logical dependency graph data structure;
(g) determine, via the processor, a set of distributed worker processes to be utilized to execute the requested calculation;
(h) divide, via the processor, the generated logical dependency graph data structure into a set of subgraphs based on the execution complexity gauge value, wherein each worker process in the set of distributed worker processes is assigned a subgraph from the set of subgraphs;
(i) initialize, via the processor, each respective worker process in the set of distributed worker processes with the subgraph assigned to the respective worker process;
(j) coordinate, via the processor, execution of the requested calculation by worker processes in the set of distributed worker processes, wherein each respective worker process calculates results for logical dependency graph nodes in the subgraph assigned to the respective worker process; and
(k) obtain, via the processor, a computation result of a logical dependency graph node from the logical dependency graph nodes corresponding to the output rule, from the worker process in the set of distributed worker processes that is assigned the subgraph that contains the logical dependency graph node corresponding to the output rule.

* * * * *